US012645939B2

(12) United States Patent
McLelland et al.

(10) Patent No.: US 12,645,939 B2
(45) Date of Patent: Jun. 2, 2026

(54) SPIKING NEURAL NETWORK

(71) Applicant: BrainChip, Inc., Laguna Hills, CA (US)

(72) Inventors: Douglas McLelland, L'Isle Jourdain Gers (FR); Kristofor D. Carlson, Willoughby Hills, OH (US); Keith William Johnson, Nollamara (AU); Milind Joshi, Edgewater (AU)

(73) Assignee: BrainChip, Inc., Laguna Hills, CA (US)

( * ) Notice: Subject to any disclaimer, the term of this patent is extended or adjusted under 35 U.S.C. 154(b) by 721 days.

(21) Appl. No.: 18/083,770

(22) Filed: Dec. 19, 2022

(65) Prior Publication Data

US 2023/0206066 A1 Jun. 29, 2023

(30) Foreign Application Priority Data

Dec. 21, 2021 (AU) ................................. 2021904165

(51) Int. Cl.
  *G06N 3/08* (2023.01)
  *G06N 3/04* (2023.01)
  (Continued)

(52) U.S. Cl.
  CPC ................. *G06N 3/08* (2013.01); *G06N 3/04* (2013.01); *G06N 3/045* (2023.01); *G06N 3/049* (2013.01);
  (Continued)

(58) Field of Classification Search
  CPC ............ G06N 3/08; G06N 3/04; G06N 3/063; G06N 3/082; G06N 3/09; G06N 3/096;
  (Continued)

(56) References Cited

U.S. PATENT DOCUMENTS 10,496,922 B1 * 12/2019 Dockendorf ........... G06N 3/049
2020/0143229 A1 5/2020 Van Der Made et al.
(Continued)

FOREIGN PATENT DOCUMENTS

| AU | 2022287647 A1 | 7/2023 |
| JP | 2023092521 A | 7/2023 |
| KR | 20230095026 A | 6/2023 |

OTHER PUBLICATIONS

Gupta, Ankur, and Lyle N. Long. "Hebbian learning with winner take all for spiking neural networks." 2009 International Joint Conference on Neural Networks. IEEE, 2009. (Year: 2009).*
(Continued)

*Primary Examiner* — Michelle T Bechtold
*Assistant Examiner* — Nicholas S Wu
(74) *Attorney, Agent, or Firm* — The Marbury Law Group, PLLC

(57) ABSTRACT

Disclosed herein are system, method, and computer program embodiments for an improved spiking neural network (SNN) configured to learn and perform unsupervised, semi-supervised, and supervised extraction of features from an input dataset. An embodiment operates by receiving a modification request to modify a base neural network, having N layers and a plurality of spiking neurons, trained using a primary training dataset. The base neural network is modified to include supplementary spiking neurons in the Nth or N+1th layer of the base neural network. The embodiment includes receiving a secondary training dataset and determining membrane potential values of one or more supplementary spiking neurons in the Nth or Nth+1 layer which learn features based on secondary training data set to select a supplementary/winning spiking neuron. The embodiment performs a learning function for the modified neural network based on the winning spiking neuron.

19 Claims, 27 Drawing Sheets

(51) Int. Cl.

| | |
|---|---|
| *G06N 3/045* | (2023.01) |
| *G06N 3/049* | (2023.01) |
| *G06N 3/063* | (2023.01) |
| *G06N 3/082* | (2023.01) |
| *G06N 3/084* | (2023.01) |
| *G06N 3/088* | (2023.01) |
| *G06N 3/09* | (2023.01) |
| *G06N 3/096* | (2023.01) |

(52) U.S. Cl.
   CPC ............. *G06N 3/063* (2013.01); *G06N 3/082* (2013.01); *G06N 3/084* (2013.01); *G06N 3/088* (2013.01); *G06N 3/09* (2023.01); *G06N 3/096* (2023.01)

(58) Field of Classification Search
   CPC ........ G06N 3/049; G06N 3/045; G06N 3/088; G06N 3/084
   See application file for complete search history.

(56) References Cited

U.S. PATENT DOCUMENTS

| | | |
|---|---|---|
| 2021/0027152 A1 | 1/2021 | Van Der Made et al. |
| 2022/0284265 A1* | 9/2022 | Miramond ............. G06N 3/063 |
| 2022/0358346 A1* | 11/2022 | Gupta .................... G06N 3/065 |

OTHER PUBLICATIONS

Wang, Jinling, et al. "Dynamically evolving spiking neural network for pattern recognition." 2015 international joint conference on neural networks (IJCNN). IEEE, 2015. (Year: 2015).*

Allred, Jason M., and Kaushik Roy. "Unsupervised incremental stdp learning using forced firing of dormant or idle neurons." 2016 International Joint Conference on Neural Networks (IJCNN). IEEE, 2016. (Year: 2016).*

Antonov D, Sviatov K, Sukhov S. Continuous learning of spiking networks trained with local rules. arXiv preprint arXiv:2111.09553. Nov. 1, 20218. (Year: 2021).*

IP Australia; AU Application No. 2022287647; Examination Report No. 1; Jan. 14, 2023; 6 pages.

IP Australia; AU Application No. 2022287647; Examination Report No. 2; Oct. 31, 2023; 4 pages.

IP Australia; AU Application No. 2022287647; Notice of Acceptance; Jan. 9, 2024; 4 pages.

Allred, J. M. et al., "Unsupervised Incremental STDP Learning Using Forced Firing of Dormant or Idle Neurons", 2016 International Joint Conference on Neural Networks (IJCNN), IEEE, published 2016, pp. 2492-2499 < URL: https://ieeexplore.ieee.org/stamp/stamp.jsp?tp=&arnumber=7727509  We Dont Have This Document.

Ho, N. et al., "Evaluation of transfer learning in deep convolutional neural network models for cardiac short axis slice classification", Scientific Reports, vol. 11, No. 1, published Jan. 19, 2021 < URL: https://www.nature.com/articles/s41598-021-81525-9.pdf> 11 pages.

Lobov, S. et al., "Competitive Learning in a Spiking Neural Network: Towards an Intelligent Pattern Classifier", Sensors, vol. 20, published Jan. 16, 2020 < URL: https://www.mdpi.com/1424-8220/20/2/500/pdf > 14 pages.

Chundi, P. K. et al., "Always-On Sub-Microwatt Spiking Neural Network Based on Spike-Driven Clock- and Power-Gating for an Ultra-Low-Power Intelligent Device", Frontiers in Neuroscience, vol. 15, published Jul. 20, 2021 < URL: https://www.frontiersin.org/articles/10.3389/fnins.2021.684113/pdf?isPublishedV2=False > 15 pages.

\* cited by examiner

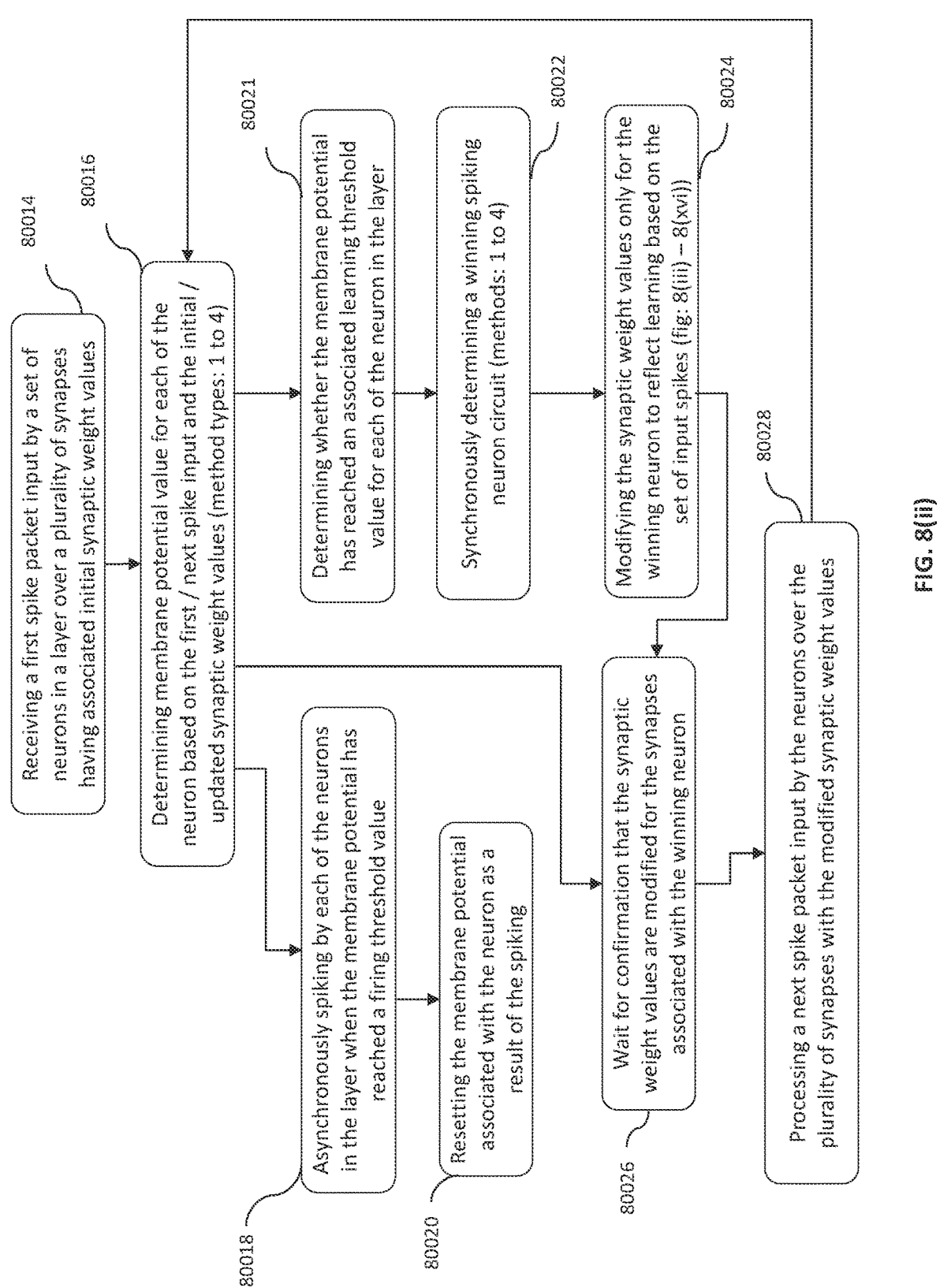
FIG. 8(iii)

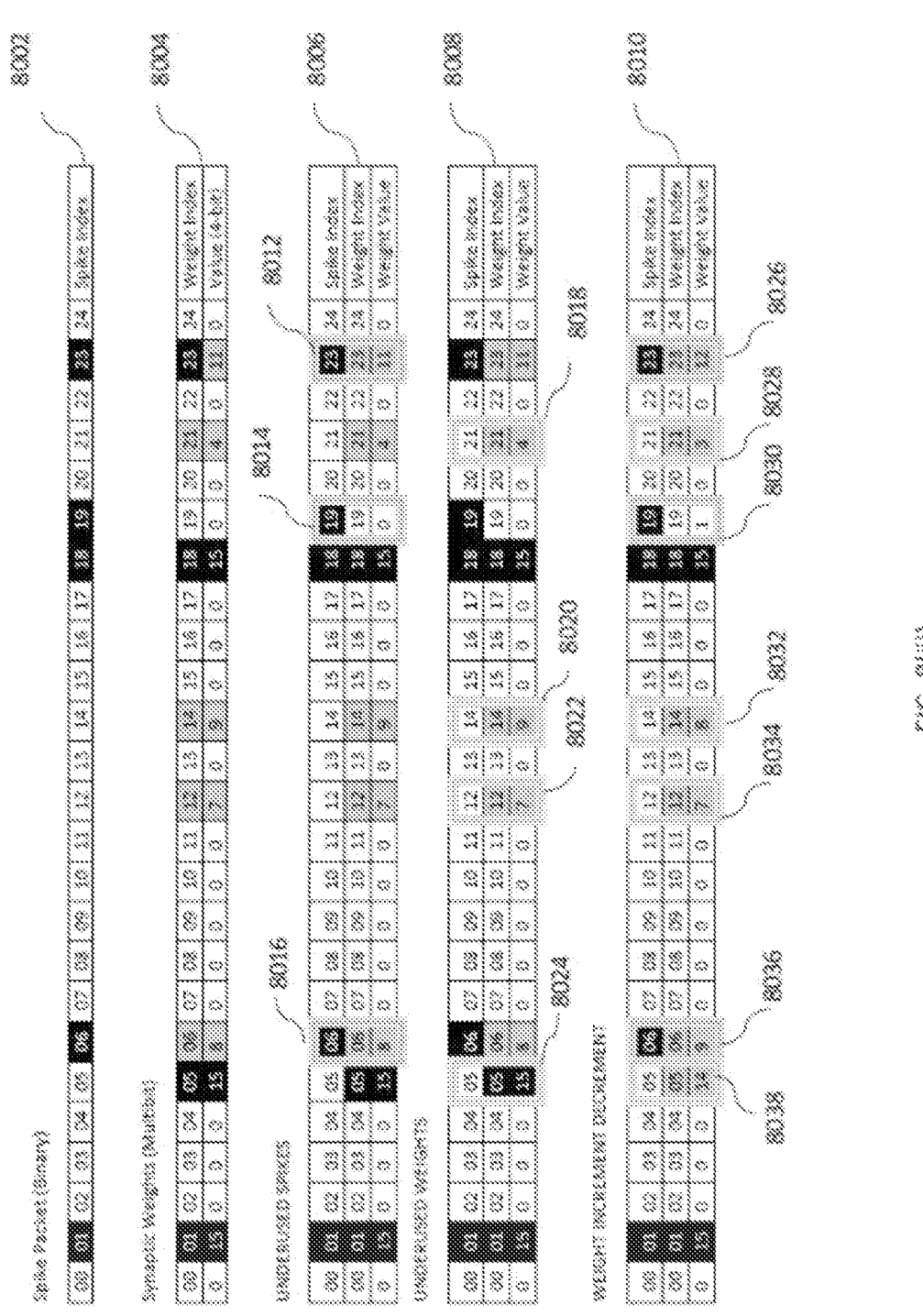
FIG. 8(iii)

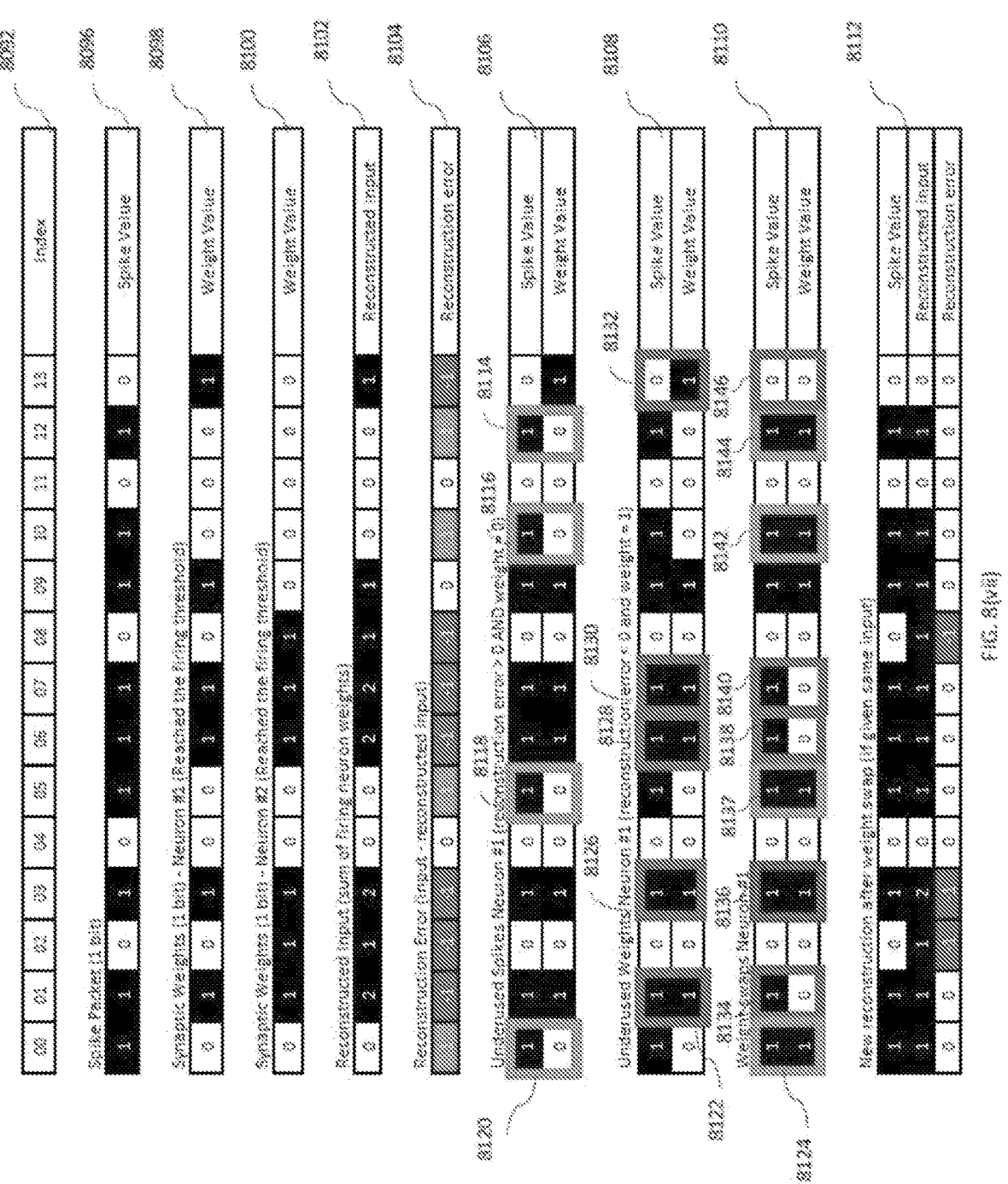
FIG. 8(xii)

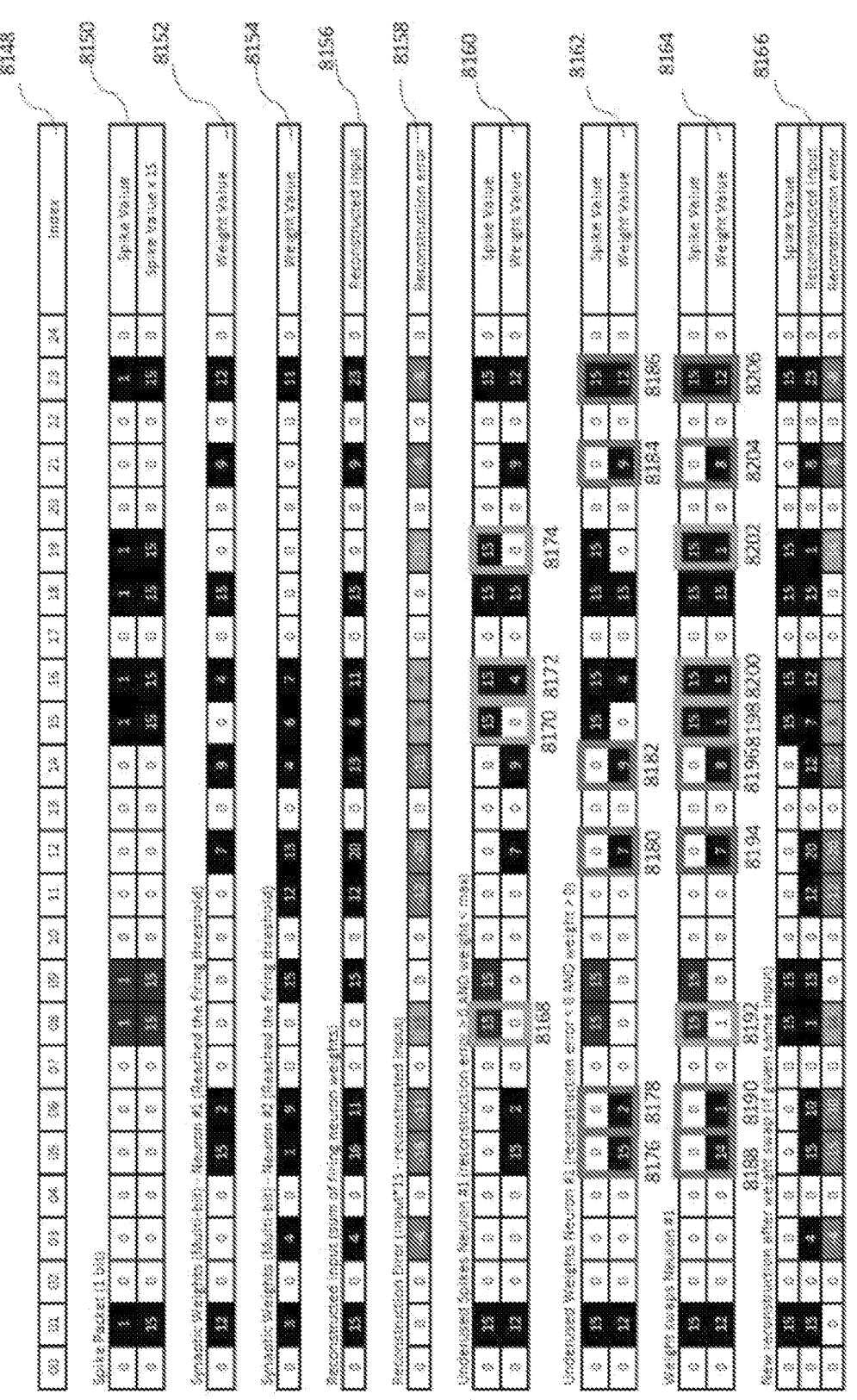
FIG. 8(viii)

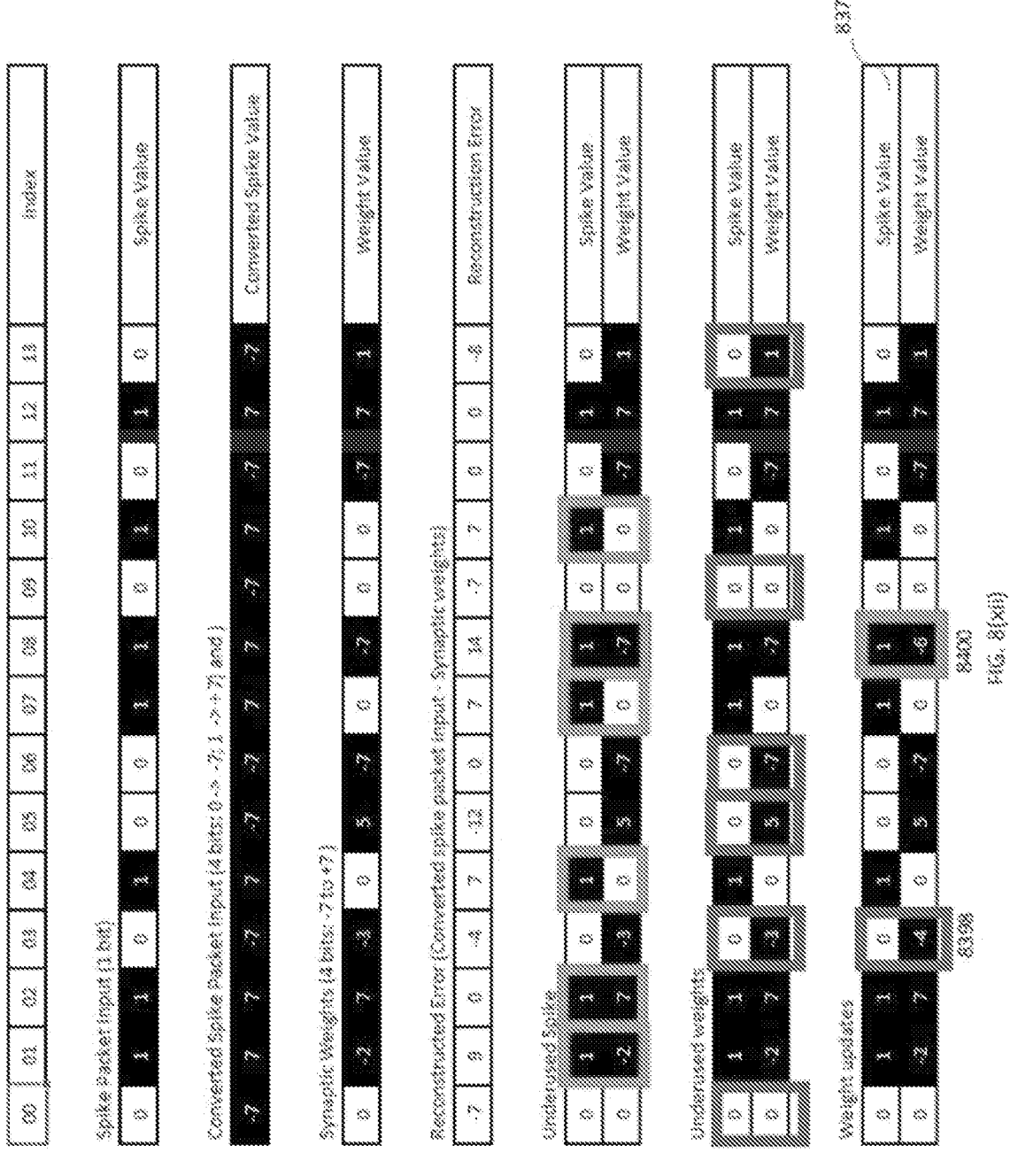
FIG. 8(xii)

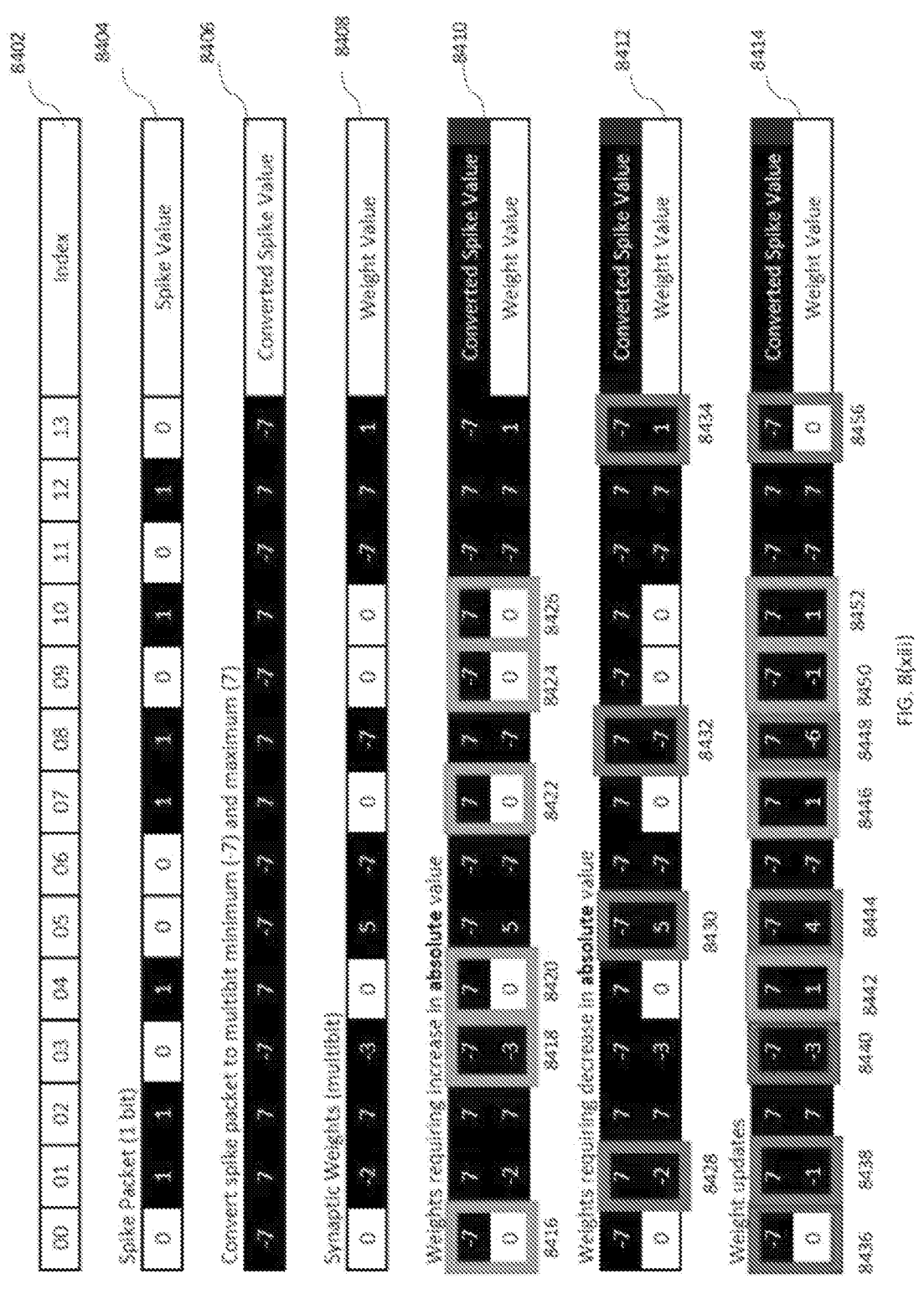
FIG. 8(xiii)

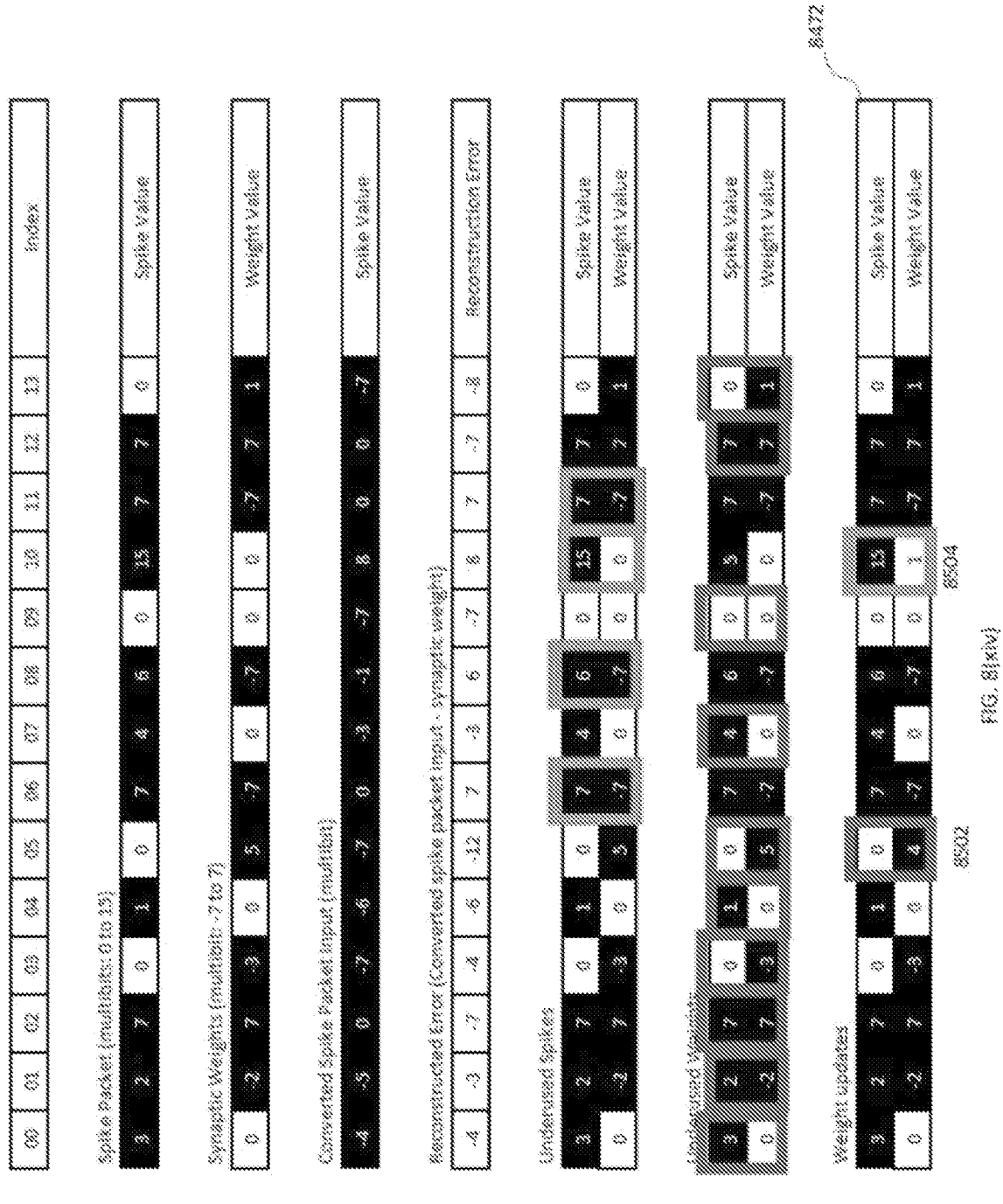
FIG. 8(xiv)

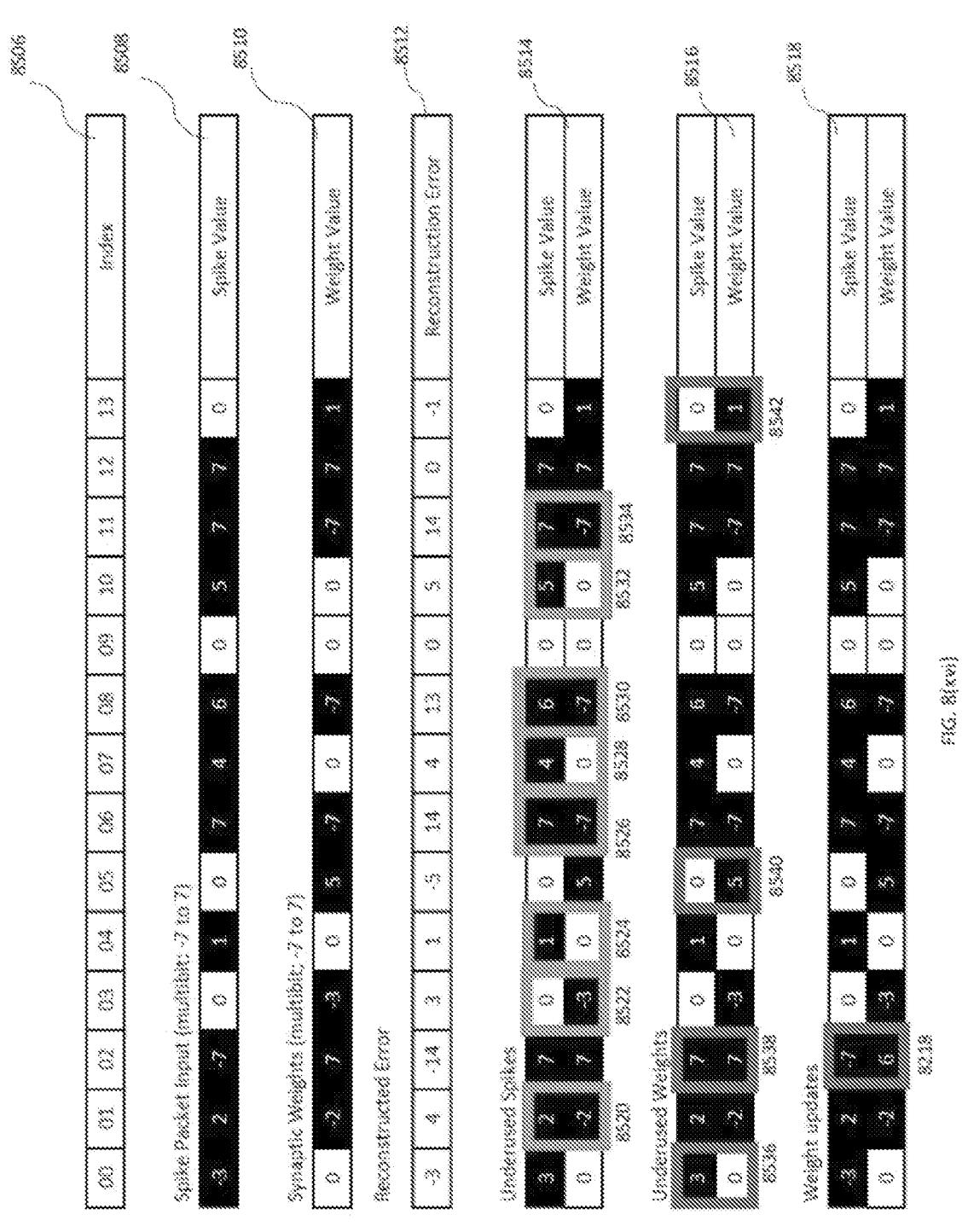
FIG. 8(xvi)

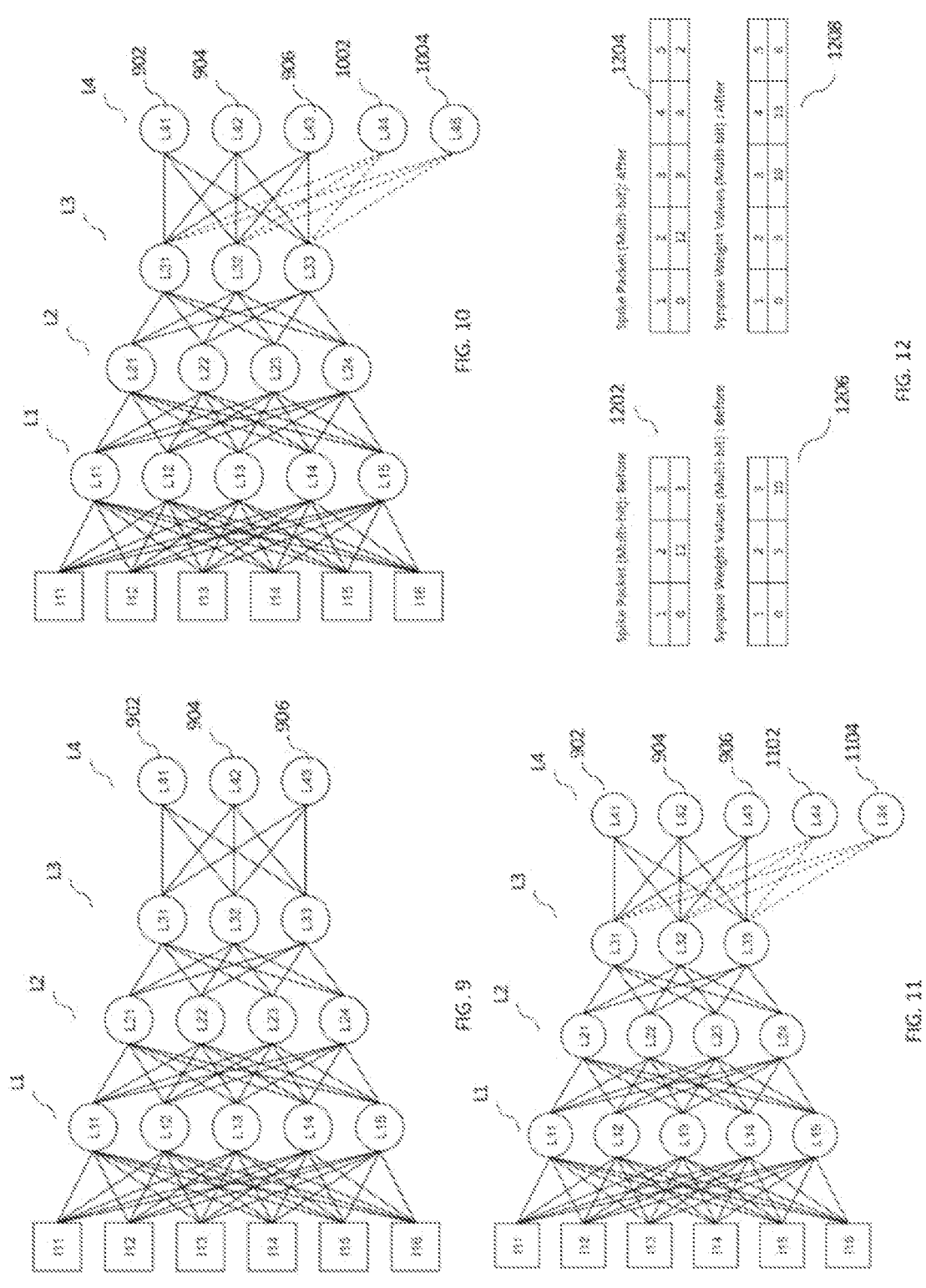

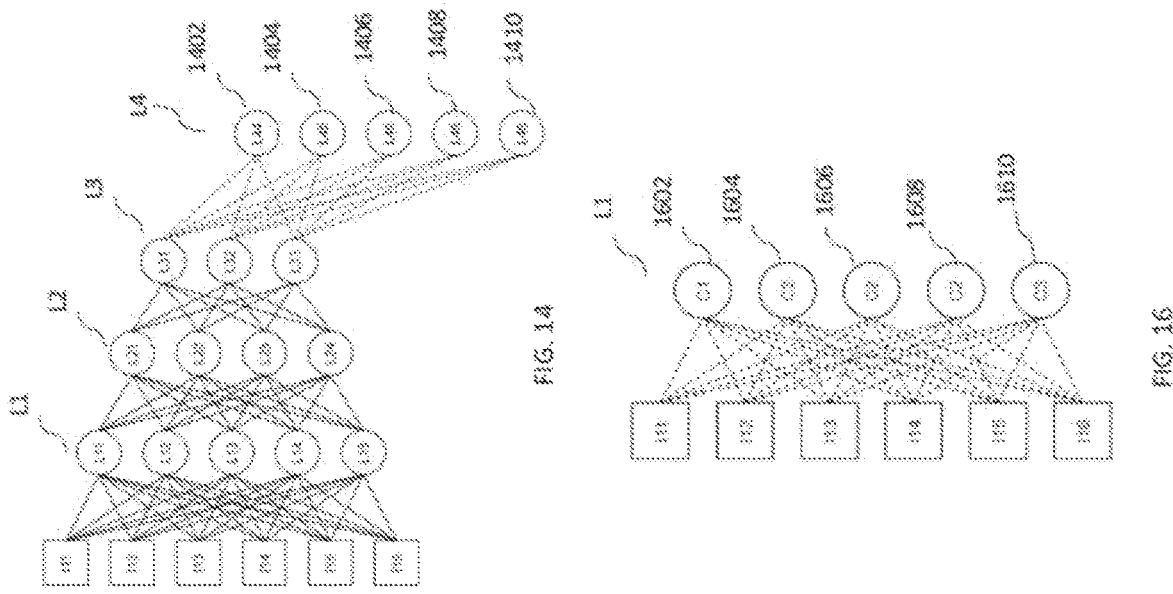
FIG. 14
FIG. 16
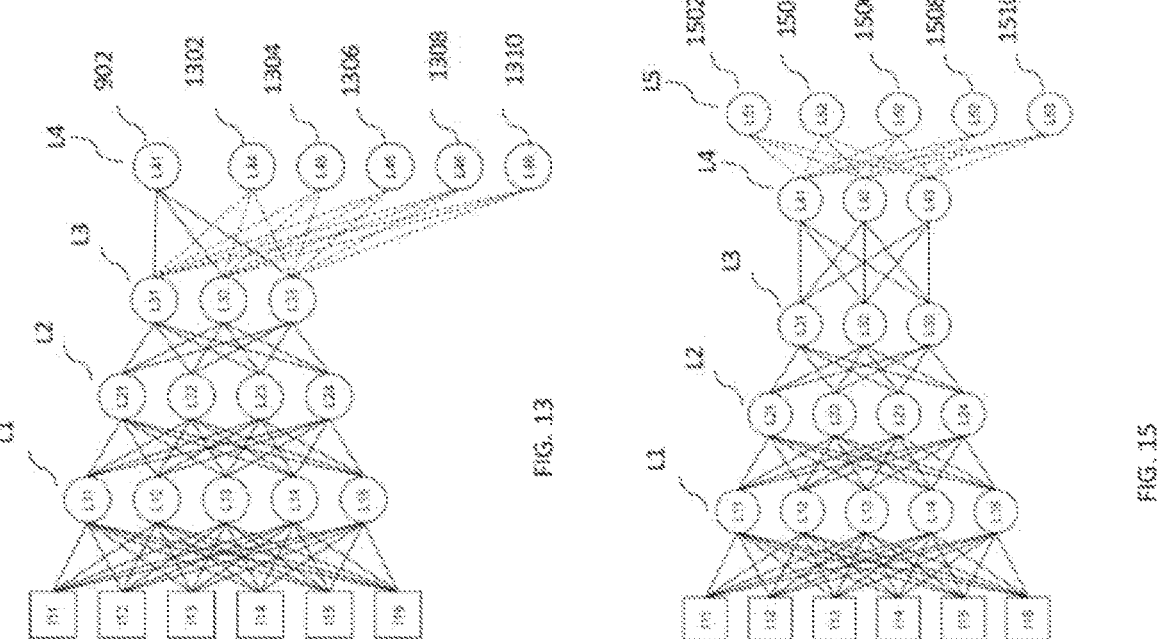
FIG. 13
FIG. 15

SPIKING NEURAL NETWORK

CROSS REFERENCE TO RELATED APPLICATIONS

This application claims the benefit under 35 U.S.C. § 119 of Australian Provisional No. 2021904165, filed Dec. 21, 2021, which is hereby incorporated by reference in its entirety.

FIELD

The present approach generally relates to neural circuit engineering and, more particularly, to a system and method for a low-power learning on artificial neural network.

BACKGROUND

It has long been a goal for artificial neural networks to replicate the function of the biological neural network (the brain), with limited success. Brute force hardware approaches to the design of an artificial neural network have been cumbersome and inadequate, and fall far short of the desired goal of replicating the functionality of the human brain. Thus, a need exists for an approach that enables a spiking neural network to be realized that can scale to very large networks, while rapidly making inferences from a wide variety of possible input data and/or sensor sources, and also allow user interventions to take place for updating an already trained spiking neural network.

SUMMARY

Provided herein are system, apparatus, article of manufacture, method and/or computer program product embodiments, and/or combinations and sub-combinations thereof, for an improved spiking neural network (SNN) configured to learn and perform unsupervised, semi supervised and supervised extraction of features from an input stream. Some embodiments include a neuromorphic system (e.g. a neuromorphic integrated circuit) comprising a spike converter, a reconfigurable neuron fabric, a memory, and a processor. The spike converter is configured to generate spikes from input data. The reconfigurable neuron fabric comprises a neural processor comprising a plurality of spiking neuron circuits. The spiking neuron circuits are configured to perform a task based on the spikes received from the spike converter and a neural network configuration. The memory comprises the neural network configuration which comprises a potential array and a plurality of synapses. The neural network configuration further defines connections between the plurality of spiking neuron circuits and the plurality of synapses. The processor is configured to modify the neural network configuration based on a plurality of configuration parameters.

Also described herein are embodiments for learning and performing unsupervised extraction of features from an input stream. Some embodiments operate to receive, at a plurality of spiking neuron circuits of a layer of neural network, a set of spike bits (1-bit or multi-bit) corresponding to a set of synapses. A first spike packet is received by a plurality of spiking neuron circuits of a layer of the neural network. In response, membrane potential associated with each of the spiking neuron circuit is determined by processing the spike packet and synaptic weight values of synapses associated with each spiking neuron circuit. Once the membrane potential is determined for each spiking neuron circuit of the layer, a winning spiking neuron circuit is selected, and synaptic weight value variation is performed by modifying one or more synaptic weight values of the synapses associated with the winning spiking neuron circuit. Subsequent spike packets are processed only once the synaptic weight values are varied. The winning neuron of a layer is determined synchronously, whereas the spiking of the spiking neuron circuits of the layer is performed asynchronously.

Also described herein are embodiments for learning and performing unsupervised extraction of features such that gradual learning of the spiking neural network is achieved by incrementing and/or decrementing multi-bit synaptic weight values of synapses associated with a winning neuron determined out of a plurality of spiking neuron circuits of a layer of a spiking neural network (refer embodiments with FIG. $8(iii)$-$8(vi)$; $8(viii)$-$8(xvi)$).

Also described herein are embodiments for learning and performing unsupervised extraction of features through collective learning by two or more spiking neuron circuits (winning spiking neuron circuit and one or more additional spiking neuron circuit) for each received spike packet (refer embodiments with FIG. $8(vii)$-$8(ix)$).

Also described herein are embodiments for learning and performing unsupervised extraction of features when either input values of a received spike packet or synaptic weight values of synapses associated with a spiking neuron circuit include one or more negative values (refer embodiments with FIG. $8(x)$-$8(xvi)$).

Also described herein are embodiments for learning and performing unsupervised extraction of features when a range of spike input values and synaptic weight values are different (refer embodiments with FIG. $8(x)$-$8(xv)$).

According to the invention there is provided a system, comprising: a neural processor configured to receive a modification request to modify a base neural network, having N layers and a plurality of spiking neurons, to implement a modified neural network, wherein the modification of the base neural network is performed such that the modified neural network includes one or more supplementary spiking neurons in the Nth or N+1th layer of the base neural network, and wherein the base neural network is trained using a plurality of spikes generated from a primary training data set; wherein the neural processor, for training the modified neural network, is configured to: receive a plurality of spikes generated from a secondary training data set and user input regarding the one or more supplementary spiking neurons which learn one or more features related to the secondary training data set, wherein the secondary training data set is different from the primary training data set; determine membrane potential values of one or more supplementary spiking neurons in the Nth or Nth+1 layer; select a supplementary spiking neuron from the one or more supplementary spiking neurons as a winning spiking neuron, while not considering the membrane potential value for at least one spiking neuron in the Nth or Nth+1 layer; and perform a learning function for the modified neural network by performing a synaptic weight value variation of synapses associated with the winning spiking neuron.

According to the invention there is provided a method, comprising: implementing a base neural network having N layers, wherein the value of N is at least two; training the base spiking neural network using a plurality of spikes generated from a primary training data set, modifying the base neural network by including one or more supplementary spiking neurons in the Nth or Nth+1 layer of the base neural network, in response to detecting a modification requirement to modify the base neural network to achieve a modified neural network; and training the modified neural network by: receiving a plurality of spikes generated from a secondary training data set and user input regarding one or more supplementary spiking neurons information which learn one or more features related to the secondary training data set, the secondary training data set being different from the primary training data set; selecting a supplementary spiking neuron in the Nth or Nth+1 layer of the modified neural network as a winning spiking neuron, while not considering the membrane potential value of at least one spiking neuron in the Nth or Nth+1 layer; and performing a learning function for the modified neural network by performing a synaptic weight value variation of synapses associated with the winning spiking neuron.

According to the invention there is provided a system, comprising: a spiking neural network, wherein the spiking neural network includes two or more spiking neurons in a last layer of the spiking neural network, the two or more spiking neurons representing a same class; wherein the neural processor, to train the spiking neural network, is configured to: receive a plurality of spikes generated from a training data set and user input regarding the two or more spiking neurons which learn features related to the training data set; determine membrane potential values of the two or more spiking neurons; select a spiking neuron from the two or more spiking neurons as a winning spiking neuron, while not considering the membrane potential value for at least one spiking neuron in the last layer; and implement a learning function for the spiking neural network by performing a synaptic weight value variation of synapses associated with the winning spiking neuron.

According to the invention there is provided a method, comprising: implementing a spiking neural network that includes two or more spiking neurons in a last layer, wherein the two more spiking neurons represent a same class; training the spiking neural network by: receiving a plurality of spikes generated from a training data set and user input regarding the two or more spiking neurons which learn features related to the training data set; selecting a spiking neuron of the two or more spiking neurons as a winning spiking neuron, while not considering the membrane potential value of at least one spiking neuron in the last layer; and implementing a learning function for the spiking neural network by performing synaptic weight value variation of synapses associated with the winning spiking neuron.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

FIG. 8(ii) illustrates how the learning function is implemented for a plurality of input instances for an SNN layer, according to some embodiments.

FIG. 8(iii) illustrates one instance of learning when an input spike packet (1-bit) is received by a postsynaptic neuron over a plurality of synapses, when each synapse is represented by a multi-bit (4-bit) synaptic weight value, according to some embodiments.

FIG. 8(iv) illustrates one instance of learning when a multi-bit (4-bit) input spike packet is received by a postsynaptic neuron over a plurality of synapses, when each synapse is represented by a multi-bit (4-bit) synaptic weight value, according to some embodiments.

FIG. 8(vi) illustrates one instance of learning when a multi-bit (4-bit) input spike packet is received by a postsynaptic neuron over a plurality of synapses, when each synapse is represented by a multi-bit (4-bit) synaptic weight value, according to some embodiments.

FIG. 8(vii) illustrates one instance of learning when an input spike packet (1-bit) is received by a postsynaptic neuron over a plurality of synapses, when each synapse is represented by a 1-bit synaptic weight value, according to some embodiments.

FIG. 8(viii) illustrates one instance of learning when an input spike packet (1-bit) is received by a postsynaptic neuron over a plurality of synapses, when each synapse is represented by a multi-bit (4-bit) synaptic weight value, according to some embodiments.

FIG. 8(ix) illustrates one instance of learning when a multi-bit (4-bit) input spike packet is received by a postsynaptic neuron over a plurality of synapses, when each synapse is represented by a multi-bit (4-bit) synaptic weight value, according to some embodiments.

FIG. 8(xi) illustrates one instance of learning when a 1-bit input spike packet is received by a postsynaptic neuron over a plurality of synapses, when each synapse is represented by a multi-bit (2-bit) synaptic weight value that can have a positive, a negative and a zero value, according to some embodiments.

FIG. 8(xii) illustrates one instance of learning when a 1-bit input spike packet is received by a postsynaptic neuron over a plurality of synapses, when each synapse is represented by a multi-bit (4-bit) synaptic weight value that can have a positive, a negative and a zero value, according to some embodiments.

FIG. 8(xiii) illustrates one instance of learning when a 1-bit input spike packet is received by a postsynaptic neuron over a plurality of synapses, when each synapse is represented by a multi-bit (4-bit) synaptic weight value that can have a positive, a negative and a zero value, according to some embodiments.

FIG. 8(xiv) illustrates one instance of learning when a multi-bit (4-bit) input spike packet is received by a postsynaptic neuron over a plurality of synapses, when each synapse is represented by a multi-bit (4-bit) synaptic weight value that can have a positive and a zero value, according to some embodiments.

FIG. 8(xv) illustrates one instance of learning when a multi-bit (4-bit) input spike packet is received by a postsynaptic neuron over a plurality of synapses, when each synapse is represented by a multi-bit (4-bit) synaptic weight value, when both the multi-bit input and synaptic weight value can have a positive, a negative and a zero value, according to some embodiments.

FIG. 8(xvi) illustrates one instance of learning when a multi-bit (4-bit) input spike packet is received by a postsynaptic neuron over a plurality of synapses, when each synapse is represented by a multi-bit (4-bit) synaptic weight value, when both the multi-bit input and synaptic weight value can have a positive, a negative and a zero value, according to some embodiments.

FIG. 9 illustrates a base spiking neural network as an example that is implemented and trained using the embodiments of the invention or any other techniques known in the art.

FIGS. 10-11 and 13-15 illustrate examples of modified neural networks, which are implemented by modifying a base spiking neural network shown in FIG. 9.

FIG. 12 illustrates change in packetizing of activations/ spike values for a spiking neuron circuit of a layer in which supplementary spiking neuron circuit(s) is (are) included.

FIG. 16 illustrates one example of a spiking neural network which is implemented from scratch using a multi-shot learning technique.

In the drawings, like reference numbers generally indicate identical or similar elements.

DETAILED DESCRIPTION

Provided herein are system, apparatus, device, method and/or computer program product embodiments, and/or combinations and sub-combinations thereof for an improved spiking neural network (SNN) configured to learn and perform unsupervised, semi-supervised, and supervised extraction of features from an input stream. Embodiments herein include a stand-alone neuromorphic system (e.g., an integrated circuit or cloud/server) providing an improved SNN. The neuromorphic system implemented on a neuromorphic integrated circuit provides several benefits. First, the neuromorphic integrated circuit is compact in size. For example, the neuromorphic integrated circuit integrates on a silicon die a processor complex, one or more sensor interfaces, one or more data interfaces, spike converters, and a memory. This enables efficient use of the silicon area in hardware implementations. Second, the neuromorphic integrated circuit can be reprogrammed for many different tasks using a user defined configuration file. For example, the connections between layers and neural processors in the neuromorphic integrated circuit can be reprogrammed using a user defined configuration file. Third, the neuromorphic integrated circuit provides low latency output. Finally, the neuromorphic integrated circuit also consumes a low amount of power consumption. For example, the neuromorphic integrated circuit can consume two orders of magnitude less power than a comparable artificial neural network (ANN) when performing the same task.

The general description and problems associated with ANNs, CNNs, conventional SNNs, are discussed in U.S. Ser. No. 16/670,368, which is assigned to Brainchip Inc. Thus, for the sake of brevity, such general description and problems associated with ANNs, CNNs, conventional SNNs are not discussed again in detail here.

Figure 1:
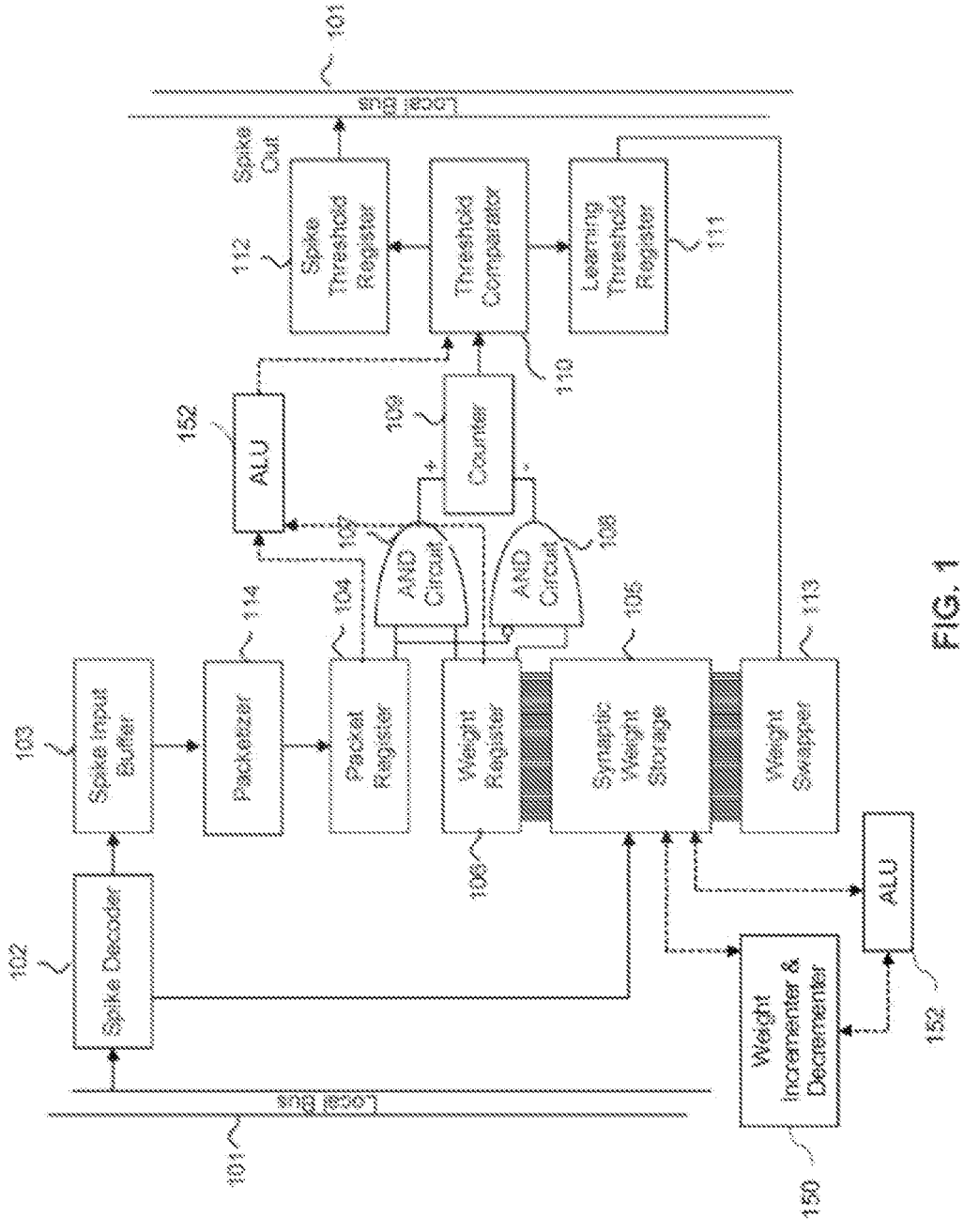
FIG. 1 is a block diagram of a neural model, according to some embodiments.

FIG. 1 is a block diagram of a neural network model, according to some embodiments. In FIG. 1, spikes can be communicated over a local bus 101. For example, local bus 101 can be a network on a chip (NoC) bus. The spikes can be communicated in the form of network packets. A network packet can contain one or more spikes and a code indicating origin and destination addresses.

In FIG. 1, spike decoder 102 can decode spikes in the network packets.

In one embodiment, the spike decoder 102 receives input spikes with its corresponding reference information. For example, when the spikes are related to a color image, it would include value information, and its corresponding reference information such as position information (x, y) and channel information (e.g., R, G, B). The spike decoder 102 is configured to strip the position information and channel information and only use the value information to form a dense representation and send a spike (dense spike) to the spike decoder circuit 102.

In another embodiment, the spike decoder uses all the received information in form of a sparse presentation and send a spike (sparse spike) to the spike decoder circuit 102.

The spike decoder circuit 102 can send a spike (dense spike or a sparse spike) to a specific spiking neuron circuit based on an origin address in the network packet. For example, spike decoder circuit 102 can store the spike in the spike input buffer 103 of the corresponding spiking neuron circuit. Spike decoder circuit 102 can also store in the spike input buffer 103 of the corresponding neuron circuit the address where the bit is going to finish up at.

Spike input buffer 103 can store one or more spikes. A '1' bit can represent the presence of a spike and a zero bit can represent the absence of a spike. Spike input buffer 103 can also contain an address where a bit is going to finish up at.

In FIG. 1, packetizer 114 can sort the spikes in spike input buffer 103 into one or more spike packets. A spike packet can be stored in packet register 104. For example, in the case where a spiking neuron circuit has 1024 synapses, packet register 104 can be 1024 bits long. Packetizer 114 can sort the bits in spike input buffer 103 into the correct positions along the 1024 bit packet register 104. This sorting process is further described in FIG. 6.

In FIG. 1, synaptic weight values can be stored in synaptic weight storage 105. In some embodiments, synaptic weight storage 105 can be implemented using static random-access memory (SRAM). As would be appreciated by a person of ordinary skill in the art, synaptic weight storage 105 can be implemented using various other memory technologies.

Synaptic weight values in synaptic weight storage 105 can be positive or negative. In some embodiments, synaptic weight values in synaptic weight storage 105 can be transferred into weights register 106 for processing.

In some embodiments, a membrane potential value of a neuron is determined using: 1. AND circuits 107 and 108 and counter 109; or an arithmetic logic unit (ALU) 152.

In some embodiments, synaptic weight value variations are performed using: 1. weight swapper 113 or 2. weight incremeter and decrementer 150 and optionally using ALU 152.

In some embodiments, rather than having the ALU, a state table having all needed calculations in the memory is used to perform computation, needed to determine membrane potential value or to perform synaptic weight value variation.

In some embodiments, the positive synaptic weight values in weights register 106 can be ANDed in logical AND circuit 107 with corresponding bits in packet register 104. The resulting output of logical AND circuit 107 can increment counter 109 for each positive result of the AND function. Counter 109 can represent the membrane potential value of a neuron.

The negative synaptic weight values in the weights register 106 can be ANDed in logical AND circuit 108 with corresponding bits in packet register 104. The resulting output of logical AND circuit 108 can decrement the counter 109. This process can be continued until all bits in packet register 104 have been processed.

After all bits in packet register 104 have been processed, counter 109 can contain a value that is representative of the number of bits in packet register 104 that correspond to positive and negative synaptic weight values in weights register 106. The value in counter 109 can be compared to at least one threshold using threshold comparator 110.

In some embodiments, threshold comparator 110 can compare the value in counter 109 to two thresholds. For example, threshold comparator circuit 110 can compare the value in counter 109 to a value in learning threshold register 111 and a value in spiking threshold register 112.

Figure 8:
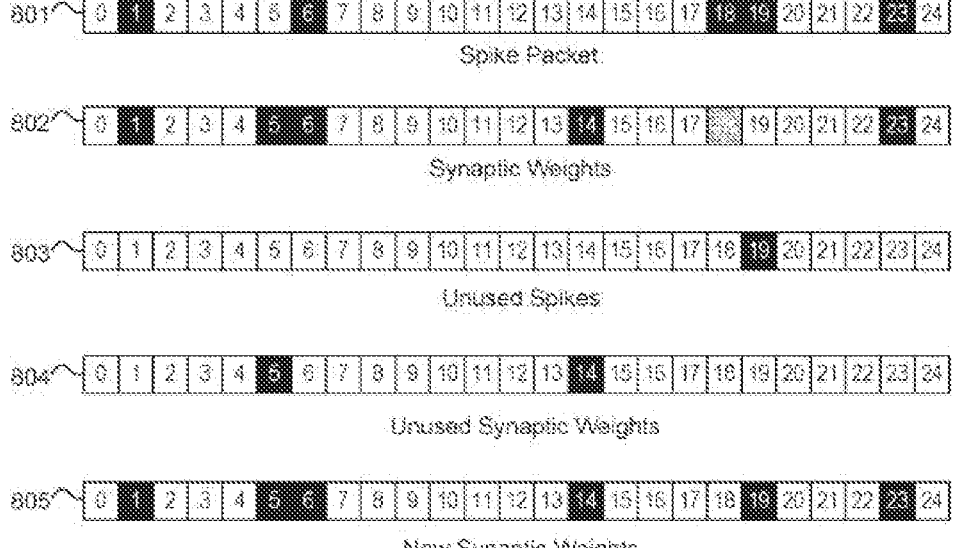
FIG. 8 illustrates a weight swapping step of the Learning method, according to some embodiments.

In some embodiments, the value in learning threshold register 111 can initially be set to a low value to allow the neuron to learn. During the learning process, synaptic weights can be assigned to incoming spikes using weight swapper 113. This process is illustrated in FIG. 8. In some embodiments, as the neuron learns, the value in the counter 109 increases, and the value in learning threshold register 111 increases as well. This process can continue until the neuron presents a strong response to a specific learned pattern.

Figure 2A:
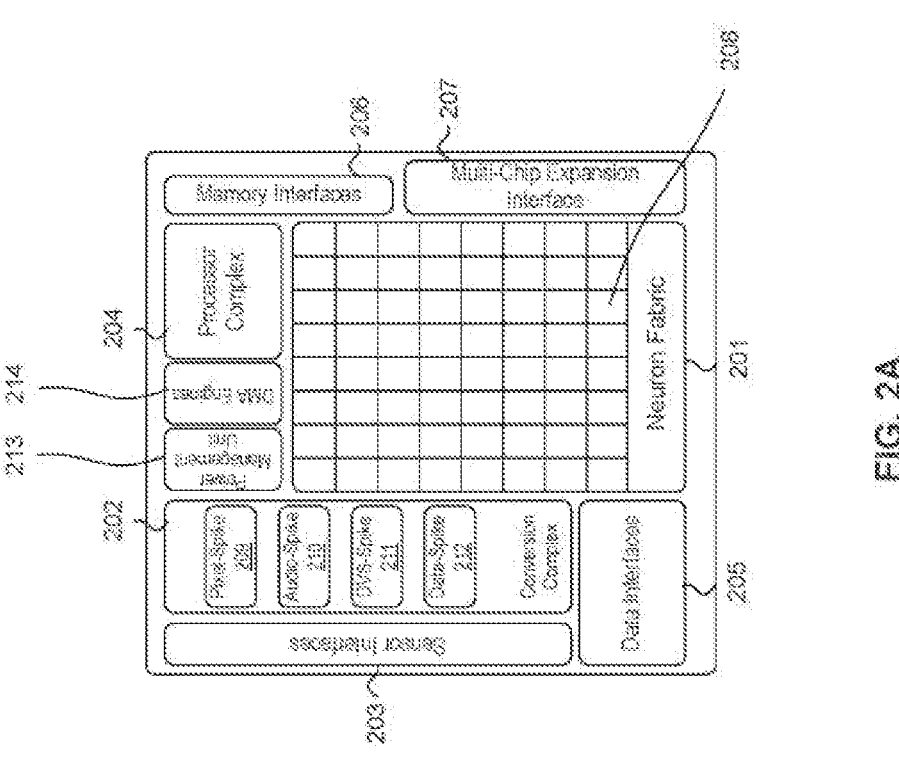
FIG. 2A is a block diagram of a neuromorphic integrated circuit, according to some embodiments.

FIG. 2A is a block diagram of a neuromorphic integrated circuit 200, according to some embodiments. Neuromorphic integrated circuit 200 can include a neuron fabric 201, a conversion complex 202, sensor interfaces 203, a processor complex 204, one or more data interfaces 205, one or more memory interfaces 206, a multi-chip expansion interface 207 that can provide a high-speed chip-to-chip interface, a power management unit 213, and one or more Direct Memory Access (DMA) engines 214.

In some embodiments, neuron fabric 201 can include a plurality of reconfigurable neural processors 208. A neural processor 208 can include a plurality of neurons. For example, a neural processor 208 can include a plurality of spiking neuron circuits and a plurality of synapses. As discussed above, a spiking neuron circuit can be implemented using an input spike buffer 103, packetizer 114, packet register 104, logical AND circuit 107, logical AND circuit 108, counter 109, threshold comparator 110, learning threshold value 111, spiking threshold value 112. The plurality of synapses can implement using weights register 106, synaptic weight storage 105, and weight swapper 113. Each neural processor 208 can include a plurality of reprogrammable spiking neuron circuits that can be connected to any part of neural fabric 201.

In some embodiments, conversion complex 202 can include one or more of a pixel to spike converter 209, an audio to spike converter 210, a Dynamic Vision Sensor (DVS) to spike converter 211, and a data to spike converter 212. Pixel to spike converter 209 can convert images to spike events.

In some embodiments, sensor interfaces 203 can include one or more interfaces for pixel data, audio data, analog data, and digital data. Sensor interfaces 203 can also include an AER interface for DVS pixel data.

In some embodiments, processor complex 204 can include at least one programmable processor core, a memory, and input-output peripherals. Processor complex 204 can be implemented on the same die as neuromorphic integrated circuit 200.

In some embodiments, data interfaces 205 can include one or more interfaces for input and output peripherals. The one or more interfaces can use a Peripheral Component Interconnect Express (PCIe) bus standard, a Universal Serial Bus (USB) bus standard, the Ethernet bus standard, a Controller Area Network (CAN) bus standard, and a Universal Asynchronous Receiver and Transmitter (UART) for transmitting and receiving serial data.

In some embodiments, memory interfaces 206 can include one or more interfaces for dynamic random access memory (RAM) expansion. The one or more interfaces can use a double data rate synchronous dynamic random-access memory (DDR SDRAM) standard. For example, the one or more interfaces can use a DDR3 or DDR4 standard.

In some embodiments, multi-chip expansion interface 207 can carry spike information to enable an expansion of neural fabric 201 to multiple chips. Multi-chip expansion interface 207 can carry spike information using address event representation (AER). AER is a standard for transmitting spike events over a system bus. The address of a specific neuron that spikes at the time that the spike occurs is transmitted.

In some embodiments, neuromorphic integrated circuit 200 can take spike information as input and produce AER spike events as outputs. In addition to outputting the spikes from the last layer of the SCNN, AER spike events can also transmit the membrane potential values for each spiking neuron circuit.

In some embodiments, neural fabric 201 can process spikes in a feed-forward manner. Spikes can be sent between layers using AER format data. Each layer can have an input spike buffer (e.g., input spike buffer 103) that converts spikes stored in the input spike buffer to a set of spike packets. Every layer can process all spikes in an input spike buffer completely before sending its output spikes to the next layer.

Figure 2B:
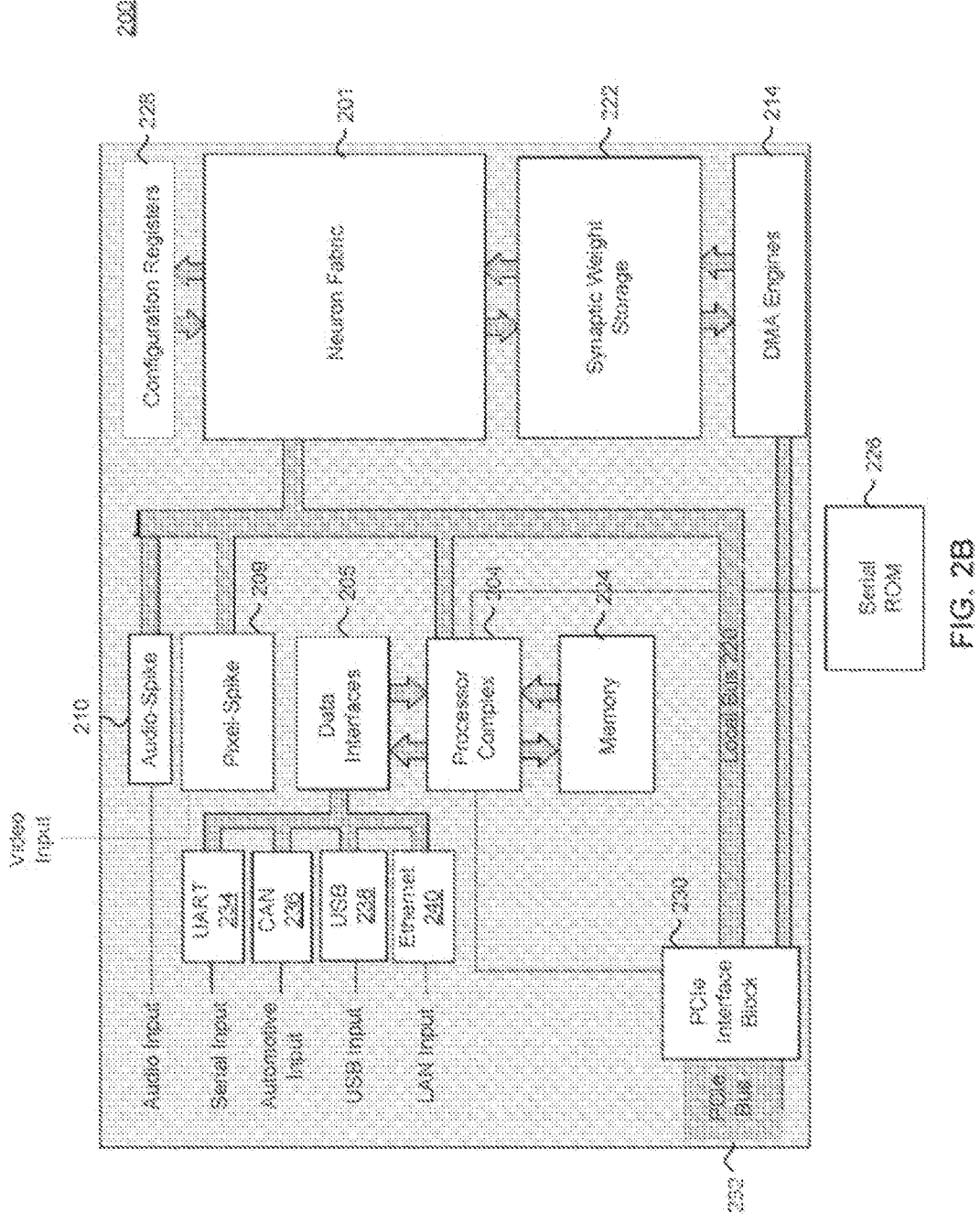
FIG. 2B is a block diagram of the neuromorphic integrated circuit in FIG. 2A, according to some embodiments.

FIG. 2B is another block diagram of the neuromorphic integrated circuit 200 in FIG. 2A, according to some embodiments. FIG. 2B illustrates the interconnection of the components of the neuromorphic integrated circuit 200 using a local bus 220 (e.g., a NoC bus). In FIG. 2B, neuromorphic integrated circuit 200 can include neuron fabric 201, processor complex 204, one or more data interfaces 205, pixel to spike converter 209, audio to spike converter 210, and DMA engines 214, as illustrated in FIG. 2A. Neuromorphic integrated circuit 200 can also include synaptic weight storage 222, memory 224, serial read-only memory (ROM) 226, configuration register 228, PCIe interface block 230, PCIe bus 232, UART interface 234, CAN interface 236, USB interface 238, and Ethernet interface 240.

In some embodiments, synaptic weight storage 222 can be equivalent to synaptic weight storage 105 in FIG. 1. Synaptic weight storage 222 can connect to neuron fabric 201. Synaptic weight storage 222 can store the weights of all synapses and the membrane potential values of all spiking neuron circuits. Synaptic weight storage 222 can be accessed externally through one or more DMA engines 214 from PCIe interface block 230 which can connect to PCIe bus 232.

In some embodiments, configuration registers 228 can connect to neuron fabric 201. During the initialization of neuron fabric 201, processor complex 204 can read serial ROM 226 and configure neuron fabric 201 for an externally defined function by writing values to configuration registers 228 and synaptic weight storage 222.

In some embodiments, processor complex 204 is available externally through PCIe interface 230. A program can be stored in memory 224. The program can determine the function of UART interface 234, CAN interface 236, USB interface 238, and Ethernet interface 240. One or more of these interfaces can deliver data to be processed by neuron fabric 201, processor complex 204, or both.

In some embodiments, the memory 224 may communicate via a bus. The memory 224 may include or be coupled to, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 224 may include a cache or random-access memory for a processor. In alternative examples, the memory 224 is separate from the processor, such as a cache memory of a processor, the system memory, or other memory. The memory 224 may be an external storage device or database for storing data. The memory 224 may be operable to store instructions executable by the processor. The functions, acts or tasks illustrated in the figures or described may be performed by the programmed processor for executing the instructions stored in the memory 224. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

In some embodiments, the present invention also contemplates a computer-readable medium that includes instructions or receives and executes instructions responsive to a propagated signal. Further, the instructions may be transmitted or received over the network via a communication port or interface or using a bus. The communication port or interface may be a part of the one or more processors or may be a separate component. The communication port may be created in software or may be a physical connection in hardware.

Audio to spike converter 210 can deliver spikes directly onto local bus 220 to be processed by neuron fabric 201. Pixel to spike converter 209 can connect to an external image sensor and converts pixel information to spike packets, which are distributed on the local bus 220 for processing by neuron fabric 201. Processed spikes can be packetized (e.g., inserted into network packets) and placed on the local bus 220.

Figure 3:
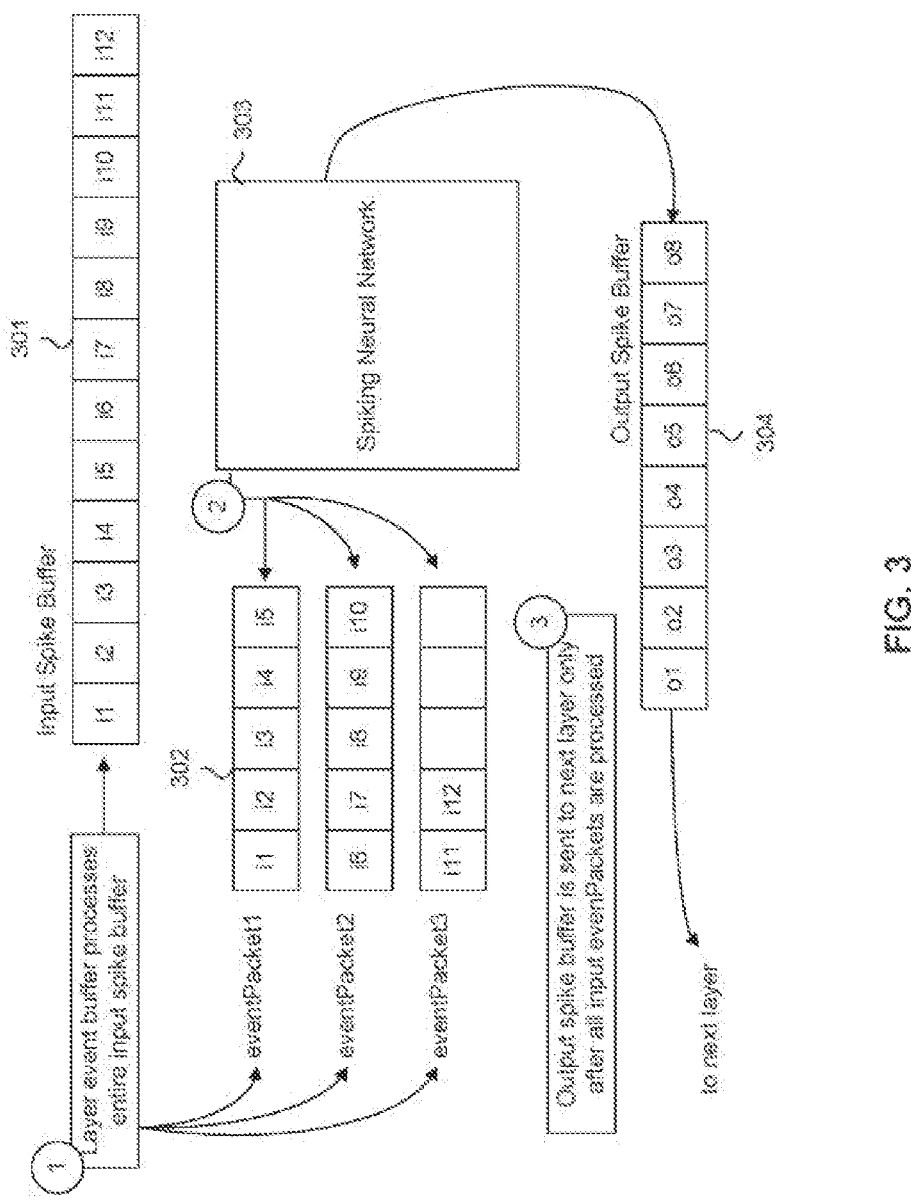
FIG. 3 is a flow diagram of input spike buffering, packetizing, and output spike buffering for a next layer, according to some embodiments.

FIG. 3 is a flow diagram of input spike buffering, packetizing, and output spike buffering for a next layer, according to some embodiments. FIG. 3 includes an input spike buffer 301, one or more spike packets 302, a neuron fabric 303, and an output spike buffer 304. In FIG. 3, spikes in input spike buffer 301 can be sorted into one or more spike packets 302 for specific neurons (e.g., spiking neuron circuits) in neuron fabric 303. After processing in neuron fabric 303, any resulting spikes can be stored in output spike buffer 304 which is sent to the subsequent layer. The resulting spikes in output spike buffer 304 can be packetized for processing by the subsequent layer.

In some embodiments, a layer in neuron fabric 303 can process the entire input spike buffer 301. The layer can process each spike packet 302 sequentially. The resulting output spikes can be placed in output spike buffer 304. Output spike buffer 304 may not be sent to the next layer for processing until all spike packets 302 have been processed. In some embodiments, all layers of neuron fabric 303 can follow this workflow.

In some embodiments, neuron fabric 303 can process many spikes at a same time. In some embodiments, different spike buffer types can be used for layers in neuron fabric 303. The type of spike input buffer can depend on the nature of the input data. The difference between spike buffer types can lie in how they generate spike packets from the input spike buffer 301.

In some embodiments, a packetizing buffer type can be used to process continuous or ongoing types of data (e.g., a stream of spikes generated by a DVS camera). A user can configure different layers of neuron fabric 303 to use this buffer type. A packetizing buffer type can enable the processing of many spikes, either one at a time or in very large bursts. A packetizing buffer can store spikes in the order they are received until the number of spikes reaches a size defined by a parameter (e.g., a packet size) specified in a configuration file (e.g., a YAML file). Once the packetizing buffer reaches the size, a spike packet can be passed to the neural fabric 303 for processing. The packetizing buffer can then be cleared. The packetizing buffer can then continue to store spikes.

In some embodiments, a flushing buffer type can be used to process data in the form of a defined size (e.g., traditional video image frames or defined sets of values). For example, a video frame can have a defined size such as 640 by 480 pixels. In this case, however, many spikes sent at once may be immediately sent for processing as a single packet. The spike packets can be different lengths.

In some embodiments, each layer type can implement a function which processes the entire spike input buffer (e.g., spike input buffer 301) by first generating packets from the spike input buffer. After the entire spike input buffer has been packetized, this function can process all spike packets. This function can then delete the processed spike packet and push the output spikes from the spike packet to the output spike buffer (e.g., output spike buffer 304). This function can then get the next spike packet to process. The difference between buffer types can lie in how they generate spike packets from the input spike buffer.

Figure 4:
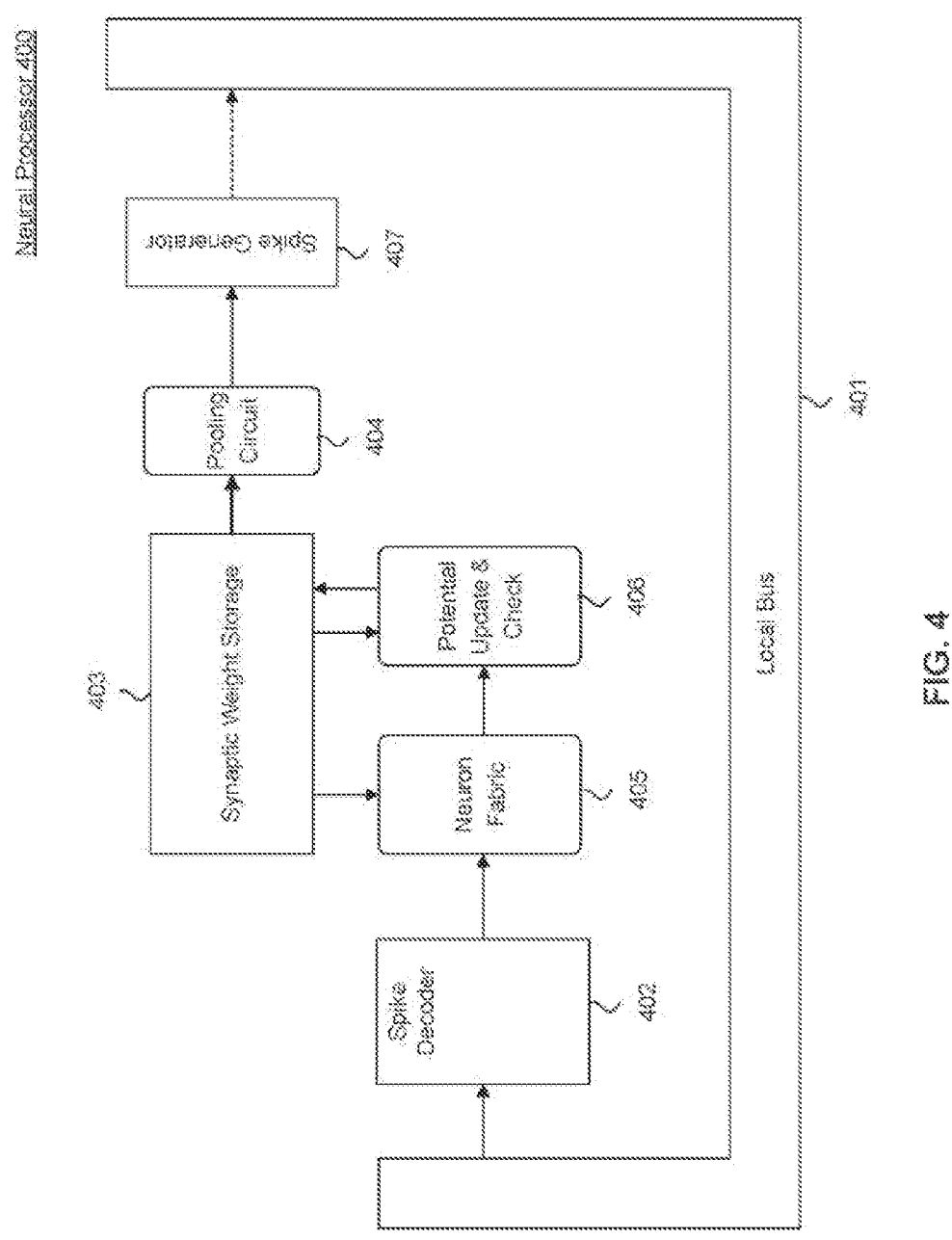
FIG. 4 is a block diagram of a neural processor configured as a spiking convolutional neural processor, according to some embodiments.

FIG. 4 is a block diagram of a neural processor 400 configured as a spiking convolutional neural processor, according to some embodiments. The neural processor 400 can include a network on a local bus 401 (e.g., a NoC bus), a spike decoder 402, a synaptic weight storage 403, a neuron position generator, a pooling circuit 404, a neuron fabric 405, a potential update and check circuit 406, and a spike generator 407. Neuron fabric 405 can be equivalent to neuron fabric 201 in FIG. 2. Synaptic weight storage 403 can store synaptic weight values and membrane potential values for neurons (e.g., potential array). Pooling circuit 404 can perform a max pooling operation, average pooling operation, or other type of pooling operation as would be appreciated by a person of ordinary skill in the art. One to many spike generator circuit 407 can generate spike packets which can be transmitted one to many across local bus 401.

Figure 5:
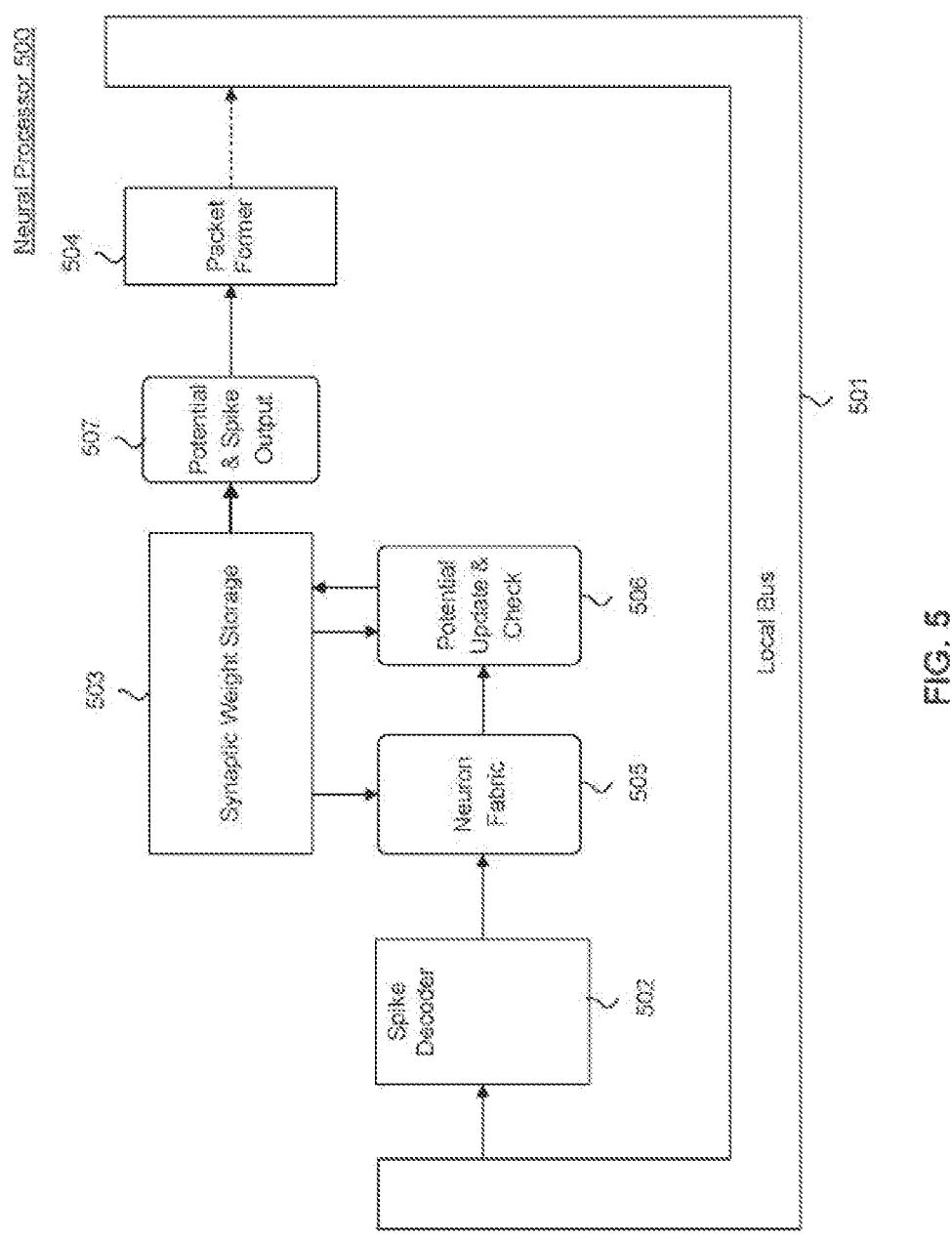
FIG. 5 is a block diagram of a neural processor configured as a spiking fully connected neural processor, according to some embodiments.

FIG. 5 is a block diagram of a neural processor 500 configured as a spiking fully connected neural processor, according to some embodiments. The neural processor 500 includes a local bus 501 (e.g., a NoC bus), a spike decoder 502, a synaptic weight storage 503, a neuron position generator, a packet former 504, a neuron fabric 505, a potential update and check circuit 506, and a potential and spike output circuit 507. Neuron fabric 505 can be equivalent to neuron fabric 201 in FIG. 2. Synaptic weight storage 503 can store synaptic weight values and membrane potential values for neurons (e.g., potential array). In FIG. 5, spikes can be received into a spike input buffer and distributed as spike packets using spiking decoder 502.

In some embodiments, synapse weights can be tertiary weights. These tertiary synapse weights can be 2-bit wide. These 2-bit wide synapse weights can include both positive and negative values. This is different than conventional SNNs. Positive values in the 2-bit wide synapse weights can increase a membrane potential value of a neuron. Negative values in the 2-bit wide synapse weights can decrease a membrane potential value of a neuron.

In some embodiments, spikes in a spike packet can be distributed according to their synapse destination numbers. In some embodiments, during processing, the tertiary synaptic weights are logical ANDed with the spikes represented in the spike packet. The spikes in a spike packet can be represented using positive spike bits. The absence of a spike in a spike packet can be represented using a zero. Synaptic weights can be negative or positive. A negative synaptic weight can decrement counter 109 (e.g., membrane potential register) of the neuron. A positive synaptic weight can increment counter 109 (e.g., membrane potential register) of the neuron.

In some embodiments, a learning process can be implemented by examining an input when a learning threshold value of the neuron is reached (e.g., a value in learning threshold register 111). The learning threshold value of the neuron can be initially set to a very low value. The learning threshold value can increase as the neuron learns and more synaptic weights are matched. In some embodiments, the learning process may involve the swapping of unused synaptic weights (e.g., a positive synaptic weight in a location where no spike has occurred) and unused spikes (e.g., a spike in the spike packet that is in a position relative to a synaptic weight having a value of zero). The unused synaptic weights can be swapped to locations containing unused spikes.

In some embodiments, if the neuron membrane potential value (e.g., represented by counter 109) exceeds a spiking threshold value (e.g., a value in spiking threshold register 112) then a spike is generated. The spike is placed on the local bus.

Figure 6A:
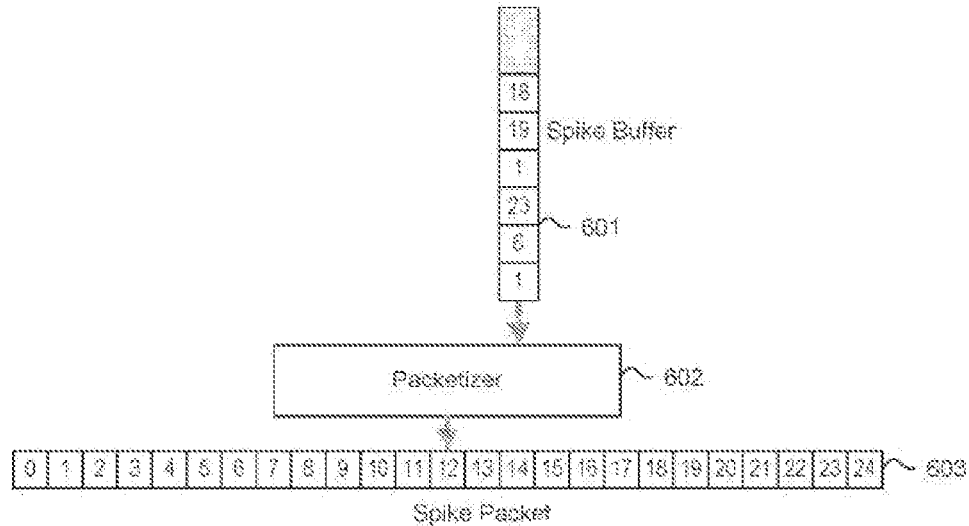
FIG. 6A is an example of packetizing spikes into a spike packet, according to some embodiments.

FIG. 6A is an example of packetizing spikes into a spike packet, according to some embodiments. In FIG. 6A, spike input buffer 601 (e.g., equivalent to spike input buffer 103)

receives spikes from a local bus that have been processed by a spike decoding circuit. Packetizer 602 can sort the spikes in the spike input buffer 601 into a spike packet 603 according to the spikes' synapse index numbers. For example, in FIG. 6A, the spike sequence that is received is 1,6,23,1,19,18. As would be appreciated by a person of ordinary skill in the art, the spike sequence may be much larger than the small number of spikes shown in FIG. 6A. For example, the spike sequence can include thousands of spikes that are distributed to a multitude of synapses.

Figure 6B:
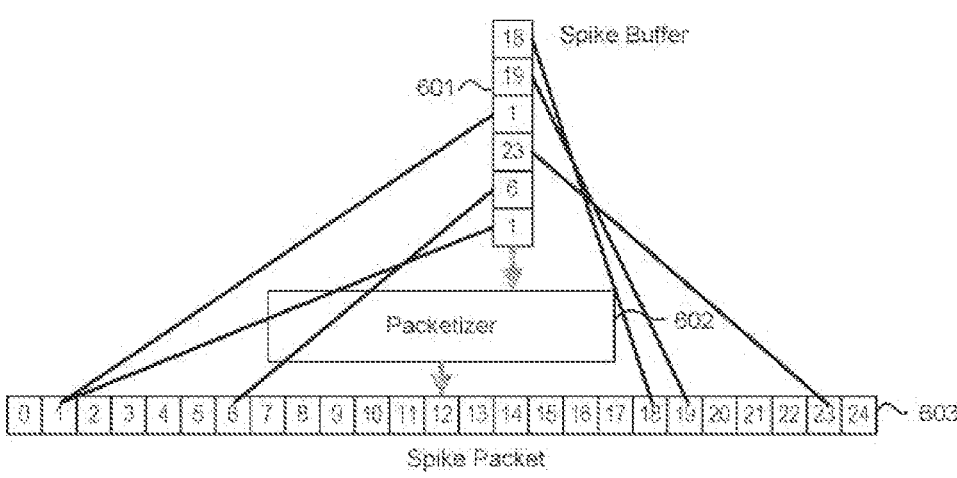
FIG. 6B is an example representation of a spike packet in FIG. 6A, according to some embodiments.

FIG. 6B is an example representation of spike packet 603 in FIG. 6A, according to some embodiments. In FIG. 6B, spike packet 603 contains the sorted spikes from spike input buffer 601. In spike packet 603, positions 1, 6, 18, 19, and 23 are highlighted indicating they contain logic '1' values. The remaining positions within spike packet 603 contain zeros (e.g., indicating the absence of a spike).

In some embodiments, spikes can be organized in the same order as the synapse weights are located in memory (e.g., synaptic weight storage 105). This can make it possible to perform AND operations between the synaptic weight values and the spikes in the incoming spike packets to determine if the membrane potential counter (e.g., counter 109) is incremented or decremented. When a spike occurs at a position where the synaptic weight value is zero the counter is not changed for that bit position.

Figure 7:
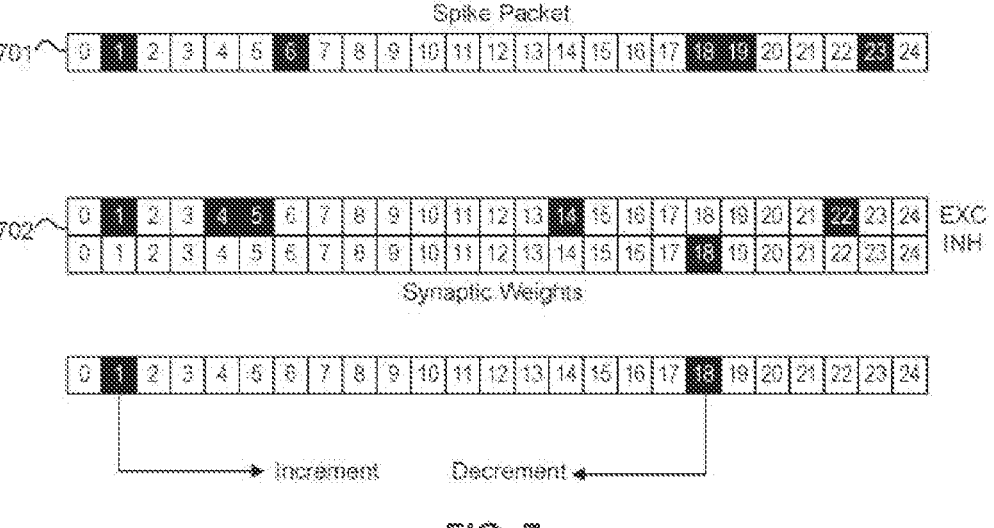
FIG. 7 is an example of a method of selecting which bits increment or decrement a membrane potential counter, according to some embodiments.

FIG. 7 is an example of a method of selecting whether the membrane potential value (e.g., counter 109) is incremented or decremented, according to some embodiments. In FIG. 7, a logical AND operation is performed between spike packet 701 and weights register 702 (e.g., weight register 702 is equivalent to weight register 106). In FIG. 7, spike bits 1, 6, 18, 19, and 23 of spike packet 701 are highlighted indicating they contain logic '1' values (e.g., indicating the presence of a spike). The remaining positions within spike packet 701 contain zeros (e.g., indicating the absence of a spike).

Weight register 702 can contains logic bits that indicate either positive or negative values. In FIG. 7, bits 1, 4, 5, 14, and 22 contain positive values while bit 18 contains a negative value. Positive values can indicate an excitatory action while negative values can indicate an inhibitory action. The bits in weight register 702 can be labeled EXC for excitatory and INH for inhibitory weights. A logical AND is performed between the bits in weight register 702 and the bits in spike packet 701. The spike that occurred in position 1 therefore increment the membrane potential value (e.g., counter 109) of the neuron. In contrast, the spike that occurred in position 18 decrements the membrane potential value (e.g., counter 109) of the neuron.

FIG. 7 is an example of a learning method, according to some embodiments. In learning, spikes that contribute to an output event/spike can have their representative synaptic weights strengthened while spikes that did not contribute to an output event/spike can have their synaptic weights weakened.

In some embodiments, the Learning method is modified such that unused synaptic weights are swapped to locations contained unused spikes. For example, synaptic weights that are zero, and received a spike, are swapped with synaptic weights that are logic '1' and did not receive any spike.

In some embodiments, when a logical AND operation is performed on a spike bit in the spike packet that is '1' and a synaptic weight that is zero, the result is a zero. This can be referred to as an 'unused spike.' When a logical AND operation is performed on a spike bit in the spike packet that is '0' and a synaptic weight that is '1', the result is zero. This can be referred to as an 'unused synaptic weight'. The learning circuit (e.g., weight swapper 113) can swap random selected unused synaptic weights where unused spikes occur.

In FIG. 7, position 1 in spike packet 701 contains a used spike. Position 1 in synaptic weights 702 contains a used weight. This can result in an increment of the membrane potential value (e.g., counter 109) of the neuron.

Positions 4 and 5 of synaptic weights 702 contain unused synaptic weights. These synaptic weights are candidates for swapping. Position 6 of spike packet 701 contains an unused spike. In other words, position 6 of spike packet 701 contains 1 but position 6 of synaptic weights 702 contains a zero. An unused synaptic weight can be swapped to this position. Position 14 of synaptic weights 702 contains an unused synaptic weight. Position 18 of spike packet 701 contains a used spike and position 18 of synaptic weights 702 contains a used synaptic weight (in this case inhibitory). This can result in a decrement of the membrane potential value (e.g., counter 109) of the neuron. Position 19 of spike packet 701 contains an unused spike. Position 22 of synaptic weights 702 contains an unused synaptic weight. Position 23 of spike packet 701 contains an unused spike.

This Learning method is inspired by the learning that takes place in the biological brain. In some embodiments, a modified form of the learning method is used to perform learning. This modified method is similar to the mechanism by which biological neurons learn.

In some embodiments, a spiking neuron circuit emits a spike when its inputs drive its membrane potential value (e.g., counter 109) up to a threshold value. This can mean that when the neuron is driven to the threshold value and generates a spike, connections from its recently activated inputs are strengthened, while a number of its other connections are weakened. This can result in neurons learning to respond to patterns of inputs that they see repeatedly, thereby autonomously learning the features that characterize an input dataset.

In some embodiments, depending on other properties of this method, such as natural competition between neurons caused by the variation of learning threshold values, the population of neurons within a layer learn a broad coverage of the input feature space. Thus, the response of the population of neurons to a given input carries information about the features that are present.

In the brain, sensory processing is typically hierarchical, taking place over a series of layers. Early layers extract information about simple features, with higher layers learning to respond to combinations of those features, such that their responses are both more selective to more complex shapes or objects, and more general in that they are invariant to spatial position or orientation.

In some embodiments, this modified learning method is completely unsupervised. This is different than conventional diverse supervised training methods that are in use in neural networks. This means that embodiment herein can be presented with an unlabeled dataset, and without any additional information can learn to respond to different features that are present in the data. Learning can be an ongoing process.

In some embodiments, there is no need to retrain the entire neural network (e.g., neuron fabric 201) when a new class is added to an already-trained data set. This can eliminate the technological problem of catastrophic forgetfulness. By allowing learning to continue, new classes can be added to the features that are already recognized by the network.

Unsupervised learning can extract features. However, in the absence of labeled data, unsupervised learning cannot directly 'label' its outputs. In a classification task, the neural network (e.g., neuron fabric 201) can learn a set of features that differentiate classes present in the stimulus data set. It can then be up to the user to apply a method linking responses representing features to input labels.

FIG. 8 illustrates a weight swapping step of the learning method, according to some embodiments. FIG. 8 shows an example of the next step in the modified learning process whereby 'unused synaptic weights' are swapped to 'unused inputs' thereby strengthening the neurons' response to the same or a similar input spike pattern in the future.

In FIG. 8, spike bits 1, 6, 18, 19, and 23 of spike packet 801 are highlighted indicating they contain logic '1' values (e.g., indicating the presence of a spike). The remaining positions within spike packet 801 contain zeros (e.g., indicating the absence of a spike). Bits 1, 4, 5, 14, and 22 of synaptic weights 802 contain '+1' values while bit 18 contains a '−1' value. Bit 19 of unused spikes 801 represents an unused spike in spike packet 801. Bits 5 and 14 of unused synaptic weights 802 represents unused synaptic weights in synaptic weights 802. In FIG. 8, new synaptic weights 805 represents the result of swapping unused synaptic weights (e.g., a positive synaptic weight in a location where no spike has occurred) and unused spikes (e.g., a spike in the spike packet that is in a position relative to a synaptic weight having a value of zero). For example, bit 14 of new synaptic weights 805 contains the value of bit 18 of synaptic weights 802 and vice versa.

The above embodiment with FIG. 8 describes a learning method, with synapses having corresponding synaptic weight values of +1, −1 or 0. The synaptic weight value of '+1' excites or increases the potential of a post-synaptic neuron when an input spike arrives, whereas the synaptic weight value of '−1' inhibits or reduces the membrane potential of the post-synaptic neuron when an input spike arrives. The synaptic weight value of '0' does not affect the membrane potential of the post-synaptic neuron.

On a broader level, the implementation in the hardware, is inspired by the function of the brain. Though this method is advantageous due to its non-complexity because it requires less computation and memory, the learning implemented this way is limited and inspired by only limited functional aspects of the biological synapses. Synapses implemented in this way only represents the absence or the presence of the synapses. Absence is reflected by '0' bit synaptic weight value whereas the presence of the synapse is reflected by '+1' (excitatory) or "−1' (inhibitory) synaptic weight value.

More importantly, the function of synapses in the brain is significantly more complex than the above disclosed embodiment. For example, the synaptic strength of a synapse in the brain depends on various biological parameters and varies greatly in its strength and so the propagation of the sensory inputs from a post-synaptic neuron to the other neurons is affected in significant number of ways. Typically, the neuro-transmitters and the neuro-receptors at the synaptic cleft in the biological brain vary the behavior and strength of a synapse.

The simpler digital synapse implementation in the earlier embodiment with FIG. 8 can be of help in scenarios where comparatively less-complex sensory inputs are to be recognized or motor function outputs to be delivered digitally. Particularly, a simpler digital synapse weight configuration having synaptic weight values such as +1, 0; −1, 0 and +1; −1, 0 helps as it consumes less memory in hardware. However, to perform advanced artificial intelligence tasks (for example with complex multi-sensory inputs etc.) digital synapses need to be configured in hardware in a way that is close to biology and allows having a greater number of varying strengths, and so helps in achieving brain like learning in neuromorphic hardware. In other words, realization of the multi-bit synaptic weight values in neuromorphic hardware is required. This can assist in striking a better compromise between selectivity and generalization of the network to achieve advanced AI applications.

The selectivity of a neuron allows it to learn to respond to different features/patterns in the input, whereas the generalization allows it to respond to sets of similar patterns, if the network as a whole learns to recognize categories/classes with any kind of invariance, rather than just very specific individual examples. For instance, if we want a network to learn to recognize written characters (e.g. Modified National Institute of Standards and Technology dataset), the 'patterns' to learn are those features that are common to different examples of the same character. The actual patterns of spikes presented are going to be poorly preserved across examples, so the neurons can't be too specific in terms of the patterns they encode, and the embodiments of the present invention advantageously allow each neuron to recognize more complex patterns either alone or collectively within the network.

A further embodiment discloses performing a learning function based on determining that the membrane potential value of a spiking neuron circuit (referred as neuron for simplicity at some places) has reached a threshold value.

In particular, rather than the synaptic weight value swapping technique disclosed in an earlier embodiment with FIG. 8, the further embodiments disclose the synapse weight variation methods that are more graduated. Such methods may require additional computation and memory in hardware, however, they are beneficial to improve the accuracy of the model when used during inferencing. These embodiments can help in designing intelligent (smarter in recognizing patterns and decision making) and specialized (gain enhanced specialization for the same level of input data used for training) artificial intelligence systems.

The weight swapping technique disclosed in FIG. 8 does not work well with multi-bit synapses. The reason being that the learning rate drastically changes or jumps from one synaptic weight value to another. The learning rate of the model is a very important parameter and must be carefully controlled to achieve learning stability and accuracy. Thereby, rather than synaptic weight value swapping, a more controlled synaptic weight variation technique is disclosed when multi-bit synaptic weight values are used in a spiking neural network model implemented in hardware (e.g., on a neuromorphic integrated chip). The advantages of this technique are elaborated further in detail with examples, in which a winning neuron receives inputs at two synapses and weight variations are performed by amending the synaptic weight values in two approaches: a) performing weight swapping and b) performing increment and decrement.

Example 1) Spike inputs 15, 0 are received at corresponding synapses with synaptic weight values 2, 12 associated with a winning neuron.

The total distance to the input is 13+12=25 (the distance is the sum of absolute difference between inputs and weights)
a) Using weight swaps: change weights to 12, 2 and new distance to input is 3+2=5. Total change=20
b) Using increment and decrement: change weights to 3, 11 and the new distance to the input is 12+11=23. Total change=2

Example 2) Spike inputs 15, 0 are received at corresponding synapses with synaptic weight values 4, 5 associated with a winning neuron.
Total distance to the input is 11+5=16
a) Using weight swaps: change weights to 5, 4 and the new distance to the input is 10+4=14. Total change=2
b) Using increment and decrement: change weights to 5, 4 and the new distance to the input is 10+4=14. Total change=2

Example 3) Spike inputs 15, 0 are received at corresponding synapses with synaptic weight values 6, 6 associated with a winning neuron.
Total distance to the input is 9+6=15
a) Using weight swaps: change weights to 6, 6 (no change!) and new distance to the input is 9+6=15. Total change=0
b) Using increment and decrement: change weights to 7, 5 and the new distance to the input is 8+5=13. Total change=2

As can be noted from the above examples, using the weight swap technique (disclosed with FIG. 8), the total change (of distance from weight vector to input vector) is highly variable (20, 2 and 0), whereas using the increment and decrement technique, the total change is limited (always 2 in this case). The total change when the increment decrement technique is adopted can be user configurable—e.g., 4, 6, 8 etc. to achieve a faster learning rate, in particular by configuring the increment or decrement steps to 2, 4, 6 etc. (see FIG. 8(iii) where synaptic weights are incremented and decremented by 2), thereby, the model advantageously remains highly controllable.

Typically, a high volume of spike packets is processed when a neural network is trained on the neuromorphic hardware.

A spiking neuron network can have a plurality of layers. Each of the layers can include several neurons. These neurons (spiking neuron circuits) are implemented on the neuromorphic hardware such as FIG. 1, FIG. 2A and FIG. 2B or any similar hardware.

In some embodiments, when an input spike packet arrives at post-synaptic neurons (spiking neuron circuits) when the model is being trained, several mathematical functions can be used to determine the membrane potential value.

In some embodiments, all possible or a set of all possible mathematical functions required to be performed for the various mathematical calculations (e.g., to calculate membrane potential value) are stored in the form of lookup table(s) in memory to reduce the computation requirement in hardware or to avoid the requirement for an arithmetic logic unit (ALU) in hardware.

Method type 1: In some embodiments, a logical AND function between a spike bit(s)/spike input value (1-bit or multi-bit) in the set of spike bits/spike input values and a synaptic weight value of a synapse in the set of synapses is performed. A membrane potential value associated with the spiking neuron circuit is incremented or decremented based on the result of the logical AND function. Typically, to determine the membrane potential value, a logical AND function is performed between each spike input value and its corresponding synaptic weight values of synapses associated with the neuron, and the results of the logical AND functions are summed to determine the membrane potential value. When the winning neuron amongst a plurality of a neurons in a layer is determined with this technique, the learning threshold value is configured to be increased after one or more events of the learning through synaptic weight variation.

Method type 2: In some embodiments, 2a) a plurality of difference values is generated between the synaptic weight values and either a set of corresponding first spike input values or a set of first values that are derived from the corresponding first set of spike input values. 2b) In the next step, a plurality of squared values is generated, each squared value is generated by squaring each of the difference values. 2c) In the next step, a summed value is generated by summing the plurality of squared values. 2d) In the next step, a square rooted value is generated by square rooting the summed value. 2e) In the last step, the membrane potential value is generated by either dividing 1 by the square rooted value or converting the square rooted value to negative square rooted values. When the winning neuron amongst a plurality of a neurons in a layer is determined with this technique, the learning threshold value is configured to be increased after one or more events of the learning achieved through synaptic weight value variation.

In some embodiments, 2a) a plurality of difference values is generated by subtracting the synaptic weight values and either the corresponding first spike input values or values that are derived from the corresponding spike input values. 2b) In the next step, a plurality of squared values is generated, each squared value is generated by squaring each of the difference values. 2c) In the next step, a summed value is generated by summing the plurality of squared values. 2d) In the last step, the membrane potential value is generated by dividing 1 by the summed value. The neural processor is configured to process the determined summed values and determine the neurons having the lowest summed values/highest membrane potential values and determine a winning neuron amongst a plurality of a neurons in a layer. In some embodiments, the neuron having the lowest summed value/highest membrane potential value is determined as the winning neuron. When the winning neuron amongst a plurality of a neurons in a layer is determined with this technique, the learning threshold value is typically configured to be increased after one or more events of the learning through synaptic weight value variation.

Method Type 3:

In some embodiments, 3a) a plurality of difference values is generated by subtracting the synaptic weight values from either a corresponding first spike input values or values that are derived from the corresponding spike input values. b) In the next step, a plurality of absolute values is generated by determining the absolute value for each of the difference values. 3c) In the next step, a summed value is generated by summing the plurality of absolute values. 3d) In the last step, the membrane potential value is generated by either dividing 1 by the square rooted value or converting the square rooted value to negative square rooted value. When the winning neuron amongst a plurality of a neurons in a layer is determined with this technique, the learning threshold value is configured to be increased after one or more events of the learning through synaptic weight variation.

In some embodiments, 3a) a plurality of difference values is generated by subtracting the synaptic weight values and either corresponding first spike input values or values that are derived from the corresponding spike input values. 3b) In the next step, a plurality of absolute values is generated by determining absolute value for each of the difference values. 3c) In the next step, a summed value is generated by summing the plurality of absolute values. The neural processor is configured to process the determined summed values and determine the neurons having the lowest summed values/highest membrane potential values and determine a winning neuron amongst neurons present in a layer. In some embodiments, the neuron having the lowest summed value/highest membrane potential value is determined as the winning neuron. When the winning neuron amongst a plurality of a neurons in a layer is determined with this technique, the learning threshold value is configured to be increased after one or more events of the learning through synaptic weight variation.

Method Type 4:

Step 4a: Any one of step 4a(i) or 4a(ii) as described below can be implemented to implement step 4a.

Step 4a(i):

In some embodiments, when the network is initially configured, the synaptic weight values of synapses associated with a plurality of post-synaptic neurons are chosen by the neural processor in such a way that for each of the post-synaptic neuron, the synaptic vector length is the same or approximately same to a desired synaptic vector length. The synaptic vector length is the square root of the sum of the squared synaptic weight values. For example, if the desired synaptic vector length is 12, and the synaptic weight values 4, 2, 6, 3, 0, 6 and 7 are chosen. In this case, the synaptic vector length is $\sqrt{4^2+2^2+6^2+3^2+0^2+6^2+7_2}=-12.2$.

To implement this, a preconfigured set of synaptic weight values can be stored in memory, each set referring to a desired synaptic vector length. In some embodiments, the synaptic vector length is user defined and provided during initial configuration of the neural network. As the model starts learning, the neural processor allows synaptic weight value variation in such a way that the synaptic vector length for each of the neuron remains the same or approximately the same as the desired synaptic vector length.

Step 4a(ii):

In some embodiments, the network is configured with random synaptic weight values. Further, a synaptic vector length is determined based on the configured random synaptic weight values. In a next step, a synaptic scale factor is determined by dividing a desired synaptic vector length by the determined synaptic vector length. In a next step, scaling of the synaptic weight values is performed by multiplying the synaptic scale factor with the synaptic weight values and updated synaptic weight values are achieved. In some embodiments, the synaptic vector length is user defined and provided during initial configuration of the neural network.

Step 4b: An optional step is performed for scaling the spike packet. In accordance with this method, for each received spike packet, an input vector length is determined. The input vector length is the square root of the sum of the squared synaptic weight values. For example, if the spike packet contains input values 2, 3, 1, 2, 0, 3 and 6, the input vector length is $\sqrt{2^2+3^2+1^2+2^2+0^2+3^2+6^2}=7.94$ In a next step, the desired synaptic weight value is divided by the input vector length and an input scale factor is determined. For a desired synaptic vector length of 12, an input scale factor is $12/7.94=1.51$ In a next step, scaling of the input values (spike packet) is performed by multiplying the input scale factor with the input values and updated input values are achieved. For example, input values 2, 3, 1, 2, 0, 3 and 6 are multiplied by 1.51 and the scaled input values 3.02, 4.53, 1.51, 3.02, 0, 4.53 and 9.06 are achieved.

Step 4c:

In a last step, a dot product is performed.

Step 4c(i): In accordance with an embodiment, a dot product is performed between the spike packet and the synaptic weight values for a plurality of neurons to determine membrane potential value for each of the plurality of neurons.

Step 4c(ii): In accordance with an embodiment, a dot product is performed between the spike packet and the scaled synaptic weight values for a plurality of neurons to determine membrane potential value for each of the plurality of neurons.

Step 4c(iii): In accordance with an embodiment, a dot product is performed between the scaled spike packet and the scaled synaptic weight values for a plurality of neurons to determine the membrane potential value for each of the plurality of neurons.

A winning neuron is selected based on the membrane potential value determined based on any one of the steps 4c(i)-4c(iii) and synaptic weight values are varied in accordance with any of the technique disclosed with the present invention, to achieve learning based on the received spike packet. In some embodiments, a neuron with the highest membrane potential value is chosen as the winning neuron. In some embodiments, several neurons with high membrane potential values are determined and a random/arbitrary neuron is chosen as the winning neuron.

In one embodiment when method type 4 is incorporated, an additional constraint is applied when performing the synaptic weight variation as per any one of the techniques disclosed in the present invention. In particular, the neural processor(s) is configured to vary the synaptic weight values such that a synaptic vector length of the updated synaptic weight values is the same or approximately the same to the desired synaptic vector length.

In one embodiment, synaptic weight values are varied in accordance with any of the technique disclosed with the present invention, however, a further step of synaptic weight scaling is performed (like step 4a(ii)) after varying the weights. The scaled synaptic weight values are used when processing a subsequent spike packet.

Steps 4a to 4c are repeated for a number of spike packets to achieve a trained model.

A person skilled in the art would appreciate that method type 4 can be implemented using any combination of steps disclosed above. For example: A) steps 4a(i) and 4c(i); B) 4a(ii), 4b, 4c(iii) and C) 4a(ii), 4c(ii) can be implemented to determine the membrane potential.

Since each of the synaptic weight values and input values are represented as binary bits, a person skilled in the art would appreciate that various approximation can be applied when performing mathematical calculation in hardware or when using the state table stored in memory to determine the result of the mathematical calculation (e.g. dot product, squaring, square-rooting, summing).

In some embodiments, to implement method type 1, AND circuits 107, 108 and counter 109 are used and weight swapper 113 is used to implement synaptic weight variation.

In some embodiments, to implement method type 1, a multiplier and an adder functionality of the ALU 152 is used to determine the membrane potential value. In such case, synaptic weight value and corresponding spike values are multiplied, and their outcomes are added to achieve the membrane potential.

In some embodiments, to implement method type 2-4, arithmetic logic unit 152 is used to determine membrane potential and weight incrementor and decrementor 150 is used to implement synaptic weight variation. In some embodiments, the weight swapper 113 is used to implement synaptic weight variation.

The disclosed method types 1-4 vary in the level of precision, accuracy achieved, and level of computation required in hardware. A person skilled in the art would appreciate that any of the method types can be used to determine the membrane potential. Once the membrane potential is determined, any of the disclosed synaptic weight variation techniques disclosed with various embodiments of the invention can be incorporated to train the model.

In some embodiments, the level of synaptic weight variations is user configurable by changing a learning rate. When the learning rate is higher, typically, a high value or a greater number of synaptic weight variations are performed over time.

Typically, the neuron having the highest membrane potential is chosen as the winning neuron by the neural processor(s), and synaptic weight variation is performed for the synapses associated with the winning neuron. The synaptic weight values that represent the synapses are incremented and/or decremented based on any of the embodiments disclosed in the present invention. Preferably, this embodiment is implemented when the synaptic weight values are multi-bit. The learning threshold is incremented or decremented after one or more synaptic weight variation events.

In some embodiments, the summed value determined by method types 2 and 3 is considered as the membrane potential, and synaptic weight variation is performed for the neuron having the lowest threshold value amongst the neurons present in a layer, and in such case, the learning threshold value is configured to be decreased after one or more events of the learning through synaptic weight variation.

Each of the postsynaptic neuron circuits receive the spike bits in an SNN (spiking neural network) layer and spiking of each of the postsynaptic neuron circuits is configured when the membrane potential of the spiking neuron circuit reaches an associated firing threshold value. The spiking of the neuron circuits is configured asynchronously, meaning the spiking neuron circuits fire without considering whether a neuron in the same layer has fired or not. As a result of the firing, the spikes from spiking neuron circuits of a layer are propagated to the spiking neuron circuits of a subsequent layer and so on, based on the synapse connections between the plurality of spiking neuron circuits arranged in the plurality of layers within a spiking neural network.

The firing threshold value can be configured to be fixed or be amended during the learning of the model. However, the synaptic weight values and learning threshold values are modified during the learning mode to capture the learning based on the input packets. However, when the model is used in an inference mode, the synaptic weight values and firing threshold values are unchanged.

Figure 8I:
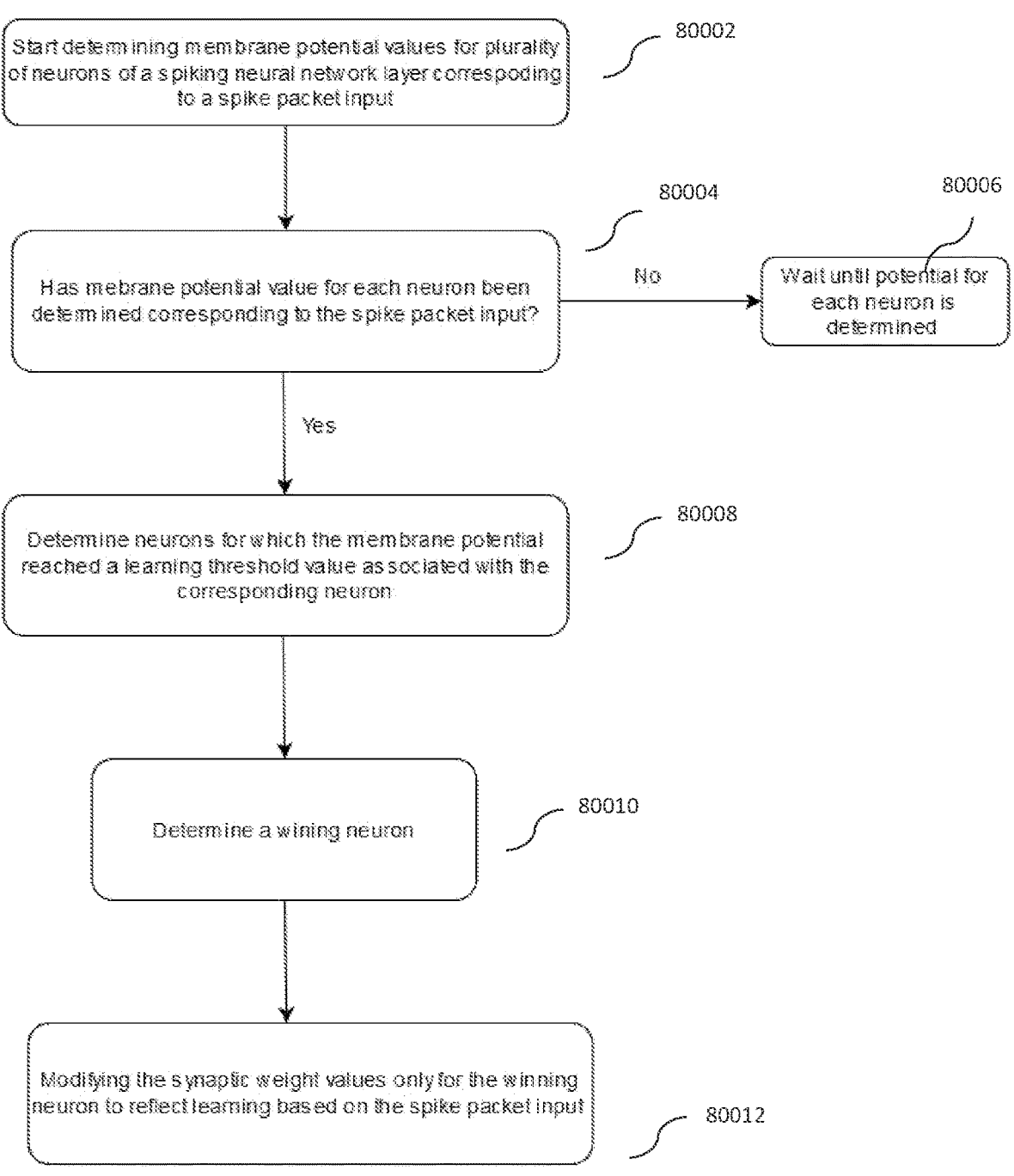
FIG. 8(i) illustrates how the learning function is implemented by the neural processor(s) for a single input instance (processing a spike packet) for an SNN layer, according to some embodiments.

The learning of the model by synaptic weight value variation is arranged to be performed synchronously as described further through the flow diagram shown in FIG. 8(i). The flow diagram depicts how the learning is implemented by the neural processor(s) for a single input instance (by processing a spike packet) for a single SNN layer. It shall be understood that a plurality of input instances similarly can be used to train an SNN model. A spiking neural network may have one or a plurality of layers depending upon the application. The network can be configured using neural network configuration parameters as depicted in FIG. 16.

In FIG. 8(i), a step 80002 depicts that the membrane potential values for a plurality of spiking neuron circuits of a spiking neural network layer corresponding to a spike packet are determined as the spike packet is processed by the spiking neuron circuits. The membrane potential value can be determined by any method disclosed in the present invention. Importantly, the neurons are arranged to perform the spiking asynchronously. However, to perform the learning function through variation in the synaptic weight values, the process is arranged such that, when the membrane potential value for each of the spiking neuron circuit present in a layer of the network is determined, (corresponding to the received spike packet) in only such case, the further steps are progressed (implemented). Advantageously, this helps in decision making of which neuron shall specialize for learning a received spike packet, and not two or more than two neurons try to learn the same input packet. The proposed embodiment allows training a network on a neuromorphic chip with less memory and so reduction is the size of the chip and manufacturing cost can be achieved.

In step 80004, it is checked whether the membrane potential value for each spiking neuron circuit has been determined based on the received spike packet.

If not, as step 80006 depicts, the neural processor(s) waits for the membrane potential determination for each of the spiking neuron circuits in a layer of the spiking neural network.

Going ahead, as step 80008 depicts, spiking neuron circuits for which the membrane potential values have reached a corresponding learning threshold value, are determined. Such spiking neuron circuits are chosen as candidates for the winning neuron, whereas the rest of the spiking neuron circuits are ignored for the fact that they do not meet the criterion of the membrane potential reaching the corresponding learning threshold value.

As step 80010 depicts, a winning spiking neuron circuit is selected based on the chosen candidates. In one embodiment, a spiking neuron circuit with the highest membrane potential out of the selected candidates is chosen as the winning spiking neuron circuit. In some embodiments, a random/an arbitrary spiking neuron circuit out of the selected candidates is chosen as the winning spiking neuron circuit. When two or more spiking neuron circuits are matching the criterion of selection equally, a random/arbitrary spiking neuron circuit out of those two or more spiking neuron circuits is selected as a winning spiking neuron circuit.

Finally, in step 80012, to implement the learning based on the received spike packet, synaptic weight value variation is applied to the synapses associated with the winning spiking neuron.

The embodiments with FIGS. 8(*iii*)-8(*xvi*) disclose the various synaptic weight value variation approaches in detail that can be incorporated to implement the learning.

FIG. 8(*ii*) depicts a flow diagram that illustrates how the learning function is implemented for a plurality of input instances, or in other words, how processing of several spike packets is performed. FIG. 8(*ii*) also depict how spikes are generated across a plurality of spiking neural network layers.

In step 80014, a first spike packet is received by a set of post-synaptic spiking neuron circuits, from a set of pre-synaptic spiking neuron circuits over a plurality of synapses and processed further. Each of the synapse has an associated initial synaptic weight value. The initial synaptic weight values are assigned any arbitrary or predetermined value after applying one or more constraints when the network is first configured. The various other parameters of the network can be configured through other embodiments of the invention to receive the first spike input value. The remaining parameters of the network can be configured through other embodiments of the invention.

In step 80016, membrane potential values of each of the post-spiking neuron circuits are determined by adopting any of the membrane potential determination method (method types 1-4) disclosed with this invention. Going ahead, it is determined if the membrane potential value for each of the spiking neuron circuit has reached a corresponding learning threshold value based on the received spike packet (first/next) and synaptic weight values (initial/updated). If the received spike packet is a first spike packet, the initial synaptic weight values are used to determine the membrane potential. If the received spike packet is a next or subsequent spike packet, the updated synaptic weight values are used to determine the membrane potential value. The synaptic weight values are updated based on any of the synaptic weight variation approach disclosed in the various embodiments of the invention.

In an embodiment, a membrane potential value for each of a plurality of spiking neurons present in a spiking neural network layer of the neural network is determined from the one or more spiking neural network layers of the neural network, based on input data and synaptic weight values of synapses associated with each of the plurality of spiking neurons. The synapses may be pre-synapses or post-synapses associated with each of the plurality of spiking neurons.

In step 80018, spiking by the post-synaptic neuron circuits is performed asynchronously, when the associated firing threshold value is reached. As discussed earlier, the asynchronous approach is incorporated between the spiking neuron circuits of an SNN layer, meaning the spiking of a spiking neuron circuit within an SNN layer does not depend on the spiking of the rest of the spiking neuron circuits. Optionally, the firing threshold values associated with a spiking neuron circuit may be incremented or decremented such that each neuron (alone or collectively) spikes after receiving a spike input pattern.

In step 80020, the membrane potential associated with the post-synaptic spiking neuron circuits is reset because of the spiking. It shall be noted that the steps 80016 and 80018 are performed in the same order for a spiking neuron circuit over a plurality of received spike packets. It shall be understood that in case there are multiple spiking neuron circuits that reach their associated firing threshold values, these steps are repeated in the same order for each of the spiking neuron circuit.

In step 80021, a set of the spiking neuron circuits of the spiking neuron circuits of the layer are determined for which the membrane potential value has reached the learning threshold value associated with respective spiking neuron circuits.

In step 80022, a winning spiking neuron circuit is selected from the set of spiking neuron circuits. As discussed earlier, a synchronous approach is incorporated when determining the membrane potential, meaning the winning spiking neuron circuit is not selected until all the spiking neuron circuit have determined the membrane potential value based on a received spike packet.

Going ahead in step 80024, the synaptic weight values for the winning spiking neuron circuit are updated to reflect learning based on the spike packet.

In some embodiments, the firing threshold values are lower than the learning threshold values for each of the spiking neuron circuit. In such case, a winning spiking neuron circuit is typically with the highest membrane potential amongst the spiking neuron circuits within a layer.

In some embodiments, the firing threshold values are higher than the learning threshold values for each of the spiking neuron circuits. In such a case, a winning spiking neuron circuit is typically the one with the lowest membrane potential amongst the spiking neuron circuits within a layer.

As the network learns, the membrane potential value of each of the spiking neuron circuit reaches the firing threshold value prior to reaching the learning threshold value, thereby firing by a spiking neuron circuit occurs prior to the synaptic weight value variation of synapses, i.e., pre-synapses or post-synapses, associated with a spiking neuron circuit.

In an embodiment, the synaptic weight value variation may be performed for one or more synapses associated with the winning spiking neuron to reflect the learning function for the neural network based on the input data. Further, the synapses may be the pre-synapses associated with the winning spiking neuron for which synaptic weight value variation may be performed.

Going ahead in step 80026, the neural processor(s) waits for confirmation that the synaptic weight values have been modified for the synapses associated with the winning neuron circuit.

In a last step 80028, a subsequent (next) spike packet by all the spiking neuron circuits of the layer is received by the plurality of synapses and is processed with the modified synaptic weight values. The learning based on the next spike packet is performed similar to the received earlier spike packet as described above.

In various embodiments, each synaptic weight value is selected from a group of values consisting one of:

zero and positive integer values, each value represented by multi-bit digital value;

positive integer values, each value represented by multi-bit digital value;

positive integer values and negative integer values, each value represented by multi-bit digital value; and negative integer values, zero, and positive integer values, each value represented by multi-bit digital value.

FIG. 8(*iii*) depicts how the learning is performed using 1-bit input over multi-bit synapse (4-bit) input. In particular, the figure depicts one instance of learning when an input spike packet (1-bit) is received by a postsynaptic neuron by a plurality of synapses, when each synapse is represented by a multi-bit (4-bit) synaptic weight value.

These synaptic weight values are stored in synaptic weight indexes, for example, each index storing a 4-bit synaptic weight value. For example, as 8004 depicts, synaptic weight index 18 store stores synaptic weight value 15, which is a decimal value of 4-bit synaptic digital value "1111" which is stored in memory. These synaptic weight indexes are virtual addresses stored in memory, preferably the synapse registers.

It is to be understood that the input packets and synaptic weight values will vary extensively as the model is exposed to a variety of input data during the training of the model.

In the present embodiment, it shall be noted that each synapse can have 16 states, amongst which '0' is an absence state, whereas '1-15' are presence states, with varied and increasing synapse strength.

FIG. 8(*iii*) depicts a spike packet 8002 that is received by a postsynaptic neuron. The spike packet includes 25 spike input indexes (spike bits) such that each index stores 1-bit (0 or 1) spike input value. Each spike input value of the spike packet corresponds to a synaptic weight value (or vice versa), for example, spike input value 0 at spike packet index 21 corresponds to synaptic weight value 4 at synaptic weight index 21.

The spike input indexes 01, 06, 18, 19 and 23 are highlighted indicating that they contain logic '1' value (e.g., indicating the presence of a spike). The remaining positions within spike packet 8002 contain zero spike input values (e.g., indicating the absence of a spike).

Deviating from the earlier described 1-bit synaptic weight values (FIG. 8), the present embodiment incorporates multi-bit synaptic weight values for each synapse weight index (0-24). As can be seen in the figure, the synapse weights 8004 includes 25 synaptic weight indexes that store multi-bit (4-bit) weight values in each synaptic weight index. The synaptic weight indexes 01, 05, 06, 12, 14, 18, 21 and 23 include non-zero weights 15, 15, 8, 7, 9, 15, 4 and 11 respectively.

The neural processor(s) processes the spike packet 8002 and the synaptic weight values 8004 and initiate the change in the multi-bit synaptic weight values on some of the synaptic weight indexes to reflect the learning. The learning is implemented by varying the synaptic weight values stored at one or more indexes. In the example shown in the figure, the neural processor(s) processes the spike packet and determines spike packet indexes 1, 6, 18, 19 and 23 containing logic '1' (non-zero) spike values. For these spike packet indexes, corresponding synaptic weight indexes are determined, and the stored synaptic weight values 15, 8, 15, 0 and 11 are fetched.

Since the synaptic weight value is already at a maximum (15) for synaptic weight indexes 1 and 18, these indexes are ignored for any change in the synaptic weights. This is implemented to reflect that these synaptic indexes 1 and 18 do not need additional learning for the spike packet 8002. The synaptic weight indexes 6, 19 and 23 have lower synaptic weight values (8, 0, 11) and are considered as underused spikes (8006), shown at 8012, 8014 and 8016 respectively.

Going ahead, the neural processor(s) determines the underused weights (8008). The underused weights are non-zero synaptic weight values that do not have any corresponding spike input value in the spike packet indexes (8002). The underused weight indexes are determined as 5, 12, 14 and 21 having synaptic weight value of 15, 7, 9 and 4 respectively (8024, 8022, 8020, 8018) in this example. As can be noted in the figure, these synapse weight indexes do not have any corresponding spike input value in the corresponding spike packet indexes.

Going ahead, three pairs of synaptic weight values are determined, each pair containing two synaptic weight values, one from the set of underused spikes (6, 19 and 23) and one from the set of underused weights (5, 14 and 21).

It shall be noted that in this example, underused weights 15, 9 and 4 are randomly/arbitrarily chosen out of the determined set of 15, 7, 9 and 4. However, it can be implementing by example by ordering them in a descending order and selecting the highest number of required synaptic weight values, determined based on of the number of underused spikes.

Going ahead, to allow learning of the model through change in the synapse weights, synaptic weight values that result in underused spikes/input, are incremented, whereas the synaptic weight values that caused underused weights, are decremented. In the given example, as can be seen in weight variation 8010, the synaptic weight values of the synapse weight indexes 6 (8036), 19 (8030) and 23 (8026) are incremented by value '1' and synapse values of the synapse weight indexes 5 (8036), 14 (8030) and 21 (8026) are decremented by value '1'. As the three synaptic weight values are incremented, three synaptic weight values are decremented, the total synaptic weight remains constant after processing the spike packet.

In the learning process, the synapses that needed to better capture the received spike packet (pattern) are slightly enhanced in strength and synapses that are already strong even in case of the absence of the input packet (pattern) are slightly weakened in strength. Typically, this represents the synaptic change phenomenon that exist in the brains for learning, wherein the synapses that receive frequent input gets stronger or more receptive to the biological spikes.

The following summarizes the learning when 1-bit input and multi-bit synapse are used when only 1 pair of synaptic weight values of synapses associated with a winning neuron is chosen for weight variation.

In a first step, a spike packet having a plurality of spike bits is determined, wherein each spike bit corresponds to a multi-bit synaptic weight value of synapses associated with a winning post-synaptic spiking neuron.

In a next step, a first spike bit in the spike packet that represents an underused spike is determined, wherein the first spike bit has a value of one and corresponds to a first synaptic value of a first synapse, wherein the first synaptic weight value of the first synapse has a value less than a maximum synaptic weight value.

In a next step, a second synaptic weight value of a second synapse in the plurality of synapses that represents an underused synaptic weight, is determined, wherein the second synaptic weight has a non-zero value, and a second spike bit that corresponds to the second synaptic value in the spike packet has a value of zero.

In a last step, the value of the first synaptic weight value is incremented, and the value of the second synaptic weight is decremented.

The following summarizes the learning when 1-bit input and multi-bit synapse are used when two or more pairs of synaptic weight values of synapses associated with a winning neuron are chosen for weight variation.

In a first step, a spike packet having a plurality of spike bits is determined, wherein each spike bit corresponds to a multi-bit synaptic weight values of synapses associated with a winning post-synaptic spiking neuron circuit.

In a next step, a first set of spike bits in the spike packet that represent an underused spike is determined, wherein the first set of spike bits has a value of one and corresponds to a first set of synaptic weight value of a first set of synapses, wherein the first set of synaptic weight value of the first set of synapses have a value less than a maximum synaptic weight value.

In a next step, a second set of synaptic weight values of a second set of synapses in the plurality of synapses as an underused synaptic weight is determined, wherein the second set of synapse weight values has a non-zero value, and a second set of spike bits in the spike packet that correspond to the second set of synaptic weight value has a value of zero.

In a next step, two or more pairs of synaptic weight values are determined, wherein each pair containing two synaptic weight values, one from the first set of synapses and another from the second set of synapses.

In a next step, the synaptic weight value of one synapse of the pair is incremented and the synaptic weight value of another synapse of the pair is decremented. This step is repeated for all the remaining pairs.

FIG. 8(iv) depicts how the learning is performed using multi-bit input (4-bit) over multi-bit synapse weights (4-bit). In particular, the figure depicts one instance of learning when a multi-bit input spike packet is received by a post-synaptic neuron over a plurality of synapses, when each synapse is represented by a multi-bit synaptic weight value. These synaptic weight values are stored in synaptic weight indexes, for example, each having capability to store a 4-bit value. These synaptic weight indexes are virtual addresses stored in memory, preferably the synapse registers.

It is to be understood that the input packets and synapse weights will vary extensively as the model is exposed to input data. In this embodiment, it shall be noted that each synapse can have 16 states, amongst which '0' is an absence state, whereas '1-15' are presence states, with varied and increasing synapse strength.

The FIG. 8(iv) depicts a spike packet 8040 that is received by a postsynaptic neuron. The spike packet includes 25 spike input indexes (spike bits) such that each index stores 4-bit (0 to 15) spike input value. The spike indexes 01, 06, 09, 18, 19 and 23 are highlighted as they contain non-zero values 12, 5, 8, 13, 9, and 4 values (e.g., indicating the presence of a spike) respectively. The remaining positions within the spike packet 8040 contain zeros (e.g., indicating the absence of a spike).

Deviating from the earlier described 1-bit synaptic weight values, the present embodiment incorporates multi-bit synaptic weight value for each synapse weight index (0-24) corresponding to 4-bit spike input values. As can be seen in the figure, the synapse weights 8042 include 25 synapse weight indexes that store multi-bit (4-bit) weight value in each synaptic weight index. The synaptic weight indexes 01, 05, 06, 12, 14, 18, 21, and 23 include non-zero weights 15, 15, 8, 7, 9, 15, 4, and 11 respectively.

The neural processor(s) processes the spike packet and the synaptic weights and initiate the change in the multi-bit synaptic weight values on one or more of the synaptic weight indexes to reflect the learning.

In the given example, the neural processor(s) processes the spike packet and determines spike packet indexes 1, 6, 9, 18, 19, and 23 as they contain non-zero spike value. For these spike packet indexes, corresponding weight indexes are determined, and the corresponding weight values are fetched, which are 15, 8, 0, 15, 0, and 11.

Since the spike weight value is the maximum (15) for spike weight indexes 1 and 18, these indexes are ignored for any change in the synaptic weights. This is implemented to reflect that these synaptic indexes 1 and 18 do not need additional learning for the spike packet 8040. The synaptic weight indexes 6, 9, 19, and 23 having comparatively less synaptic values 8, 0, 0, and 11 are chosen as underused spikes (8044), highlighted as 8052, 8054, 8056, and 8058 respectively.

Additionally, the neural processor(s) determines the underused weights (8046). The underused weights are non-zero synaptic weight values that do not have any corresponding spike input value in the spike packet indexes (8040). The underused weight indexes are determined as 5, 12, 14, and 21 having synaptic weight value of 15, 7, 9, and 4 respectively (8066, 8064, 8062, 8060) in this example. As can be noted in the figure, these synapse weight indexes do not have any corresponding spike input value in the corresponding spike packet indexes.

Going ahead, two pairs of synaptic weight values are determined, each pair containing two synaptic weight values, one from the set of underused spikes (8, 0, 0, and 11) and one from the set of underused weights (15, 9, and 4).

It shall be noted that in this example, underused weights 15 and 9 are selectively chosen out of the determined set of 15, 7, 9 and 4 by ordering them in a descending order and selecting the top 2 synaptic weight values (15 and 9). It shall be understood that one or more underused weights can be determined randomly/arbitrarily instead.

Going ahead, underused spikes 0 and 0 are selectively chosen out of the determined set of underused spikes 8, 0, 0 and 11 by ordering them in an ascending order and selecting the two lowest synaptic weight values. The selective pair formation helps in prioritizing the learning and therefore may help in needing relatively less input instances to train the model. However, it shall be understood that that the pair can be chosen randomly in some embodiments.

Going ahead, to allow learning of the model through changes in the synaptic weight values, synaptic weight values that cause underused spikes/input, are incremented, whereas synaptic weight values of the spike packet indexes that cause underused weights, are decremented.

In the given example, as can be seen in weight variation 8050, synaptic weight values of the synapse weight indexes 9 (8078) and 19 (8072) are incremented by value '1' and synaptic weight values of the synapse weight indexes 5 (8082) and 14 (8074) are decremented by value '1' for the two pairs formed (8082, 8078; 8074, 8072). As the two synaptic weight values are incremented by 1 each, whereas the two synapse values are decremented by 1 each, hence the total synapse weight remains constant after processing the spike packet.

The following summarizes the learning when multi-bit input and multi-bit synapse are used when only 1 pair of multi-bit synaptic weight values of synapses associated with a winning neuron is chosen for weight variation for the learning.

In a first step, a spike packet having a plurality of spike indexes is determined, wherein each index contains a multi-bit spike input value, each multi-bit spike input value corresponding to a multi-bit synaptic weight value of synapses associated with a winning post-synaptic spiking neuron.

In a next step, a first multi-bit spike input value in the spike packet that represents an underused spike is determined, wherein the first multi-bit spike input has a non-zero value and corresponds to a multi-bit synaptic weight value of a first synapse, wherein the first multi-bit synaptic weight value of the first synapse has a value less than a maximum synaptic weight value.

In a next step, a second multi-bit synaptic weight value of a second synapse in the plurality of synapses that represents an underused weight is determined, wherein the second multi-bit synaptic weight has a value more than a minimum synaptic weight value and corresponds to a second multi-bit spike input, wherein the second multi-bit spike input has a zero value.

In a last step, the value of the first multi-bit synaptic weight value is incremented, and the value of the second multi-bit synaptic weight value is decremented.

The following summarizes the learning when multi-bit input and multi-bit synapse are used when two or more pairs of multi-bit synaptic weight values of synapses associated with a winning neuron are chosen for weight variation for the learning.

In a first step, a spike packet having a plurality of spike index, each index contains a multi-bit spike input value, each multi-bit spike input value corresponding to a multi-bit synaptic weight value of synapses associated with a winning post-synaptic spiking neuron are determined.

In a next step, a first set of multi-bit spike input values in the spike packet that represents an underused spike is determined, wherein the first set of multi-bit spike input have a non-zero value and corresponds to a set of multi-bit synaptic weight value of a first set of synapses, and the first set of multi-bit synaptic weight value has a value less than a maximum synaptic weight value.

In a next step, a second set of multi-bit synaptic weights of a second set of synapses in the plurality of synapses that represents underused weights are determined, wherein the second set of multi-bit synaptic weight value has a value more than a minimum synaptic weight value, a second set of multi-bit spike input corresponds to the second set of multi-bit synaptic weight values that has a zero value.

In next step, two or more pairs of multi-bit synaptic weights are determined, wherein each pair includes one synaptic weight value from the first set of synapses and one synaptic weight value from the second set of synapses.

In a last step, the synaptic weight value of one synapse of the pair is incremented and the synaptic weight value of another synapse of the pair is decremented. This step is repeated for the remaining pairs.

Figure 8V:
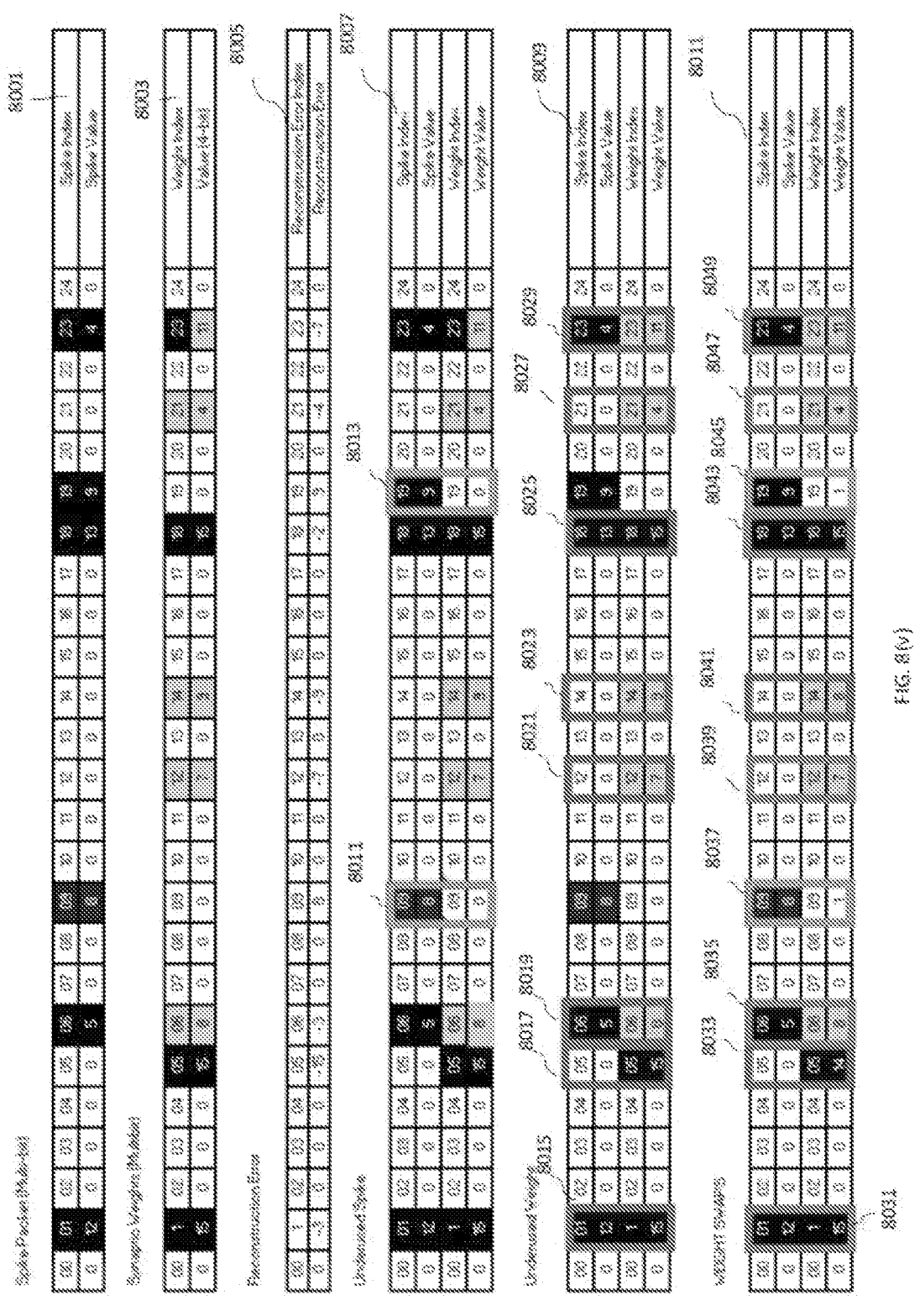
FIG. 8(v) illustrates one instance of learning when a multi-bit (4-bit) input spike packet is received by a postsynaptic neuron over a plurality of synapses, when each synapse is represented by a multi-bit (4-bit) synaptic weight value, according to some embodiments.
Figure 8:
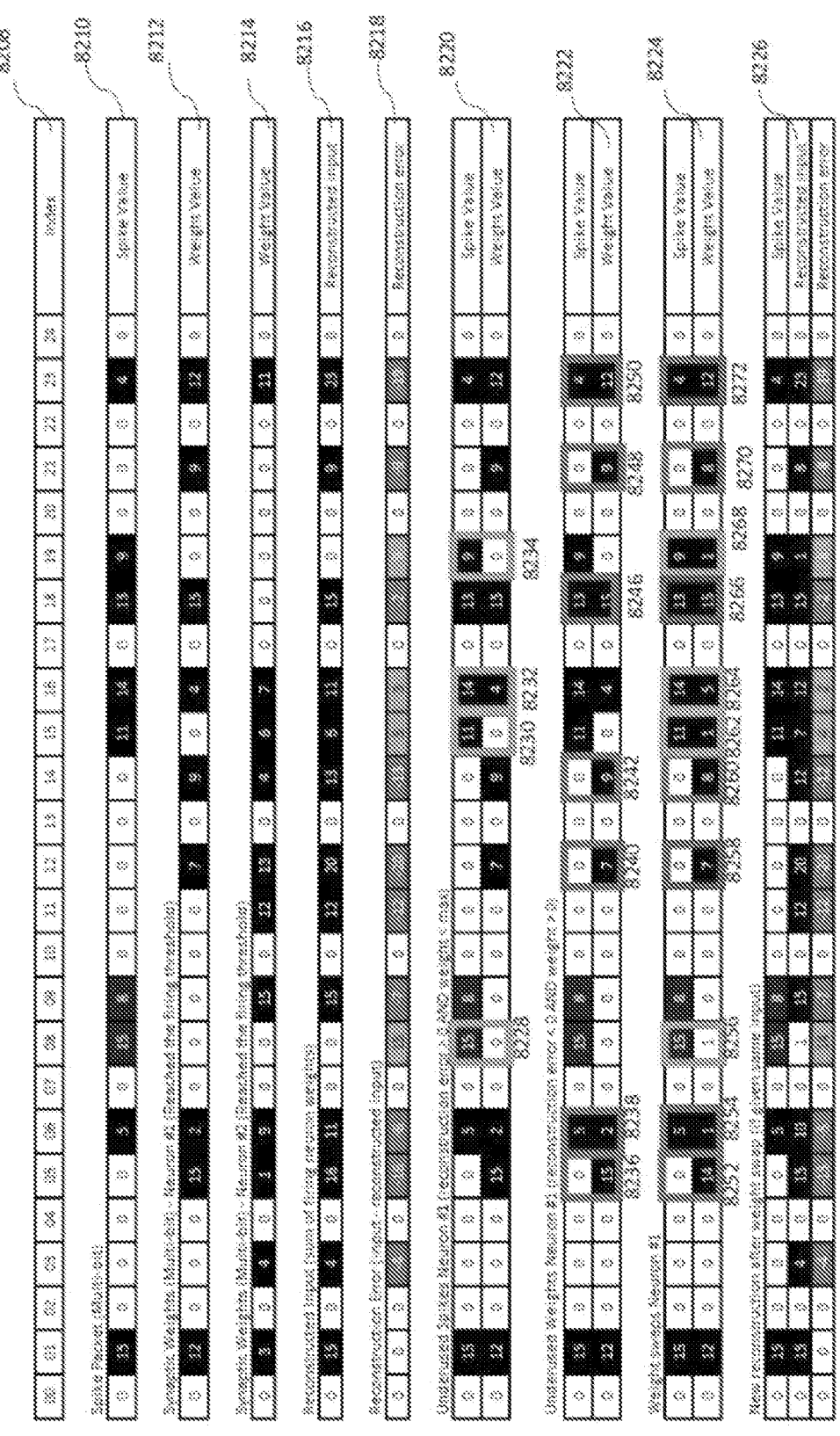
Figure 8K:
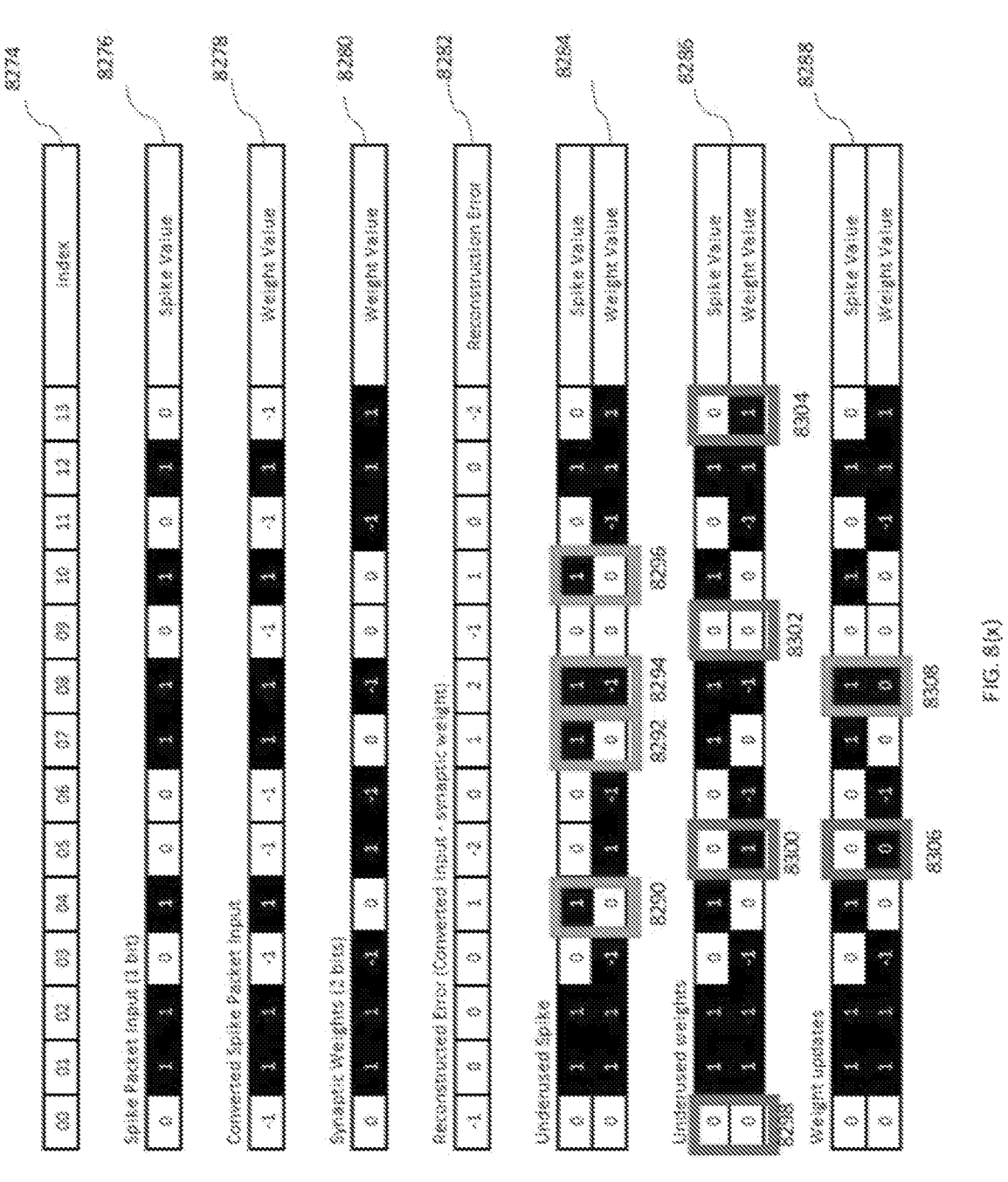
FIG. 8(x) illustrates one instance of learning when a 1-bit input spike packet is received by a postsynaptic neuron over a plurality of synapses, when each synapse is represented by a multi-bit (2-bit) synaptic weight value that can have a positive, a negative and a zero value, according to some embodiments.
Figure 8:
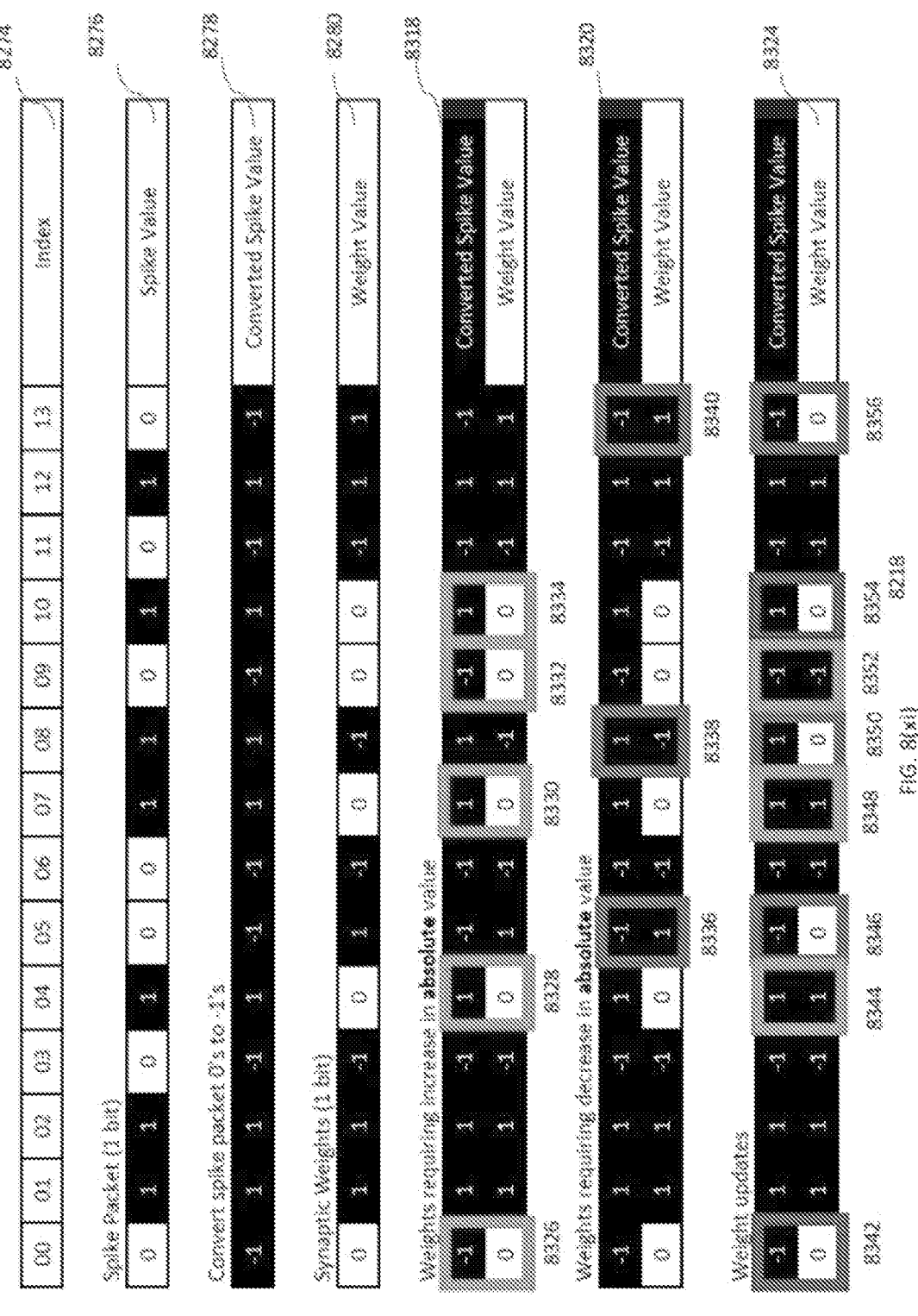
Figure 84:
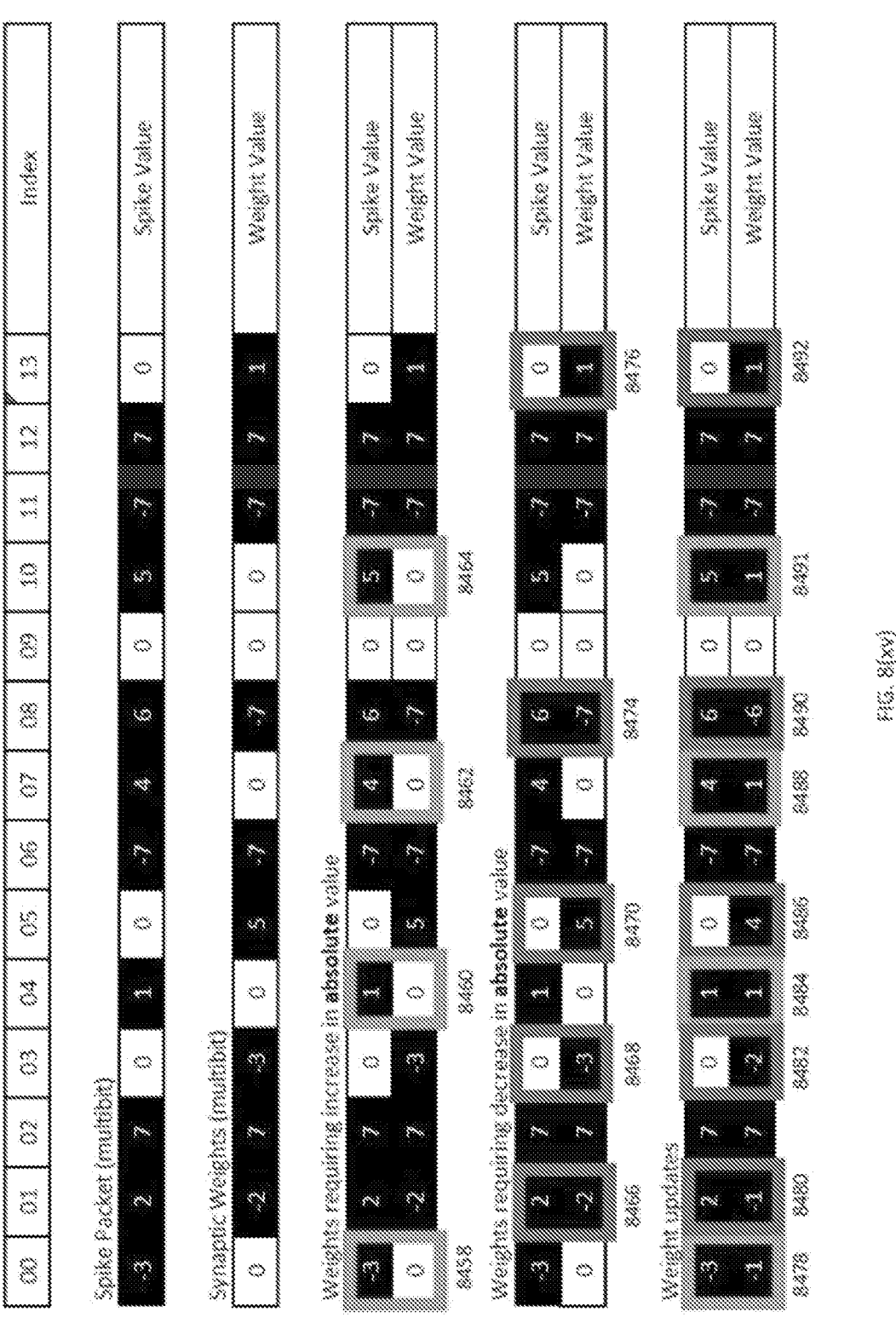

FIG. 8(v) depicts one instance of learning when a multi-bit (4-bit) input spike packet is received by a postsynaptic neuron over a plurality of synapses, when each synapse is represented by a multi-bit (4-bit) synaptic weight value, in accordance with an embodiment of the invention.

FIG. 8(v) depicts a spike packet 8001 that is received by a postsynaptic neuron over a plurality of synapses. The spike packet includes 25 spike input indexes (0 to 24) such that each index stores a multi-bit (4-bit) spike input value. Each multi-bit spike input corresponds to a multi-bit (4-bit) synaptic weight value of a winning spiking neuron circuit and a multi-bit reconstruction error. The spike indexes 01, 06, 09, 18, 19, and 23 are highlighted as they contain non-zero values 12, 5, 8, 13, 9 and 4 (e.g., indicating the presence of a spike) respectively. The remaining positions within the spike packet 8001 contain zeros (e.g., indicating the absence of a spike).

As can be seen in the figure, the synapse weights 8003 include 25 synapse weight indexes that store a multi-bit (4-bit) synaptic weight value in each synaptic weight index. The synaptic weight indexes 01, 05, 06, 12, 14, 18, 21, and 23 store non-zero weights 15, 15, 8, 7, 9, 15, 4, and 11 respectively.

The neural processor(s) determines a reconstruction error 8005 by subtracting the synaptic weight value(s) from the spike input value(s). Typically, the subtraction involves subtraction of one or more spike input values from the one or more synaptic weight values. For example, in this embodiment, all 25-spike input values and the 25-synaptic weight values are processed to determine the reconstruction error. The subtraction is performed to determine the difference values for each index as can be noted in the FIG. 8(v).

The neural processor(s) further determines the underused spikes (8007). The underused spikes are the one that correspond to positive reconstruction error, for example, spike value 8 (8011) and 9 (8013) stored at spike indexes 9 and 19 are determined to be underused spikes.

The neural processor(s) further determines the underused weights. The underused weights are the one that correspond to a negative reconstruction error, for example, synaptic weight values 15 (8015), 15 (8017), 8 (8019), 7 (8021), 9 (8023), 15 (8025), 4 (8027) and 11 (8029) stored at synaptic weight indexes 1, 5, 6, 12, 14, 18, 21 and 23 are determined to be underused weights.

Going ahead, one or more pairs of synaptic weight values are determined, each pair containing two synaptic weight values, one from the set of synaptic weight values that corresponds to the underused spike (0, 0) and one from the set of underused weights (15, 15, 8, 7, 9, 15, 4 and 11). Going ahead, to allow learning of the model through change in the synaptic weight values, synaptic weight values that caused underused spike are incremented, whereas synaptic weight values that caused the underused weights are decremented.

To make the pairs, the synaptic weight value(s) that correspond(s) to high (the highest) reconstruction error is (are) considered the most preferred candidate(s) for incrementing and the synaptic weight value(s) that correspond(s) to low (the lowest) reconstruction error (is) are considered the most preferred candidate(s) for decrementing. Nevertheless, the pairing can be chosen randomly/arbitrarily as well.

In the given example, as can be seen in weight variation field 8011, two pairs are formed (8033, 8037; 8041, 8045). The synaptic weight values of the synapse weight indexes 9 (8037) and 19 (8045) are incremented by '1' and synaptic weight values of the synapse weight indexes 5 (8033) and 14 (8041) are decremented by '1'. As the two synaptic weight values are incremented by '1' each, whereas the two synapse values are decremented by '1' each, the total synapse weight remain constant after processing the spike packet. The synaptic weight value stored at indexes 01 (8031), 06 (8035), 12 (8039), 18 (8043), 21 (8047), 23 (8049) are unchanged.

The further embodiment discloses implementation of the learning when 1-bit input and multi-bit synaptic weight value are used. When the spike input values are 1-bit, an additional step of generating updated spike values is performed after multiplying the spike input values with the maximum synaptic weight values, before determining the reconstruction error.

In a first step, updated spike values are determined by multiplying each of the 1-bit spike values with the maximum synaptic weight value.

In a next step, a reconstruction error is determined by subtracting the updated spike value from the multi-bit synaptic weight values. It shall be noted that updated spike input values are used instead of the spike input values in this step.

Once the reconstruction error is determined, additional following steps are performed similar to the earlier embodiment of FIG. 8(*v*), which are summarized further. In a next step, underused spike and underused weights are determined and one or more pairs of the synaptic weight values are formed.

In a last step, one synaptic weight value of a pair that caused the underused spike is incremented, whereas another synaptic weight value of the pair that caused the underused weight is decremented. In case, there are multiple pairs, this step is performed for the rest of the pairs.

In some embodiments, the synaptic weight value pairs are incremented and decremented by more than 1. For example, FIG. 8(*vi*) depicts that for the two pairs (8190, 8188; 8186, 8184) determined using the earlier disclosed embodiment (with FIG. 8(*v*)) are incremented and decremented by 2 (instead of 1), thereby keeping the total synaptic weight constant. The example with this embodiment, depicts increment of more than 1 (2) by using technique described with FIG. 8(*v*) in earlier embodiment, however, synaptic weight can also be incremented and decremented by more than 1 for some of the other embodiments disclosed with this invention in a similar way.

The further embodiments of FIGS. 8(*vii*), 8(*viii*) and 8(*ix*) describe a learning method in which the synaptic weight values of synapses associated with a winning neuron varies when considering the synaptic weight values of one or more additional firing neuron (non-winning neuron). This approach is slightly different from the earlier embodiments as the earlier embodiments do not take into consideration the synaptic weight values of synapses associated with any other neuron apart from the winning neuron when determining the updated synaptic weight values for the synapses associated with the winning neuron.

The consideration of the synaptic weight values of all firing neurons (i.e., the winning neuron and one or more additional neurons that spike), guides the synaptic weight updates such that when a number of spike packets are processed, multiple firing neurons collectively move closer to the input, rather than individually moving closer, which advantageously leads to better accuracy during inference. When such a method is not used (e.g., the earlier embodiments), neurons individually move closer to the input with similar sets of weights (leading to redundancy-more neurons are required for the same task) and a higher reconstruction error (the measure of success). However, since additional computation is required for processing the synaptic weight values of the additional neuron(s), this will increase the memory requirement of the chip, and potentially increase the cost of the chip.

An example is provided to illustrate the benefits of this embodiment. Consider an example where some input images containing several objects are provided, and a network is required to learn a layer of neurons that collectively reproduce the image. Suppose in one image there are 3 objects-a ball, a cat, and a bike and 3 neurons that fire every time this image is seen. An ideal representation for the 3 neurons would be that each represents one of the objects. Using the other embodiments of the invention because each neuron does not consider what the other firing neurons represent, neuron weights will be spread evenly around all 3 objects. Therefore, all 3 neurons would each represent all 3 objects. In contrast, in the proposed embodiment, the neurons take into the consideration what the other firing neurons represent when they learn. As a result, each neuron learns a separate part of the input image. Ideally, they will converge on a representation of one object each, if they see the same object in different images containing other objects. Therefore, advantageously with this technique, successful pattern recognition can be achieved with a fewer neurons.

The proposed further embodiments of FIGS. 8(*vii*), 8(*viii*) and 8(*ix*) disclose this technique in greater detail.

FIG. 8(*vii*) depicts an example of one instance of learning when 1-bit input and 1-bit synaptic weight value is used for the learning in accordance with an embodiment of the invention. It is to be understood that the spike packets, and synapse weight values will vary extensively as the model is exposed to a range of input data (spike inputs/packets). In this embodiment, it shall be noted that each synapse can have 2 states, by having a synaptic weight value of either '0'-which is an absence state or '1, which is a presence state, or vice versa.

The synaptic weight values of synapses associated with a winning neuron are varied in this embodiment considering the synaptic weight values of one or more additional neurons of the network. Preferably, the additional neuron considered is from the same layer, as the winning neuron. Preferably, the neuron(s) of the same layer that receive a high membrane potential value (e.g., $2^{nd}$ highest or $3^{rd}$ highest) and generate a spike based on the received spike packet is (are) considered as the additional neuron(s).

The spiking of the neurons in this embodiment are preferably implemented when the spiking neuron circuits reach a firing threshold. The winning neuron can be determined by any one of the techniques disclosed in the other embodiments of the invention.

FIG. 8(*vii*) depicts a spike packet 8096 that is received by a postsynaptic neuron. Preferably, the postsynaptic neuron is a winning neuron with the highest membrane potential value, or the neuron randomly/arbitrarily chosen as the winning neuron, when a received input spike packet is processed by a set of the neurons. Only index 8092 is provided so that optimum use of the available space on the page is achieved. It shall be understood that each of spike value, synaptic weight value, reconstruction input and reconstructed error will be stored on separate indexes (not shown) such as index 8092. These separate indexes are referred as: input spike packet indexes (spike index), synaptic weight indexes (weight index), reconstruction input indexes and reconstructed error indexes.

The spike packet includes 14 fields (spike input indexes—0 to 13). Each index stores 1-bit (0 or 1) spike input value. Each spike bit corresponds to a 1-bit synaptic weight value of a winning spiking neuron circuit, a 1-bit synaptic weight value of an additional spiking neuron circuit (multiple 1-bit synaptic weight values in case of more than one additional spiking neuron circuits), a multi-bit reconstructed input and a multi-bit reconstruction error (or vice versa). The spike indexes 00, 01, 03, 05, 06, 07, 09, 10 and 12 are highlighted indicating that they contain a logic '1' value (e.g., indicating the presence of a spike). The remaining positions within spike packet 8096 contain zeros (e.g., indicating the absence of a spike).

As can be seen in the FIG. 8(*vii*), the present embodiment incorporates 1-bit synaptic weight values for each synapse weight index (0 to 13). The synapse weights 8098 are stored at 14 synapse weight indexes for a winning neuron (neuron 1). Each index stores a 1-bit synaptic weight value. The synaptic weight indexes 01, 03, 06, 07, 09, and 13 store a '1' synaptic weight value of the winning neuron. Similarly, the synapse weights 8100 are stored at 14 synapse weight indexes for an additional neuron (neuron 2). The synaptic weight indexes for the additional neuron, 01, 02, 03, 06, 07, and 08 store '1' synaptic weight value of the winning neuron, whereas the synaptic weight values of the rest of the indexes are '0'.

The neural processor(s) processes the spike packet and the synaptic weight values and initiate the changes in the 1-bit synaptic weight values for the winning spiking neuron circuit (neuron 1) by changing the synaptic weight values at some of the synaptic weight indexes to reflect the learning based on the received input spike packet.

The learning is implemented by incrementing and/or decrementing the synaptic weight values at certain indexes. In the given example of FIG. 8(*vii*), the processor determines the reconstructed input by summing the synaptic weight values of the winning spiking neuron circuit (neuron 1) and the synaptic weight values of the additional spiking neuron circuit (neuron 2). It should be noted that, more than one additional spiking neuron circuit can also be considered, and similarly reconstructed input can be determined by the neural processor(s) by an index-wise summing operation of the synaptic weight values of the two or more additional spiking neuron circuits.

Going ahead, the neural processor(s) determines the reconstruction error by subtracting the determined reconstructed input value from the spike input value.

Deviating from the earlier embodiments of the invention, the underused spikes (8106) are determined after considering the reconstruction error (instead of spike input values directly), in addition to considering the synaptic weight values of the winning spiking neuron circuit (neuron 1).

The underused spikes are determined to be the ones that corresponds to a positive reconstruction error and synaptic weight value of '0'. For example: 8120, 8118, 8116, and 8114 are determined as underused spikes in this example. The underused weights (8110) are determined to be the ones that correspond to a negative reconstruction error and synaptic weight value of '1'. For example: 8122, 8126, 8128, 8130, and 8132 are determined as underused weights in this example.

Going ahead, one or more pairs of synaptic eight values are randomly/arbitrarily determined, each pair containing two synaptic weight values associated with the winning neuron (neuron 1), one from the set of underused spikes (8120, 8118, 8116, and 8114 shown in indexes 1, 5, 10 and 12) and one from the set of underused weights (8122, 8126, 8128, 8130, and 8132, shown in indexes 1, 3, 6, 7, and 13).

Going ahead, synaptic weight values are varied to implement the learning based on the input spike packet, the synaptic weight value that caused the underused spikes/inputs, are incremented, whereas synaptic weight values that caused underused weights are decremented. As a result, synaptic weight values 8110 of the synapse weight indexes 0 (8124), 5 (8137), 10 (8142), and 12 (8144) are incremented by value '1' and synaptic wight values of the synapse weight indexes 1 (8134), 6 (8138), 7 (8140), and 13 (8146) are decremented by value '1'. As the four synaptic weight values associated with underused spikes/input are incremented, and the four underused synaptic weight values are decremented, the total synapse weight value remains constant after processing the spike packet (total synaptic weight value is six in this example). The synaptic weight value stored at index 5 (8136) is unchanged.

As a result of the learning, the synaptic weight values that are needed to better capture the spike packet (pattern) are made available (by providing '1's) in the spike weight indexes and synaptic weight values that are not relevant in view of the received input spike packet are made absent (by providing '0'), by varying the synaptic weight value of the winning spiking neuron circuit. Typically, this represents the synaptic change phenomenon of learning that exist in the biological brains.

According to the embodiment disclosed above, the neural processor(s) is configured to perform the learning by the following summarized steps.

In a first step, the neural processor(s) determines a plurality of 1-bit reconstructed input values by summing 1-bit synaptic weight values of synapses associated with the winning spiking neuron circuit of the layer and 1-bit synaptic weight values of synapses associated with at least one additional spiking neuron circuits.

In a next step, the neural processor(s) determines a plurality of multi-bit reconstruction error values by subtracting the multi-bit reconstructed input values from a value derived from multiplying the maximum synaptic value with the 1-bit spike input values.

In a next step, the neural processor(s) determines a first 1-bit spike input value in the spike packet that represents an underused spike, wherein the first 1-bit spike input value corresponds to a first positive reconstructed multi-bit error value and a first 1-bit synaptic weight value of '0'.

In a next step, the neural processor(s) determines a second 1-bit spike input value in the spike packet that represents an underused weight, wherein the second 1-bit spike input value corresponds to a second negative reconstruction multi-bit error value and a 1-bit synaptic weight value of value '1' of a second synapse of the winning spiking neuron circuit.

In a last step, the neural processor(s) increments the value of the first 1-bit synaptic weight value and decrements the value of the second 1-bit synaptic weight value. FIG. 8(*viii*) depicts an example of one instance of learning using the synaptic weight variation technique when 1-bit spike inputs and multi-bit synaptic weight values are used in accordance with an embodiment of the invention. As FIG. 8(*viii*) depicts, 1-bit spike inputs are stored on each spike input index whereas 4-bit synaptic weight values are stored on each spike input index. In this example, it shall be noted that each synapse can have 16 states, by having a synaptic weight value from '0 to 15'.

Similar to the earlier embodiment, the synaptic weights variation of synapses associated with a winning neuron in this embodiment is implemented considering the synaptic weight values associated with the additional neuron(s) of the network. Preferably, the additional neuron is chosen from the same layer of the network, which the winning neuron belongs to.

In some cases, the neuron(s) that receive the high membrane potential based on the received spike packet is considered as the additional neuron(s). Preferably, the winning neurons and the additional neuron(s) are the neurons that have spiked based on the received spike packet. The spiking of the neurons in this embodiment are preferably implemented when the spiking neuron circuits reaches a firing threshold. The winning neuron can be determined by any one of the techniques disclosed in other embodiments of the invention.

The FIG. 8(*viii*) depicts a spike packet 8150 that is received by a postsynaptic neuron via a plurality of synapses. Preferably, the postsynaptic neuron is a winning neuron with the highest membrane potential, or the neuron randomly/arbitrarily chosen as the winning neuron, for a received input spike packet.

Index 8148 is provided for reference purpose as each spike value, synaptic weight value, reconstruction input and reconstructed error will be stored on separate indexes (not shown). These separate indexes are referred as: input spike packet indexes (spike index), synaptic weight indexes (weight index), reconstruction input indexes and reconstructed error indexes.

Preferably, the winning neuron is determined as the neuron that has the maximum membrane potential value ($1^{st}$ highest), whereas a first additional neuron, a second additional neurons etc. are the neurons having $2^{nd}$ highest, $3^{rd}$ highest etc. membrane potential value. The synaptic weight values are varied for the neuron that has reached a threshold value.

The spike packet includes 25 spike input indexes (0 to 24) such that each index stores 1-bit (0 or 1) spike input value. Each spike bit corresponds to a multi-bit (4-bit) synaptic weight value of a winning spiking neuron circuit, a multi-bit (4-bit) synaptic weight value of an additional spiking neuron circuit (multiple 1-bit synaptic weight values in case of more than one additional spiking neuron circuits), a multi-bit reconstructed input and a multi-bit reconstruction error, or vice versa. The spike indexes 01, 08, 09, 15, 16, 18, 19, and 23 are highlighted indicating that they contain a logic '1' value (e.g., indicating the presence of a spike). The remaining positions within spike packet 8150 contain zeros (e.g., indicating the absence of a spike).

The present embodiment incorporates a multi-bit (4-bit) synaptic weight value for each synapse weight index (0 to 24). The synapse weights 8152 includes 25 (0 to 24) synapse weight indexes for a winning neuron (neuron 1). The synaptic weight indexes 01, 05, 06, 12, 14, 16, 18, 21, and 23 store synaptic weight values 12, 15, 2, 7, 9, 4, 15, 9, and 12 respectively, of synapses associated with the winning neuron, whereas the synaptic weight values of the rest of the indexes are '0'. Similarly, the synapse weight indexes 8154 store 25 synapse weight indexes 01, 03, 05, 06, 09, 11, 12, 14, 15, 16, and 23 store synaptic weight values 3, 4, 1, 9, 15, 12, 13, 4, 6, and 7 respectively of synapses associated with an additional neuron (neuron 2), whereas the synaptic weight values of the rest of the indexes are '0'.

The neural processor(s) processes the spike packet and the synaptic weight values (associated with the winning neuron and the additional neuron) and initiates the change in the 4-bit synaptic weight values (8152) for the winning spiking neuron circuit (neuron 1) by changing the synaptic weight values at some of the synaptic weight indexes to reflect the learning based on the received input spike packet.

In the given example with FIG. 8(*viii*), the neural processor(s) determines reconstructed input (8156) by summing the synaptic weight values of the winning spiking neuron circuit (neuron 1) and the synaptic weight values of the additional spiking neuron circuit (neuron 2). It should be noted that, more than one additional spiking neuron circuit can also be considered, and a similarly reconstructed input can be determined by the neural processor(s) by summing operation of the synaptic weight values of the two or more additional spiking neuron circuits with the synaptic weight values of the winning neuron. As can be noted in the FIG. 8(*viii*), an index wise summing operation is performed.

Going ahead, the neural processor(s) determines the reconstruction error by subtracting the determined reconstructed input value from a value 8158, that is achieved by multiplying maximum synaptic value and the spike input value. Both multiplying and subtracting operations are performed index wise.

The underused spikes 8160 are determined after considering the reconstruction error (instead of spike input values directly), in addition to synaptic weight values of the winning spiking neuron circuit (neuron 1).

The underused spikes are determined to be the ones that corresponds to a positive reconstruction error and synaptic weight value that is less than the maximum synaptic weight value. For example: 8168, 8170, 8172, and 8174 are determined as underused spikes in this example. The underused weights 8162 are determined to be the ones that correspond to a negative reconstruction error and positive synaptic weight values. For example: 8176, 8178, 8180, 8182, 8184, and 8186 are determined as underused weights in this example.

Going ahead, four pairs of synaptic weight values are randomly/arbitrarily determined, each pair containing two synaptic weight values of the winning neuron (neuron 1), one from the set of underused spikes (8168, 8170, 8172, and 8174 shown in indexes 8, 15, 16, and 19) and one from the set of underused weights (8176, 8178, 8180, 8182, 8184, and 8186, shown in indexes 5, 6, 12, 14, 21, and 23).

Going ahead, synaptic weight values are varied to perform the learning. The synaptic weight values that caused underused spikes/input, are incremented, whereas synaptic weight values that caused underused weights, are decremented. As a result, synaptic weight values 8164 stored in the synapse weight indexes 8 (8124), 15 (8137), 16 (8142), and 19 (8144) are incremented by '1' and synapse values of the synapse weight indexes 1 (8134), 6 (8138), 7 (8140), and 13 (8140) are decremented by '1'. As four synaptic weight values are incremented, and four synaptic weight values are decremented, the total synapse weight remains constant after processing the spike packet. The synaptic weight values stored at indexes 12 and 22 (8194 and 8206) are unchanged.

In case the same input spike packet 8148 is processed by the updated synaptic weight values 8164 in the next instance, as can be noted in the figure, the reconstruction error 8166, is reduced when compared to the earlier reconstruction error 8158. This can be noted, as the total reconstruction error, which is the sum of the absolute value of the synaptic weight values, is 136 after processing the input spike in the first instance and is 128 in the second instance after processing the same spike packet, clearly indicating the learning.

According to the embodiment disclosed above, the neural processor(s) is configured to perform the learning the following summarized steps.

In a first step, the neural processor(s) determines a plurality of multi-bit reconstructed input values by summing multi-bit synaptic weight values of synapses associated with the winning spiking neuron circuit of the layer and multi-bit synaptic weight values of synapses associated with at least one additional spiking neuron circuits of the network. Preferably the additional spiking neuron circuits is of the same layer of the network as the winning spiking neuron circuit.

In a next step, the neural processor(s) determines a plurality of multi-bit reconstructed input values by summing multi-bit synaptic weight values of synapses of the winning spiking neuron circuit of the layer and multi-bit synaptic weight values of synapses of at least one additional spiking neuron circuit of the network.

In a next step, the neural processor(s) determines a plurality of multi-bit reconstruction error values by subtracting the multi-bit reconstructed input values from the multi-bit spike input values, In a next step, the neural processor(s) determines a first multi-bit spike input value in the spike packet that represents an underused spike, wherein the first multi-bit spike input value corresponds to a first non-zero positive reconstructed multi-bit error value and a first multi-bit synaptic weight value of a first synapse of the winning spiking neuron circuit with a value that is less than a maximum synaptic value.

In a next step, the neural processor(s) determines a second multi-bit spike input value in the spike packet that represents an underused weight, wherein the second multi-bit spike input value corresponds to a second non-zero negative reconstruction multi-bit error value and a non-zero positive second multi-bit synaptic weight value of a second synapse of the winning spiking neuron circuit.

In a last step, the neural processor(s) increments the value of the first multi-bit synaptic weight value and decrements the value of the second multi-bit synaptic weight value.

FIG. 8(*ix*) depicts an example of one instance of learning using the synaptic weight variation technique when a multi-bit spike input and a multi-bit synaptic weight value are used in accordance with an embodiment of the invention. As FIG. 8(*ix*) depicts, the 4-bit spike input stored on each spike input index whereas the 4-bit synaptic weight value is stored on each spike input index. The input packets and synapse weights will vary extensively as the model is exposed to many different input packets. In this example, it shall be noted that each synapse can have 16 states, by having synaptic weight values from '0 to 15'. Similarly, the input can have '0 to 15' values.

Like the earlier embodiment, the synaptic weights variation of synapses associated with a winning neuron in this embodiment is implemented considering the synaptic weight values associated with the additional neuron(s) of the network. However, it is preferred that the additional neuron is in the same layer of the network that the winning neuron belongs to.

In some cases, the neuron(s) that receive the high membrane potential based on the received spike packet is considered as the additional neuron(s). Preferably, the winning neuron and the additional neuron(s) are the neurons that have spiked based on the received spike packet. The spiking of the neurons in this embodiment are preferably implemented when the spiking neuron circuits reach a firing threshold. The winning neuron can be determined by any one of the techniques disclosed in other embodiments of the invention.

Preferably, the winning neuron is determined as the neuron that has the maximum membrane potential value ($1^{st}$ highest), whereas a first additional neuron, a second additional neurons etc. are the neurons having $2^{nd}$ highest, $3^{rd}$ highest etc. membrane potential value. The synaptic weight values are varied for the neuron that has reached a threshold value.

FIG. 8(*ix*) depicts a spike packet 8210 that is received by a postsynaptic neuron by a plurality of synapses.

Index 8208 is provided for reference purpose as each of spike value, synaptic weight value, reconstruction input and reconstructed error will be stored on separate indexes (not shown). These separate indexes are referred as: input spike packet indexes (spike index), synaptic weight indexes (weight index), reconstruction input indexes and reconstructed error indexes.

The spike packet includes 25 spike input indexes (0 to 24) such that each index stores a multi-bit (4-bit) spike input value. Each multi-bit spike input value corresponds to a multi-bit (4-bit) synaptic weight value of a winning spiking neuron circuit, a multi-bit (4-bit) synaptic weight value of an additional spiking neuron circuit (multiple 1-bit synaptic weight values in case of more than one additional spiking neuron circuits), a multi-bit reconstructed input and a multi-bit reconstruction error. The spike indexes 01, 06, 08, 09, 15, 16, 18, 19, and 23 are highlighted indicating that they contain spike value 15, 5, 15, 8, 11, 14, 13, 9, and 4. The remaining positions within the spike packet 8210 contain zeros (e.g., indicating the absence of a spike).

The present embodiment incorporates a multi-bit (4-bit) synaptic weight value for each synapse weight index (0 to 24). The synapse weights 8212 include 25 (0 to 24) synapse weight indexes for a winning neuron (neuron 1). The synaptic weight indexes 01, 05, 06, 12, 14, 16, 18, 21, and 23 store synaptic weight values 12, 15, 2, 7, 9, 4, 15, 9, and 12 respectively, of synapses associated with the winning neuron, whereas the synaptic weight values of the rest of the indexes are '0'. Similarly, the synapse weight indexes 8214 store 25 synapse weight indexes 01, 03, 05, 06, 09, 11, 12, 14, 15, 16, and 23 store synaptic weight values 3, 4, 1, 9, 15, 12, 13, 4, 6, and 7 respectively of synapses associated with an additional neuron (neuron 2), whereas the synaptic weight values of the rest of the indexes are '0'.

The neural processor(s) processes the spike packet and the synaptic weight values (associated with the winning neuron and the additional neuron) and initiates the change in the 4-bit synaptic weight values (8212) of synapses associated with the winning spiking neuron circuit (neuron 1) by changing the synaptic weight values at some of the synaptic weight indexes to reflect the learning based on the received input spike packet 8210. In the given example with FIG. 8(*ix*), the neural processor(s) determines reconstructed input (8216) by summing the synaptic weight values of synapses associated with the winning spiking neuron circuit (neuron 1) and the synaptic weight values of synapses associated with the additional spiking neuron circuit (neuron 2). It should be noted that, more than one additional spiking neuron circuit can also be considered, and similarly reconstructed input can be determined by the neural processor(s) by summing the synaptic weight values of the two or more additional spiking neuron circuits with the synaptic weight values of the synapses associated with the winning neuron. As should be noted in the FIG. 8(*ix*), the summing operation is performed index wise.

Going ahead, the neural processor(s) determines the reconstruction error by subtracting the determined reconstructed input value 8216 from the spike input value 8210. As should be noted in the FIG. 8(*ix*), both multiplying and subtracting operations are performed index wise.

The underused spikes 8220 are determined after considering the reconstruction error (instead of spike input values directly), in addition to synaptic weight values of the winning spiking neuron circuit (neuron 1).

The underused spikes are determined to be the ones that corresponds to a positive reconstruction error and synaptic weight values that are less than the maximum synaptic weight value. For example: 8228, 8230, 8232, and 8234 are determined as underused spikes in this example. The underused weights 8222 are determined to be the one that corresponds to a negative reconstruction error and positive synaptic weight values. For example: 8236, 8238, 8240, 8242, 8246, 8248, and 8250 are determined as underused weights in this example.

Going ahead, four pairs of synaptic weight values are randomly/arbitrarily determined, each pair containing two synaptic weight values of the winning neuron (neuron 1), one from the set of underused spikes (8228, 8230, 8232 and 8234 shown in indexes 8, 15, 16, and 19) and one from the set of underused weights (8236, 8238, 8240, 8242, 8246, 8248, and 8250, shown in indexes 5, 6, 12, 14, 21, and 23).

Going ahead, learning of the model, through change in the synaptic weight values, is performed. The synaptic weight value that caused underused spikes/input, are incremented, whereas synaptic weight value that caused underused weights, are decremented. As a result, synaptic weight values 8212 stored in the synapse weight indexes 8(8256), 15 (8262), 16 (8264) and 19 (8268) are incremented by '1' and synapse values of the synapse weight indexes 1 (8252), 6 (8254), 14 (8260) and 21 (8270) are decremented by value '1'. As the four synaptic weight values are incremented, and the four synaptic weight values are decremented, the total synapse weight value remain constant after processing the spike packet. The synaptic weight values stored at indexes 13, 18 and 24 (8258, 8266 and 8272) are unchanged.

In case the same input spike packet 8210 is processed with the updated synaptic weight values 8212 in the next instance, as can be noted in the figure, the reconstruction error 8226 is reduced when compared to the earlier reconstruction error 8218. This can be noted, as the total reconstruction error, which is the sum of the absolute value of the synaptic weight values, is 140 after processing the input spike in the first instance and is 132 in the second instance after processing the same spike packet, clearly indicating the learning.

According to the embodiment disclosed above, the neural processor(s) is configured to perform the learning by the following steps.

In a first step, the neural processor(s) determines a plurality of multi-bit reconstructed input values by summing multi-bit synaptic weight values of synapses associated with the winning spiking neuron circuit of the layer and multi-bit synaptic weight values of synapses associated with at least one additional spiking neuron circuits of the layer.

In a next step, the neural processor(s) determines a plurality of multi-bit reconstructed input values by summing multi-bit synaptic weight values of synapses of the winning spiking neuron circuit of the layer and multi-bit synaptic weight values of synapses of at least one additional spiking neuron circuits of the layer.

In a next step, the neural processor(s) determines a plurality of multi-bit reconstruction error values by subtracting the multi-bit reconstructed input values from the multi-bit spike input values, In a next step, the neural processor(s) determines a first multi-bit spike input value in the spike packet that represents an underused spike, wherein the first multi-bit spike input value corresponds to a first non-zero positive reconstructed multi-bit error value and a first multi-bit synaptic weight value of a first synapse of the winning spiking neuron circuit with a value that is less than a maximum synaptic value.

In a next step, the neural processor(s) determines a second multi-bit spike input value in the spike packet that represents an underused weight, wherein the second multi-bit spike input value corresponds to a second non-zero negative reconstruction multi-bit error value and a non-zero positive second multi-bit synaptic weight value of a second synapse of the winning spiking neuron circuit.

In a last step, the neural processor(s) increments the value of the first multi-bit synaptic weight and decrements the value of the second multi-bit synaptic weight.

FIG. 8(*x*) and FIG. 8(*xi*) depict one instance of learning using synaptic weight variation when 1-bit spike input and multi-bit (2-bit) negative synaptic weight values are used, in accordance with additional embodiments of the invention. It is to be understood that the input packets and synapse weights will vary extensively as the model is exposed to input data (spike inputs/packets). In this embodiment, it shall be noted that each synapse can have three states having synaptic weight value of such as −1, 0 and 1. Preferably, weight variation is performed for the synapses that are associated with a winning neuron. The winning neuron can be determined by any one of the techniques disclosed in other embodiments of the invention.

The FIG. 8(*x*) depicts a spike packet 8276 that is received by a postsynaptic neuron. Index 8274 is provided for reference purposes as each of spike value, synaptic weight value, and reconstructed error will be stored on separate indexes (not shown). These separate indexes are referred as: input spike packet index (spike index), synaptic weight index (weight index) and reconstructed error index.

It shall be noted that in this embodiment and some embodiments earlier, no synaptic weight values of the additional neuron(s) are considered and hence the reconstructed input is the same as the spike packet. A person skilled in the art would appreciate that if additional neuron(s) are considered, the reconstructed input can be determined similar to this embodiment (by summing up the weights of the winning neuron and additional neuron(s)).

When the synaptic weight value of a winning neuron (or the reconstructed input) is negative, the reconstruction error is determined differently from the embodiments disclosed earlier.

The spike packet includes 14 spike input indexes (0 to 13) such that each index stores 1-bit (0 or 1) spike input values. Each spike bit corresponds to a 1-bit synaptic weight value of a winning spiking neuron circuit, a 1-bit synaptic weight value of an additional spiking neuron circuit (multiple 1-bit synaptic weight values in case of more than one additional spiking neuron circuits), a multi-bit reconstructed input and a multi-bit reconstruction error, or vice versa. The spike indexes 00, 01, 03, 05, 06, 07, 09, 10 and 12 are highlighted indicating that they contain logic '1' (e.g., indicating the presence of a spike). The remaining positions within spike packet 8276 contains zeros (e.g., indicating the absence of a spike).

As can be seen in the FIG. 8(*x*), the present embodiment incorporates 2-bit synaptic weight values for each synapse weight index (0 to 13) as it can be of values –1, 0 or 1. The synapse weights 8280 include 14 synapse weight indexes for a winning neuron (neuron 1) that store 1-bit synaptic weight values in each synapse weight index. The synaptic weight indexes 01, 02, 05, 12 and 13 store '1', the synaptic weight indexes 03, 06, 08 and 11 store '–1', and the synaptic weight values stored at the rest of the indexes are '0'.

In present embodiment, a converted spike packet 8278 is determined by converting 0s of the spike packet into 1s. Going ahead, reconstruction error 8282 is determined by subtracting the synaptic weight from the converted spike packet. The neural processor(s) processes the spike packet and the synaptic weight values and initiates the change in the 1-bit synaptic weight values for the winning spiking neuron circuit (neuron 1) by changing the synaptic weight values at some of the synaptic weight indexes to reflect the learning based on the received input spike packet. Preferably, the learning is implemented by incrementing and/or decrementing the synaptic weight values at certain indexes.

The underused spikes 8284 are determined to be the one that corresponds to a positive reconstruction error. For example: 8290, 8292, 8294, and 8296 are determined as underused spikes in this example. The underused weights 8286 are determined to be the ones that corresponds to a negative reconstruction error. For example: 8298, 8300, 8302, and 8304 are determined as underused weights in this example. In case additional neuron(s) is considered, the underused spikes are determined to be the ones that corresponds to a positive reconstruction error and synaptic weight value less than the maximum synaptic weight value, whereas the underused weights are determined to be the one that correspond to a negative reconstruction error and synaptic weight values that are more than the minimum synaptic weight value.

Going ahead, one pair of synaptic weight values is determined containing two synaptic weight values of the winning neuron, one from the set of underused spikes (8300 shown in index 8) and one from the set of underused weights (8294, shown in index 6). In this example, when selecting the pair, priority is given to the under used spike having the highest reconstruction error and under used weights having the lowest reconstruction error. However, the pair(s) can be chosen randomly/arbitrarily.

Going ahead, learning of the model through change in synaptic weight values, is performed. The updated synaptic weight values are depicted at weight updates 8288. The synaptic weight values that caused underused spikes/input, are incremented, whereas synaptic weight values that caused underused weights, are decremented. As a result, synaptic weight values of the synapse weight index 8 (8294) are incremented by '1' and synaptic wight values of the synapse weight indexes 5 (8306) are decremented by '1'. As one synaptic weight values is incremented, another synaptic weight value is decremented, hence the total synapse weight value remains constant after processing the spike packet. The synaptic weight value stored at rest of the indexes 5 are unchanged.

FIG. 8(*xi*) depicts an alternate way of synaptic weight variation implementation when 1-bit spike input and 2-bit negative synapse are used. In this method, underused weights 8318 and under used weights 8320 are determined using a different approach. Each synaptic weight value and its corresponding spike input value is processed, and it is determined whether the absolute synaptic weight value is required to be increased or decreased to move towards the corresponding spike input value. The spike input values corresponding to the synaptic weight values that require increase in the absolute value are the underused spikes (8326, 8328, 8330, 8332, and 8334), whereas the synaptic weight values that are required to be decreased in the absolute value to move towards to the corresponding spike input values are considered to be the underused weights (8336, 8338, 8340). Going ahead, three pairs of synaptic weight values are determined, each pair containing two synaptic weight values of the winning neuron, one from the set of underused spikes and one from the set of underused weights (8328, 8336; 8330, 8338; 8332, 8340). In this example, the pair(s) are determined randomly/arbitrarily. A person skilled in the art would appreciate that one or more of the pairs can be selected as per the present embodiment.

Once the pairs are selected, learning of the model through change in the synaptic weight values is performed. The synaptic weight values that caused underused spikes/input, are incremented, whereas synaptic weight values that caused underused weights, are decremented. In particular, the synaptic weight values 8344, 8348, and 8352 are incremented by absolute value '1' and the synaptic wight values 8346, 8350, and 8356 are decremented by absolute value '1'. As three synaptic weight values are incremented in absolute values, whereas three synaptic weight values are decremented in absolute values, the total synapse weight in absolute value remains constant after processing the spike packet. The synaptic weight value stored at the rest of the indexes (8342, 8354) are unchanged.

FIG. 8(*xii*) and FIG. 8(*xiii*) depict one instance of learning using synaptic weight variation when 1-bit spike inputs and multi-bit (4-bit) negative synaptic weight values are used, in accordance with additional embodiments of the invention. In this embodiment, it shall be noted that each synapse can have 16 states having synaptic weight values of such as –7 to 7 (the earlier embodiment with FIGS. 8(*x*) and 8(*xi*) had three states). Preferably, weight variation is performed for the synapses that are associated with a winning neuron. The winning neuron can be determined by any one of the techniques disclosed in other embodiments of the invention.

The embodiments of synaptic weight variation in FIG. 8(*xii*) and Fig. (xiii) uses the same approach described in earlier embodiments in FIG. 8(*x*) and FIG. 8(*xi*) respectively, with the only change being the method of generating a converted spike input, when the range of synaptic weight values is more than 3 (16 in these embodiments). Importantly, the converted spike packet is generated by converting 0s to –7 and Is to +7. It shall be noted that when the spike input value is 1 bit, 0s are converted to the minimum synaptic weight value and Is are converted to the maximum synaptic weight value, or vice versa.

FIG. 8(*xii*) depicts the weight variation (8372) for one pair (8398, 8400), which is determined randomly/arbitrarily. The synaptic weight values at the rest of the indexes are unchanged.

FIG. 8(*xiii*) depicts the weight variation (8414) for four pairs (8442, 8438; 8446, 8444; 8450, 8448; 8452, 8456). The synaptic weight values at the rest of the indexes are unchanged (e.g., 8436, 8440).

FIG. 8(*xiv*) and FIG. 8(*xv*) depict one instance of learning using synaptic weight variation when multi-bit (4-bit) spike inputs (0 to 15) and multi-bit (4-bit) synaptic weight values (−7 to 7) are used, in accordance with additional embodiments of the invention. In this embodiment, it shall be noted that each synapse can have 16 states having synaptic weight value ranging from −7 to 7. Preferably, weight variation is performed for the synapses that are associated with a winning neuron. The winning neuron can be determined by any one of the techniques disclosed in other embodiments of the invention.

The example of weight variation with FIG. 8(*xiv*) uses the same approach described in an embodiment with FIG. 8(*x*), with the only change being the method of generating a converted spike input. As can be seem in the FIG. 8(*xiv*), the converted spike packet is generated by subtracting 7 from the spike input value. The 7 is chosen after determining how much spike packet values need to move (positively or negatively) to be in the range of the synaptic weight value. For example, if the spike input value is 0 to 31 (32 integer range) and the synaptic weight values are 16 to 47 (32 integer range), the reconstructed spike value can be determined by adding a value 16 to the spike values.

It should also be noted that, this example discloses performing weight variation (8472) for one pair (8502, 8504) only, where the pair is determined by giving priority to the highest and lowest reconstruction error value.

The example of weight variation with FIG. 8(*xv*) uses the same approach described in an embodiment with FIG. 8(*xi*), with the only change being that the present embodiment doesn't need to determine the converted spike packet, since the range of the spike input values (−7 to 7) and the synaptic weight values (−7 to 7) are same.

FIG. 8(*xv*) depicts an alternate way of synaptic weight variation implementation when multi-bit (4-bit) spike inputs and multi-bit (4-bit) synaptic weights are used. In this embodiment, both the spike inputs and the synaptic weight values can have positive and negative values. In this embodiment, the weight variation is performed preferably for the synapses that are associated with a winning neuron. The winning neuron can be determined by any one of the techniques disclosed in other embodiments of the invention.

Each synaptic weight value and its corresponding spike input value is processed, and it is determined whether the absolute synaptic weight value is to increase or decrease to move towards the corresponding spike input value. The spike input values corresponding to the synaptic weight values that require increase in the absolute value are the underused spikes (8458, 8460, 8462, and 8464), whereas the synaptic weight values that require to be decreased in the absolute value to move towards to the corresponding spike input values are the underused weights (8466, 8468, 8470, 8474, and 8476). Going ahead, four pairs of synaptic weight values are determined, each pair containing two synaptic weight values of the winning neuron, one from the set of underused spikes and one from the set of underused weights (8478, 8480; 8484, 8482; 8488, 8486; 8491, 8490). In this example, the pair(s) are determined randomly/arbitrarily, however, they can be chosen based on giving priority to the synaptic weight values that require a high level of increase or decrease in the absolute values to move towards the spike input values. A person skilled in the art would appreciate that one or more numbers of the pairs can be formed as per the present embodiment.

Once the pairs are formed, learning of the model through change in the synaptic weight values is performed. The synaptic weight values that caused underused spikes/input are incremented in absolute value, such that the values reach closer to the corresponding spike input values, whereas synaptic weight values that caused underused weights, are decremented in absolute value, such that the values are more distant to the corresponding spike input value. As a result, synaptic weight values 8478, 8484, 8488, and 8491 are incremented by value '1' in absolute value each and synaptic wight values 8346, 8350, and 8356 are decremented by value '1'. Four synaptic weight values are incremented, and four synaptic weight values are decremented, hence the total synapse weight value in absolute value remain constant after processing the spike packet. The synaptic weight values stored at rest of the index (example: 8492) are unchanged.

FIG. 8(*xvi*) depicts an alternate way of synaptic weight variation implementation when multi-bit (4-bit) spike inputs and multi-bit (4-bit) synaptic weight values are used. In the present embodiment, both spike input values and synaptic weight values can have positive and negative values. In this embodiment, the weight variation is performed preferably for the synapses that are associated with a winning neuron. The winning neuron can be determined by any one of the techniques disclosed in other embodiments of the invention.

As can be noted in FIG. 8(*xvi*), each synapse can have 16 states having any synaptic weight value from −7 to 7. Preferably, weight variation is performed for the synapses that are associated with a winning neuron. The winning neuron can be determined by any one of the techniques disclosed in other embodiments of the invention.

As the figure depicts, a spike packet 8506 is received by a postsynaptic neuron. Index 8506 is provided for reference purpose as it should be understood each of spike input value and synaptic weight value will have its own index in the memory. These separate indexes are referred as: input spike packet index (spike index) and synaptic weight index (weight index). It shall be noted that in this example, no additional neuron is considered when performing the synaptic weight variation and so the reconstructed input is the same as the spike packet. A person skilled in the art would appreciate that if additional neuron(s) are considered, the reconstructed input can be determined like the earlier described embodiments (summing up the weights of the winning neuron and additional neuron(s) as described in earlier embodiment with FIG. 8(*ix*)).

When both the spike input 8508 (or the reconstructed input—not shown) and synaptic weight 8510 of a winning neuron can have positive and negative synaptic strength values, the reconstruction error 8512 is determined differently from the embodiments disclosed earlier (such as embodiment with FIG. 8(*ix*)). In the present embodiment, the neural processor(s) checks if a spike input value is positive or negative. If the spike value is positive, the reconstruction error is determined by subtracting the spike packet from the synaptic weight value. If the spike value is negative, the reconstruction error is determined by subtracting the synaptic weight value from the spike packet. Once the reconstruction error 8512 is determined for all the indexes (14 in this case) of the spike packet, further steps are performed by the neural processor(s).

The neural processor(s) further determines the underused spikes and underused weights. The underused spikes 8514 are determined to be the ones that corresponds to a positive reconstruction error. For example: 8520, 8522, 8524, 8526, 8528, 8530, 8532, and 8534 are determined as the underused spikes in this example. The underused weights 8516 are determined to be the ones that corresponds to a negative reconstruction error. For example: 8536, 8538, 8540, and 8542 are determined as the underused weights in this example.

In case additional neuron(s) is (are) considered (similar to the embodiment with FIG. 8(*ix*)) the underused spikes are determined to be the ones that correspond to a positive reconstruction error and synaptic weight values less than the maximum synaptic weight value, whereas the underused weights are determined to be the ones that correspond to a negative reconstruction error and synaptic weight value that is more than the minimum synaptic weight value.

Going ahead, one or more of the synaptic weight values of the winning neuron that correspond to underused spikes are incremented or one or more of the synaptic weight values of the winning neuron that corresponds to underused weights are decremented. For example, a synaptic weight value having the lowest reconstruction error (highest in the absolute value) is determined corresponding to underused weight 8538 is chosen to increment to reflect the learning based on the spike packet (refer weight update 8518).

Alternatively, like examples with earlier embodiments, one or more pairs of synaptic weight values can be determined, each pair having two synaptic weight values of the winning neuron, one from the set of synaptic weight values that caused underused spikes, and another from the set of synaptic weight value that caused underused spikes/input. Going ahead, like the earlier embodiments, the synaptic weight values that caused underused spikes are incremented, whereas the synaptic weight values that caused underused weights are decremented. When choosing the synaptic weight value for the increment or the decrement, the neural processor(s) gives priority to the underused spikes that has the highest/high reconstruction error and underused weights having the lowest/low reconstruction error, however, this can be chosen randomly/arbitrarily as well.

In some embodiments, the neural processor(s) is configured to allow more than 1 neuron to fire per layer of the network for each received spike packet. This configuration is achieved by setting up one or more firing threshold for the neurons of the network. Whenever, a firing threshold is achieved associated with a neuron for the received input spike packet, the neuron is configured to spike.

The embodiments disclosed with FIGS. 8(*i*) to 8(*xv*) discloses a synaptic weight variation technique such that after processing a spike packet, the total synaptic weight values of synapses associated with a post-synaptic neuron (or a winning neuron) is unchanged. However, in some embodiments, the neural processor(s) is configured to implement the synaptic weight variation without any constraint. More specifically, without considering whether the total synaptic weight values of synapses associated with the post-synaptic neuron (or a winning neuron) is unchanged or not. Preferably, such an approach is incorporated when the synaptic weight values are multi-bit and when the membrane potential is determined using any of the methods 2-4 disclosed earlier.

In some embodiments, to define multi-bit synapse weights in the network and define its evolution when the network learns, the following parameters are used:

$w_{max}$—the maximum synaptic weight value (set by the number of bits assigned to synapses; for the example given in FIG. 8(*iii*), 15 is the maximum synapse wight value; and to define that 4-bit will be required in each of the synapse weight indexes. Other example can be—for 5 bits up to 32 maximum synaptic weight value and for 6 bits up to 64 maximum synaptic weight value can be defined)

$w_{delta}$—the change in synaptic weight on each learning event (for the example given in FIG. 8(*iii*), it is set to +1 for increment (refer: 8026, 8030, 8036) and −1 (refer: 8028, 8032, 8038) for decrement.)

$w_{init}$—the initial synaptic weights (preferably, these are randomly/arbitrarily chosen weights)

The above-described techniques of synaptic weight variations can be performed for all the neurons that have reached associated learning thresholds. However, the inventors have determined that when the synaptic weight values are varied for more than one neuron when they reach an associated learning threshold value for a received input spike packet, it causes multiple neurons to learn the same input packet, and thereby reducing the efficiency of the network. Thereby, synapse weight variation for only 1 neuron is preferred, resulting only one neuron learning a specific spike packet.

In some embodiments, such as the embodiments with FIG. 8(*iii*), FIG. 8(*iv*), 8(*v*), FIG. 8(*vii*), 8(*viii*), 8(*ix*), 8(*x*), 8(*xi*), 8(*xii*), 8(*xiii*), 8(*xiv*), 8(*xv*) and 8(*vi*), the synaptic weight value increment and/or decrement can be by an integer value of two or more.

In some embodiments, the total synapse strength value is kept constant when a batch of spike packets is processed. For example, an additional debt value (positive or negative) is maintained when a plurality of spike packets is processed and at the end of the processing the debt value is maintained to be less than a threshold (e.g., 0, 20, −10).

In the above embodiments, only synapses associated with the winning neuron from where the winning neuron receives the spike input(s) are only considered for the synaptic weight variations to reflect the learning.

In some embodiments, when spike inputs and synaptic weight values are not within the same range, and additional steps are performed to bring them within the same range. A person skilled in the art would appreciate that the figures with the earlier embodiments represent decimal values in the spike and the synaptic weight indexes, however, they are stored and processed as binary values in hardware. The present intention offers advantages as the learning is implemented in hardware, which can receive input data of different types in 0s and 1s and perform unsupervised learning.

In some embodiments, such as the embodiments with FIGS. 8(*vii*), 8(*x*) and 8(*xi*), earlier disclosed method type 1 is used to determine the membrane potential for each of the spiking neuron circuit in a layer.

It shall be understood that mathematical operation described in the embodiments with FIGS. 8, 8(*iii*) to 8(*xvi*) can be performed using one or more of weight swapper 113, weight incrementor and decrementor 150, ALU 152, and AND circuits (107,108) and counter 109, using dedicated hardware available on the neural fabric or through software running on the processor complex.

Preferably, to implement embodiments with FIG. 8(*iii*)-8(*xvi*), ALU 152 and weight incrementor and decrementor 150 are used.

Preferably, to implement embodiment with FIG. 8, AND circuits (107, 108), counter 109 and weight swapper 113 are used.

Further embodiments provide system, apparatus, device, method and/or computer program product embodiments, and/or combinations and sub-combinations thereof for an improved spiking neural network (SNN) configured to learn and perform extraction of features from an input stream in supervised or semi-supervised mode of learning to achieve one/low/multi shot learning.

One/low shot learning is a task whereby the network tries to learn a new class from a very few training samples.

Advantageously, the disclosed embodiments allow the spiking neural network to learn even with less than 5 samples in some application (e.g., face recognition).

The learning process disclosed for one/low shot learning technique is computationally lightweight as it can be performed locally (on edge) on a low power and computationally less-efficient device. Rather than fully focusing on achieving an impressive accuracy during inference, the disclosed one/low shot learning methods focus on achieving reasonable accuracy in a constrained situation. The constrained situation could be due to unavailability of reliable internet, a hardware that can only implement simpler algorithms, a device with low battery life, an application that require low latency (accidental avoidance situations in self driving vehicles) etc.

FIG. 9 depicts a base spiking neural network having 4 layers that is implemented and trained using the embodiments of the invention or any other techniques known in the art.

To implement the network using the embodiments of the present invention, neural network configuration is defined such that the neuron fabric implements the spiking neuron circuits L11, L12, L13, L14, L15, L21, L22, L23, L24, L31, L32, L33, L41, L42, and L43, and their associated synapses are achieved as connections shown.

Once the network is implemented on a neuromorphic system (e.g., a chip), it is trained using a primary training data set. The primary training data set is converted into spikes and the spikes are further packetized and provided as input through input sources I11, I12, I13, I14, I15, and I16 through synapses to the spiking neuron circuits (L11, L12, L13, L14, L15) of the $1^{st}$ layer (L1). The spiking neuron circuits (L11, L12, L13, L14, L15) of the $1^{st}$ layer (L1) fire when a firing requirement is met (e.g., the associated membrane potential value reaches a firing threshold value). As a result of the firing, the spikes from the spiking neuron circuits (L11, L12, L13, L14, L15) of the $1^{st}$ layer (L1) are received by the spiking neuron circuits (L22, L22, L23, L24) of the $2^{nd}$ layer (L2). Similarly, spikes are received by the spiking neuron circuits of the further layers. The synaptic weight values of the network are varied with any one of the synaptic weight value variation techniques disclosed in earlier embodiments. The synaptic weight values can be 1-bit or multi-bit.

Once the base neural network is fully trained, it recognizes patterns from the received input data and perform a task that is achieved by the classification operation implemented by the neurons in the 4th (last) layer of the network. Each spiking neuron circuit in the layers $1^{st}$, $2^{nd}$, and $3^{rd}$ layer detects a pattern. For example, L32 detects a broader level feature based on few features detected by earlier spiking neuron circuit L21, L22, L23, and L24 that it receives spikes from. Since, each of the spiking neuron circuit L21, L22, L23, and L24 receive spike from earlier spiking neuron circuit L11, L12, L13, and L14 in the $1^{st}$ layer (L1), feature detected by spiking neuron circuit L32 depends on features recognized by all the spiking neuron circuits of the $1^{st}$ and $2^{nd}$ layer.

As described in earlier embodiments (FIGS. 8(i) and 8(ii), synaptic weight value variation is performed after selecting a winning spiking neuron circuit for each layer of the network for each received packet based on the membrane potential value of all the spiking neuron circuits of the layer. The figure element of 80004 of FIGS. 8(i) and 80016/80022 of FIG. 8(ii) showcase the process in this regard.

When the base spiking neural network is implemented and fully trained, and a user needs to perform additional training using a secondary training data set which is different from the primary training data set, the following training methods (with FIGS. 10-15) are proposed. These methods utilize semi-supervised and supervised learning methods.

The primary and secondary training data used in further embodiments are different, however, have some common characteristics. For example, a primary data set can have images with people's faces, and a secondary data set can have people's faces that were not present in the primary data set.

FIG. 10 depicts a modified neural network which is implemented by modifying a base spiking neural network shown in FIG. 9. The base neural network is modified by providing updated network configuration parameters to the neural processor by a user, communicated via a supplementary processor, such as processor complex (204).

As depicted, the modified neural network includes 2 supplementary neurons (L44 & L45), wherein each neuron learns to represent a unique class. Rather than implementing a new network from scratch with additional classes in the last layer (e.g., L44 (1002) and L45 (1004) as shown in FIG. 10 and training it with a complete data set (primary training data set and secondary training data set), the base spiking neural network is modified using the base neural network to implement a modified spiking neural network that includes two supplementary spiking neuron circuits (L44 and L45) and further trained only using the secondary training data set. Advantageously, this saves time and efforts of a user, and facilitates continuous learning.

By this technique, synaptic weight values of synapses associated with the neurons L44 and L45 (shown as dotted lines) are only determined based on the learning achieved by feeding the secondary data set. The synaptic weight values are determined using synaptic weight variation techniques disclosed in earlier embodiments. The synaptic weight values of the synapses associated with earlier neurons are retained/reused. By this technique, advantageously, the high-level learning achieved by existing neurons of layers L1-L3 that were trained using the primary training data set, is combined with supplementary learning achieved by supplementary neurons (L44 and L45) using the secondary training data set, to perform an additional task.

During the learning process, the secondary training data set is fed into the modified spiking neural network in a supervised mode, rather than in an unsupervised learning mode. For example, the user feeds to the network the secondary data that is related to a new class in a supervised mode. The neural processor receives the secondary data and converts that data into spikes. A plurality of spike packets is formed and processed further. Each layer receives a plurality of spike packets. The first layer receives spike packets from the input layer, whereas the subsequent layers receive the spike packets as a result of spikes generated due to firing of the neurons in the earlier layers. At each layer, when processing each of the spike packets, only one spiking neuron circuit is selected as a winning spiking neuron circuit (winning neuron) and synaptic weight value variation is performed for synapses associated with it.

In this example, the winning spiking neuron circuit is selected out of L44 and L45 neurons, while not considering the membrane potential value of rest of the neurons in the layer. The membrane potential values of neurons L41, L42 and L43 are either not determined or ignored when selecting the winning spiking neuron circuit. Preferably, a neural processor receives the secondary data as an input and a class information the secondary data relates to. When the neural processor receives secondary data related to a new class, it randomly or arbitrarily selects a supplementary neuron for the learning. In order to, not consider (ignore) membrane potential value of one or more spiking neurons of the layer during the learning, a user typically provides at least one of the class information pertaining to the secondary training data set, and one or more supplementary spiking neuron information.

In some embodiments, the neurons are allocated to a different class of secondary data after processing one or more initial packets of the secondary data set. A neuron which receives high membrane potential value(s) for a specific class of the secondary data set—is allocated to that class.

In some embodiments, a supplementary neuron for a class of the secondary data fed to the network is chosen by a user.

In case of a one-shot learning, no subsequent data is fed to the model and synaptic weight values varied based on the received first data (e.g., an image having a face) are finalized (determined) to be used during the inference.

In case of a multi-shot learning, more than one data input (e.g., multiple images) for a same class is fed to train a supplementary neuron.

The learning method performed in this embodiment is referred as the supervised learning method since the neural processor receives the secondary data, class information in respect of the secondary data, and results in learning of only one supplementary neuron to recognize that class.

A person skilled in the art would appreciate that embodiment described with FIG. 10 can also be implemented similarly when no neurons of the base network in the last layer (e.g., L41, L42, L43) are retained in the modified neural network.

FIG. 11 depicts a modified neural network which is implemented by modifying a base spiking neural network shown in FIG. 9. The base neural network is modified by providing updated network configuration parameters to the neural processor by a user.

As depicted, the modified network includes 2 supplementary neurons, which learn to represent a same class (two sub-classes of a same class in other words) whereas the earlier spiking neuron circuits L41, L42, and L43 represent three unique classes. As the figure depicts, two spiking neuron circuits L44 (1102) and L44 (1104) are additionally included in the modified spiking neural network by modifying the base neural network. In the present embodiment, instead of supervised learning mode that is described with embodiments with FIG. 10, a semi-supervised mode of learning method is performed to train neurons L44 (1102) and L44 (1104).

The method is referred as the semi-supervised learning method since the neural processor receives the secondary data, class information of the secondary data, and further result in learning of two or more supplementary neurons to recognize the same class.

During the learning, the synaptic weight values of synapses associated with the earlier spiking neuron circuits are not changed, whereas the synaptic weight values of synapses associated with the supplementary spiking neuron circuits are allowed to be changed. The neural processor receives spikes generated from the secondary data, class information, and further result in learning of more than two supplementary neurons to recognize that class.

As the spikes (spike packets) related to the secondary data are processed, only one of the spiking neuron circuits L44 (1102) or L44 (1104) is selected as the winning neuron to achieve learning based on the spikes related to the secondary data and synaptic weights values are varied for the winning neuron. In case of multi-shot learning, each of the spiking neuron circuit L44 (1102) & L44 (1104) would typically learn to recognize a sub-class of a same class.

In some embodiments, the neural processor is configured to recruit a supplementary spiking neuron circuit(s) without user involvement. For example, when secondary data set related to a class is diverse and does not include limited common features. For instance, a handwritten digit 7 can be written with or without a horizontal bar halfway down, and so both can be different in appearance. Since both would need to be classified as "7" in a same class, two neurons L44 (1002) and L44 (1104) can be trained to collectively recognize both visual appearances of it. It shall be understood that this use case can also be implemented with embodiments with FIG. 10, however, it may not provide the accuracy as that can be achieved with the present embodiment.

In some embodiments, a processor complex receives configuration parameters to implement a modified neural network. The configuration parameters may include number of supplementary neurons to be included and the number of supplementary neurons allowed to learn to recognize a class.

In some embodiments, the modified base spiking neuron circuits as shown in FIG. 10 and FIG. 11 can further be modified and trained to achieve further modified network by including supplementary spiking neuron circuits in the layers already present or by providing them in one or more additional layer(s). The semi-supervised or supervised learning techniques would be used to train the further modified network.

When supplementary spiking neuron circuits are included in the Nth (last) layer of a base network, the packetizer changes the packetizing operation for spiking neuron circuits of N−1 layer. For example, as shown in FIG. 12, the packetizing operation for each spiking neuron L31, L32, and L33 of layer L3 (N−1 layer) will be changed from 1202 to 1204 as each neuron L31, L32, and L33 is connected to two additional neurons. Importantly, to implement the learning, each spike value is mapped to a synaptic weight value in one-to-one mapping. Therefore, the packetizer changes the packetizing operation to have 5 spike values (activations in other words) instead of 3 spike values (activations in other words) in a packet. For example, the spike values (activations) 0, 12, 3, 4, and 2 of the updated packets are sent across synapses having synaptic weight values 0, 5, 10, 13, and 0 respectively. As can be seen in the figure elements 1206 and 1208, additional synaptic weight values are needed to be stored in the memory.

FIG. 13 depicts a modified neural network that is implemented by modifying a base spiking neural network shown in FIG. 9. The modified network includes 5 supplementary neurons-L44 (1302), L45 (1304), L46 (1306), L46 (1308), and L46 (1310). One existing neuron L41 is retained and two neurons L42 and L43 are removed from the base network. The neurons L46 (1306), L46 (1308), and L46 (1310) are trained to represent a same class (three sub-classes of a same class in other words) whereas the neurons L41, L44, and L45 are trained to represent a unique class. The synaptic weight values of synapses associated with spiking neuron circuits L44 and L45 are determined using supervised learning as described in embodiment with FIG. 10 and the synaptic weight values of synapses associated with spiking neuron circuits L46 (1306), L46 (1308), and L46 (1310) are determined using semi-supervised learning as described in embodiment with FIG. 11. The synaptic weight values of synapses associated with the rest of the neurons are unchanged.

FIG. 14 depicts a modified neural network which is implemented by modifying a base spiking neural network shown in FIG. 9. The modified neural network is different from the earlier embodiments of FIG. 13 only in an aspect that none of the spiking neuron circuit in the last layer from the base network is retained. The neurons L44 and L45 are trained using supervised learning mode described with FIG. 10, whereas the neurons L46 (1406), L46 (1408), and L46 (1410) are trained using a semi-supervised learning mode described with FIG. 11.

FIG. 15 depicts a modified neural network which is implemented by modifying a base spiking neural network shown in FIG. 9. The modified neural network is different from the earlier embodiments described with FIGS. 10-14 in an aspect that all neurons of layers L1-L4 are retained, and supplementary neurons are added in a layer L5 (instead of L4), which includes neurons L51 (1502), L52 (1504), L52 (1506), L52 (1508), and L53 (1510). The neurons L51 (1502) and L53 (1510) are trained using supervised learning mode described with FIG. 10, whereas the neurons L52 (1504), L52 (1506), and L52 (1508) are trained using a semi-supervised learning mode described with FIG. 11.

A person skilled in the art would appreciate that FIGS. 10-15 describe the learning process through simple examples. In practical applications, the number of neurons in each layer, the number of supplementary neurons and the number of supplementary neurons per class will vary, which preferably, will be defined using the network configuration parameters.

In some embodiments, the base neural network includes one or more feedback connections from spiking neuron circuit(s) of a layer to spiking neuron circuit(s) of another layer.

In some embodiments, a base network is trained using techniques not disclosed in the present invention. For example, a conventional non-spiking base network implemented and trained using conventional non-spiking techniques can be converted into a spiking base neural network as shown in FIG. 9 before modifying and training as per the various techniques disclosed in the embodiments of the invention.

In some embodiments, the conventional non-spiking base network is implemented and trained off-chip using conventional training methods. A number of non-spiking base network parameters are determined and converted into spiking base network parameters using a quantization process. Going further, the determined base spiking network parameters are used to implement a base spiking network on a chip. Lastly, the base spiking network is modified and trained using the techniques disclosed in earlier embodiments.

FIG. 16 depicts a spiking neural network which is implemented and further trained using a training data set using a multi-shot learning method. Whilst objective of one/low shot learning method disclosed in earlier embodiments is to achieve learning utilizing prior learning of a base neural network using a smaller number of training data, the spiking neural network in the present embodiment is trained from scratch. The spiking neural network has an input layer and an output (last) layer L1. The output layer L1 includes neurons C1 (1602), C2 (1604), C2 (1606), C2 (1608), and C3 (1610). The neurons C1 (1602) and C3 (1610) are trained using a supervised learning method like the embodiment described with FIG. 10. The neurons C2 (1604), C2 (1606) and C2 (1608) are trained using a semi-supervised learning method like the embodiment described with FIG. 11.

The synaptic weight values associated with all the neurons are varied as the network learns on the training data set of corresponding class. Once the network is fully trained, neuron C1 (1602) classifies data related to a first class; neuron C2 (1604), C2 (1606), and C2 (1608) classify data related to a second class; and C3 (1610) can classify data related to a third class, during inference.

A person skilled that shall appreciate that additional layers can also be added in the spiking neural network shows at FIG. 16 and further be trained using the embodiments of the present invention.

In some embodiments, the neural processor dynamically optimizes the number of supplementary neurons and the number of supplementary neurons per class, by configuring more supplementary neurons in the network or by unconfiguring the unnecessary supplementary neurons in the network during the training.

It shall be understood that synaptic weight values of synapses associated with the supplementary neurons are of binary values (1-bit or multi-bit) and not floating-point (decimal) values. In the earlier embodiments, rather than determining synaptic weight values or feature vectors using software that can conveniently deal with any floating-point values, the synaptic weight values are set and determined (varied) in binary (1-bit or multi-bit value). This way of implementation does not allow implementation of other software algorithms to run on the hardware (or a chip), however, is advantageous due to its low power requirements.

According to the invention there is provided a system, comprising: a neural processor, for one or more spiking neural network layers of a neural network, configured to: determine a membrane potential value for each of a plurality of spiking neurons present in a spiking neural network layer of the neural network from the one or more spiking neural network layers of the neural network, based on input data and synaptic weight values of synapses associated with each of the plurality of spiking neurons; determine a set of spiking neurons from the plurality of spiking neurons in the spiking neural network layer of the neural network whose membrane potential values has reached a corresponding learning threshold value which is indicative of a learning function for the neural network; determine a winning spiking neuron from the set of spiking neurons in the spiking neural network layer of the neural network for the input data; and perform synaptic weight value variation for one or more synapses associated with the winning spiking neuron to reflect the learning function for the neural network based on the input data.

In one or more embodiments, the system further comprises: a packetizer configured to generate a spike packet comprising a plurality of spike input values formed by one or more spikes generated based on the input data, wherein each spike input value in the spike packet corresponds to a synaptic weight value of a synapse in a plurality of synapses; a reconfigurable neuron fabric comprising the neural processor comprising a plurality of spiking neuron circuits, associated with the plurality of spiking neurons, to perform a task based on the one or more spikes and a neural network configuration; and a memory comprising the neural network configuration, wherein the neural network configuration comprises a potential array and the plurality of synapses, the neural network configuration defines connections between the plurality of spiking neuron circuits and the plurality of synapses in the one or more spiking neural network layers, the potential array comprising membrane potential values for the plurality of spiking neuron circuits, and the plurality of synapses having corresponding synaptic weight values.

In one or more embodiments, the spike packet may include a plurality of indexes, each index storing one or more spike bits, each spike bits representing a spike input value, wherein each of the spike bits corresponds to a synapse in the plurality of synapses. In one or more embodiments, the synapses associated with the winning spiking neuron are stored in a plurality of indexes, each index storing one or more synaptic weight bits, each of the one or more synaptic weight bits representing a synaptic weight value.

In one or more embodiments, each synaptic weight value is selected from a group of values consisting one of: zero and positive integer values, each value represented by multi-bit digital value; positive integer values, each value represented by multi-bit digital value; positive integer values and negative integer values, each value represented by multi-bit digital value; and negative integer values, zero, and positive integer values, each value represented by multi-bit digital value.

In one or more embodiments, the neural processor is configured to perform synaptic weight value variation is by at least one of: incrementing a synaptic weight value of a first synapse from the plurality of synapses associated with the winning spiking neuron; and decrementing a synaptic weight value of a second synapse from the plurality of synapses associated with the winning spiking neuron, to perform learning based on the generated spike packet.

In one or more embodiments, the neural processor is configured to perform synaptic weight value variation such that a first synaptic vector length associated with the first synapse determined before the synaptic weight value variation and a second synaptic vector length associated with the second synapse determined after the synaptic weight value variation is of similar value.

In one or more embodiments, the neural processor is configured to perform scaling of the plurality of spike input values and synaptic weight values, before determining the membrane potential value.

In one or more embodiments, the neural processor is further configured to determine the membrane potential by at least one of: performing a dot product between the plurality of spike input values and the scaled synaptic weight values; performing a dot product between the scaled spike input values and the synaptic weight values; and performing a dot product between the scaled spike input values and the scaled synaptic weight values.

In one or more embodiments, the neural processor is configured to perform conversion of the plurality of spike input values and synaptic weight values, before performing the synaptic weight value variation.

In one or more embodiments, to determine the membrane potential value, the neural processor is further configured to: generate a plurality of difference values between the synaptic weight value and either a corresponding first spike input value or a value that is derived from the corresponding spike input value; generate a plurality of squared values, each squared value is generated by squaring each of the difference values; generate a summed value by summing the squared values; generate a square rooted value by square rooting the summed value; and generate the membrane potential value based on the square rooted value.

In one or more embodiments, the membrane potential value is at least one of: equivalent of or approximated to the square rooted value, wherein the winning spiking neuron has the lowest membrane potential value; negative value of or approximated negative value to square rooted values, wherein the winning spiking neuron has the highest membrane potential value; and equivalent of or approximated to the value generated by dividing 1 by the square rooted value, wherein the winning spiking neuron has the highest membrane potential value.

In one or more embodiments, to determine the membrane potential value, the neural processor is further configured to: generate a plurality of difference values by subtracting the synaptic weight values and either a corresponding first spike input values or a value that is derived from the corresponding spike input value; and generate a plurality of absolute values by determining absolute value for each of the difference values; generate a summed value by summing the plurality of absolute values; and generating the membrane potential value based on the summed value.

In one or more embodiments, the membrane potential value is at least one of: equivalent of or approximated to the summed value; equivalent of or approximated to the square rooted value, wherein the winning spiking neuron has the lowest membrane potential value; negative value of or approximated negative value to square rooted values, wherein the winning spiking neuron has the highest membrane potential value; and equivalent of or approximated to the value generated by dividing 1 by the square rooted value, wherein the winning spiking neuron has the highest membrane potential value.

In one or more embodiments, to perform the synaptic weight value variation, the neural processor is configured to: determine a first spike bit in the spike packet that represents an underused spike, wherein the first spike bit corresponds to a first synaptic weight value, the first spike bit has a value of one, and the first synaptic weight value of the first synapse has a value less than a maximum synaptic weight value; determine a second synaptic weight value of a second synapse in the plurality of synapses represents an underused synaptic weight, wherein a second spike bit in the spike packet corresponds to the second synaptic weight, wherein the second synaptic weight has a non-zero value, and the second spike bit in the spike packet has a value of zero; and perform the synaptic weight value variation based on the generated spike packet by at least one of: incrementing the first synaptic weight value; and decrementing the second synaptic weight value.

In one or more embodiments, to perform the learning function, the neural processor is configured to: determine a first 1-bit spike input value in the spike packet that represents an underused spike, wherein the first 1-bit spike input value corresponds to a first multi-bit synaptic weight value, the first 1-bit spike input value is one, and the first multi-bit synaptic weight of the first synapse has a value less than a maximum synaptic weight value; determine a second multi-bit synaptic weight value of a second synapse in the plurality of synapses represents an underused synaptic weight, wherein a second 1-bit spike input value in the spike packet corresponds to the second multi-bit synaptic weight, and the second multi-bit synaptic weight value has a value more than a minimum synaptic weight value, and the second 1-bit synaptic weight value is zero; perform the synaptic weight value variation based on the generated spike packet by at least one of: incrementing the first synaptic weight value; and decrementing the second synaptic weight value.

In one or more embodiments, to perform the synaptic weight value variation, the neural processor is configured to: determine a first multi-bit spike input value in the spike packet that represents an underused spike, wherein the first multi-bit spike input value corresponds to a first synaptic weight value, the first multi-bit spike input value has a non-zero value, and the first multi-bit synaptic weight value of the first synapse has a value less than a maximum synaptic weight value; and determine a second multi-bit synaptic weight value of a second synapse in the plurality of synapses represents an underused weight, wherein a second multi-bit spike input value in the spike packet corresponds to the second multi-bit synaptic weight, the second multi-bit synaptic weight value has a value less than a minimum synaptic weight value, and the second multi-bit spike input value has a zero value; and perform the synaptic weight value variation based on the generated spike packet by at least one of: incrementing the first synaptic weight value; and decrementing the second synaptic weight value.

In one or more embodiments, the plurality of spike input values and the synaptic weight values are multi-bit, and wherein to perform the synaptic weight value variation, the neural processor is configured to: determine a plurality of multi-bit reconstruction error values by subtracting the multi-bit synaptic weight values from the multi-bit spike input values, determine a first multi-bit spike input value in the spike packet that represents an underused spike, wherein the first multi-bit spike input value corresponds to a first synaptic weight value and a non-zero positive reconstructed error value; and determine a second multi-bit synaptic weight value of a second synapse in the plurality of synapses that represents an underused weight, wherein a second multi-bit spike input value in the spike packet corresponds to the second multi-bit synaptic weight value and a non-zero negative reconstruction error value; and perform the synaptic weight value variation based on the generated spike packet by at least one of: incrementing the first synaptic weight value; and decrementing the second synaptic weight value.

In one or more embodiments, to perform the synaptic weight value variation, the neural processor is configured to: determine converted spike input values corresponding to the plurality of spike input values based on a range of the synaptic weight values, when the range of the plurality of spike input values is different from the range of the synaptic weight value; determine a plurality of reconstructed input values by summing synaptic weight values of synapses of the winning spiking neuron of the spiking neural network layer and synaptic weight values of synapses of one or more additional spiking neurons of the network; determine a plurality of reconstruction error values by subtracting the plurality of reconstructed input values from the plurality of spike input values or the plurality of converted spike input values; determine a first spike input value in the spike packet that represents an underused spike, wherein the first spike input value corresponds to a non-zero positive reconstructed error value and a first synaptic weight value of a first synapse of the winning spiking neuron with a value that is less than a maximum synaptic weight value; determine a second synaptic weight value of a second synapse of the winning spiking neuron that represents an underused weight, wherein a second spike input value corresponds to the second synaptic weight value and a non-zero negative reconstruction error value, the value of the second synaptic weight value is more than a minimum synaptic weight value; and perform the synaptic weight value variation based on the generated spike packet by at least one of: incrementing the first synaptic weight value; and decrementing the second synaptic weight value.

In one or more embodiments, each of the plurality of synaptic weight values and the plurality of spike input values are 1-bit, wherein to perform the synaptic weight value variation, the neural processor is configured to: determine a plurality of reconstructed input values by summing synaptic weight values of synapses of the winning spiking neuron of the spiking neural network layer and synaptic weight values of synapses of one or more additional spiking neurons of the neural network; determine a plurality of reconstruction error values by subtracting the plurality of reconstructed input values from the plurality of spike input values, determine a first spike input value in the spike packet that represents an underused spike, wherein the first spike input value corresponds to a non-zero positive reconstructed error value and a first synaptic weight value of a first synapse of the winning spiking neuron is of zero synaptic weight value; determine a second synaptic weight value of a second synapse of the winning spiking neuron that represents an underused weight, wherein a second spike input value corresponds to the second synaptic weight value and a non-zero negative reconstruction error value, the value of the second synaptic weight value is of one synaptic weight value; and perform the synaptic weight value variation based on the generated spike packet by at least one of: incrementing the first synaptic weight value and decrementing the second synaptic weight value; and swapping a value of the second synaptic weight value with a value of the first spike.

In one or more embodiments, the one or more of the additional spiking neurons and the winning spiking neuron are of the same layer of the neural network.

In one or more embodiments, to perform the synaptic weight value variation, the neural processor is configured to: determine converted spike input values corresponding to the plurality of spike input values based on a range of the synaptic weight values, when the range of the plurality of spike input values is different from the range of the synaptic weight values; determine a plurality of reconstruction error values by subtracting the synaptic weight values from the converted spike input values; determine a first spike input value in the spike packet that represents an underused spike, wherein the first spike input value corresponds to a non-zero positive reconstructed error value and a first multi-bit synaptic weight value of a first synapse of the winning spiking neuron with a value that is less than a maximum synaptic weight value; determine a second multi-bit synaptic weight value in the spike packet that represents an underused weight, wherein a second spike input value corresponds to the second synaptic weight value and a non-zero negative reconstruction error value, the value of the second synaptic weight value is more than a minimum synaptic weight value; and perform the synaptic weight value variation based on the generated spike packet by at least one of: incrementing the first synaptic weight value; and decrementing the second synaptic weight value.

In one or more embodiments, to perform the synaptic weight value variation, the neural processor is configured to: determine converted spike input values corresponding to the plurality of spike input values based on a range of the synaptic weight values; determine a first spike input value in the spike packet that represents an underused spike, wherein the first spike input value corresponds to a first synaptic weight value of a first synapse of the winning spiking neuron with a value that is less than a maximum synaptic weight value, the first synaptic weight value requires an increase in absolute value to move towards an absolute value of the first spike input value; determine a second synaptic weight value in the spike packet that represents an underused weight, wherein a second spike input value corresponds to the second synaptic weight value, the second synaptic weight value requires decrease in absolute value to move towards an absolute value of the second spike input value, the value of the second synaptic weight value is more than a minimum synaptic weight value; and perform the synaptic weight value variation based on the generated spike packet by at least one of: incrementing the first synaptic weight value; and decrementing the second synaptic weight value.

In one or more embodiments, the synaptic weight values are multi-bit, wherein the increment or decrement of a synaptic weight value is of integer value more than one.

In one or more embodiments, the neural processor is further configured to: process a subsequent spike packet generated from the packetizer upon confirmation that the synaptic weight values associated with the winning spiking neuron are varied; determine a membrane potential value for each of the plurality of spiking neurons present in a spiking neural network layer of the neural network from the one or more spiking neural network layers of the neural network, based on the generated subsequent spike packet and the synaptic weight values of the synapses associated with each of the plurality of spiking neurons; determine a set of spiking neurons from the plurality of spiking neurons in the layer of the neural network whose membrane potential value has reached a corresponding learning threshold value which is indicative of another learning function for the neural network; determine a subsequent winning spiking neuron from the set of spiking neurons for the subsequent spike packet; and perform synaptic weight value variation for one or more synapses associated with the subsequent winning spiking neuron to reflect the other learning function for the neural network based on the subsequent spike packet.

In one or more embodiments, upon determining that the one or more spiking neurons from the plurality of spiking neurons have reached a corresponding firing threshold value, the neural processor is further configured to: perform asynchronous spiking of the spiking neurons that have reached the corresponding firing threshold value, wherein the asynchronous spiking results in generation of a next spike packet for one or more next spiking neurons of the next spiking neural network layer from the plurality of spiking neural network layers of the neural network.

In one or more embodiments, the neural processor is further configured to: determine a membrane potential value for each of the plurality of next spiking neurons present in the next layer of the neural network, based on the generated next spike packet and synaptic weight values of synapses associated with each of the plurality of spiking neurons; determine a next set of spiking neurons from the plurality of next spiking neurons in the spiking neural network layer of the neural network whose membrane potential values has reached a corresponding learning threshold value which is indicative of next learning function for the neural network; determine a next winning spiking neuron from the next set of spiking neurons corresponding to the generated next spike packet; and perform synaptic weight value variation for one or more synapses associated with the next winning spiking neuron to reflect the next learning function for the neural network based on the generated next spike packet.

In one or more embodiments, the neural processor is configured to, upon determination that the one or more spiking neurons from the plurality of spiking neurons have reached at least one of the corresponding firing threshold value associated with each of the one or more spiking neurons, perform asynchronous spiking of the each of the one or more spiking neurons.

According to the invention there is provided a method, comprising: determining, via a neural processor, a membrane potential value for each of a plurality of spiking neurons present in a spiking neural network layer of the neural network from one or more spiking neural network layers of the neural network, based on input data and synaptic weight values of synapses associated with each of the plurality of spiking neurons; determining, via the neural processor, a set of spiking neurons from the plurality of spiking neurons in the spiking neural network layer of the neural network whose membrane potential values has reached a corresponding learning threshold value which is indicative of a learning function for the neural network; determining, via the neural processor, a winning spiking neuron from the set of spiking neurons in the spiking neural network layer of the neural network for the input data; and performing, via the neural processor, synaptic weight value variation for one or more synapses associated with the winning spiking neuron to reflect the learning function for the neural network based on the input data.

According to the invention there is provided a non-transitory computer readable medium having instructions encoded thereon, the instructions being executable by a neural processor to perform a method, the method comprising: determining a membrane potential value for each of a plurality of spiking neurons present in a spiking neural network layer of the neural network from one or more spiking neural network layers of the neural network, based on input data and synaptic weight values of synapses associated with each of the plurality of spiking neurons; determining a set of spiking neurons from the plurality of spiking neurons in the spiking neural network layer of the neural network whose membrane potential values has reached a corresponding learning threshold value which is indicative of a learning function for the neural network; determining a winning spiking neuron from the set of spiking neurons in the spiking neural network layer of the neural network for the input data; and performing synaptic weight value variation for one or more synapses associated with the winning spiking neuron to reflect the learning function for the neural network based on the input data.

According to the invention there is provided a system, comprising: a neural processor, for each spike packet of a plurality of spike packets generated based on input data, configured to: determine one or more synaptic weight values of one or more synapses in a plurality of synapses representing unmatched synaptic weights, wherein the unmatched synaptic weights have unmatched synaptic weight values corresponding to the spike packet; perform synaptic weight value variation of the one or more synapses based on the spike packet by at least one of: incrementing one or more synaptic weight values; and decrementing one or more synaptic weight values, wherein the synaptic weight values after processing each spike packet decreases number of unmatched values corresponding to the spike packet.

A person skilled in that would appreciate that the various embodiments of the present invention provide multiple options to a user for implementing and training a spiking neural network. However, depending upon the application to implement and availability of resources and constraints, one or more techniques disclosed with the present invention can be incorporated to implement a network.

A person skilled in the art would appreciate that the synaptic weight value variation for embodiments described with FIGS. 9 to 16 can be performed using any one of the synaptic weight variation techniques disclosed in earlier embodiments of the invention.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

It will be understood to persons skilled in the art of the invention that many modifications may be made without departing from the spirit and scope of the invention.

What is claimed is:

1. A system, comprising:

a memory; and a neural processor configured to:

receive a modification request to modify a base neural network having N layers and a first plurality of spiking neurons, to generate a modified neural network, the base neural network having been trained using a primary training data set to identify a first class associated with a feature in a classification task; and modify the base neural network, based on the modification request, to generate the modified neural network by adding one or more supplementary spiking neurons in the last layer N, or an additional layer N+1 the base neural network, to form a second plurality of spiking neurons including the first plurality of spiking neurons and the one or more supplementary spiking neurons, wherein the modified neural network is directed to identify a second class associated with the feature in the classification task, the second class being different than the first class;

wherein the neural processor is configured to:

receive a plurality of spikes generated from a secondary training data set different than the primary training data set;

determine a membrane potential value of each supplementary spiking neuron from the one or more supplementary spiking neurons;

select a supplementary spiking neuron from the one or more supplementary spiking neurons as a winning spiking neuron based on membrane potential values of the second plurality of spiking neurons excluding at least one spiking neuron from the second plurality of spiking neurons that is in the last layer N or the additional layer N+1 of the modified neural network; and modify a synaptic weight value of a synapse associated with the winning spiking neuron to generate a modified synaptic weight value, the modified synaptic weight value effective to improve an accuracy of identifying an object as belonging to the second class associated with the feature in the classification task, without degrading an accuracy of identifying an object as belonging to the first class associated with the feature in the classification task, by the modified neural network.

2. The system of claim 1, wherein:

the memory stores a neural network configuration that defines a potential array and a plurality of synapses associated with the first plurality of spiking neurons in the base neural network, the potential array comprising membrane potential values for each spiking neuron from the plurality of spiking neurons, and the plurality of synapses having corresponding synaptic weights; and the system further comprises a supplementary processor configured to modify the neural network configuration and send the modification request to the neural processor to modify the base neural network to generate the modified neural network.

3. The system of claim 1, wherein the neural processor is further configured to modify the synaptic weight value of the synapse associated with the winning spiking neuron based on the membrane potential value for each spiking neuron from all spiking neurons in the last layer N or the additional layer N+1.

4. The system of claim 1, wherein the neural processor is further configured to modify the synaptic weight value of the synapse associated with the winning spiking-neuron based on a membrane potential value associated with one or more spiking neurons in the last layer N or the additional layer N+1 that spiked in response to a specified input.

5. The system of claim 1, wherein the neural processor is further configured to receive a user input including at least one of:

information indicating a set of classes associated with the feature that is represented in the secondary training data set, the set of classes including the second class; and a selectivity associated with the one or more supplementary spiking neurons;

the neural processor configured to determine which at least one spiking neuron from the second plurality of spiking neurons to exclude based on the user input when selecting the winning spiking neuron.

6. The system of claim 1, wherein the number of supplementary spiking neurons is two or more, and wherein the winning spiking neuron is selected based on having a membrane potential value that is a highest value among the membrane potential values for the two or more of the supplementary spiking neurons.

7. The system of claim 1, wherein the number of supplementary spiking neurons is two or more, and wherein the winning spiking neuron is selected based on having a membrane potential value that is a highest value among the membrane potential values of the two or more of the supplementary spiking neurons and whose membrane potential value has reached a corresponding learning threshold value.

8. The system of claim 2, wherein the synapses associated with the winning spiking neuron are stored in a plurality of indexes, each index storing one or more synaptic weight bits, each of the one or more synaptic weight bits representing a synaptic weight value.

9. A method, comprising:

receiving a base neural network having a first plurality of spiking neurons over N layers, wherein the value of N is at least two, the base neural network having been trained using a primary training data set, to identify an object belonging to a first class associated with a feature represented in the primary training data set;

modifying the base neural network by adding one or more supplementary spiking neurons in the last layer N or an additional layer N+1 of the base neural network to form a second plurality of spiking neurons, in response to a modification requirement to modify the base neural network, to achieve a modified neural network; and training the modified neural network by:

receiving a secondary training data set and user input regarding the one or more supplementary spiking neurons and the secondary training data set, the secondary training data set being different from the primary training data set;

selecting a supplementary spiking neuron from the one or more supplementary spiking neurons of the modified neural network as a winning spiking neuron, based on membrane potential values of the second plurality of spiking neurons excluding at least one spiking neuron from the second plurality of spiking neurons that is in the last layer N or the additional layer N+1 of the modified neural network; and modifying a synaptic weight value of a synapse associated with the winning spiking neuron to generate a modified synaptic weight value, the modified synaptic weight value effective to improve an accuracy of identifying an object as belonging to a second class associated with the feature in the classification task, without degrading an accuracy of identifying an object as belonging to the first class associated with the feature in the classification task, by the modified neural network.

10. The method of claim 9, wherein modifying the synaptic weight value is based on a membrane potential value for each spiking neuron from a set of spiking neurons in the last layer N or the additional layer N+1 as the winning spiking neuron.

11. The method of claim 9, wherein modifying the synaptic weight value of the synapse associated with the winning spiking neuron is based on a membrane potential value associated with one or more spiking neurons in the last layer N or the additional layer N+1 that spiked in response to a specified input.

12. The method of claim 9, wherein training the modified neural network further comprises: receiving input including at least one of:

information indicating a set of classes associated with the feature that is represented in the secondary training data set the set of classes including the second class; and a selectivity associated with the one or more supplementary spiking neurons; and determining the at least one spiking neuron from the second plurality of spiking neurons to exclude based on the input selecting when selecting the winning spiking neuron.

13. The method of claim 9, wherein the number of supplementary spiking neurons is two or more, and wherein selecting the winning spiking neuron is based on the winning spiking neuron having a membrane potential value that is a highest value among the membrane potential values for the two or more of the supplementary spiking neurons.

14. The method of claim 9, wherein the number of supplementary spiking neurons is two or more, and wherein selecting the winning spiking neuron is based on the winning spiking neuron having a membrane potential value that is of highest value among the membrane potential values of the two or more of the supplementary spiking neurons and whose membrane potential value has reached a corresponding learning threshold value.

15. The method of claim 9, wherein the synapses associated with the winning spiking neuron are stored in a plurality of indexes, each index storing one or more synaptic weight bits, each of the one or more synaptic weight bits representing a synaptic weight value.

16. The system of claim 1, wherein the neural processor is further configured to:

receive data including the feature, the data including a first object and a second object; and generate, using the modified neural network and in response to the data, a first output accurately identifying the first object in the data as belonging to the first class associated with the feature, and a second output accurately identifying the second object in the data as belonging to the second class associated with the feature.

17. A system, comprising:

a spiking neural network configured to identify a set of classes associated with a feature in a classification task, the spiking neural network including two or more spiking neurons in a last layer of the spiking neural network, the two or more spiking neurons having a selectivity for representing a specified class from the set of classes associated with the feature;

a neural processor configured to:

receive a plurality of spikes generated from a training data set and a user input regarding the two or more spiking neurons;

select a spiking neuron from the two or more spiking neurons as a winning spiking neuron, based on a membrane potential value of each spiking neuron from the two or more spiking neurons in the last layer of the spiking neural network excluding at least one spiking neuron from the two or more spiking neurons in the last layer; and modify a synaptic weight value of a synapse associated with the winning spiking neuron to generate a modified synaptic weight value effective to improve an accuracy of identifying an object as belonging to the specified class associated with the feature in the classification task, without degrading an accuracy of identifying an object as belonging to at least one other class from the set of classes associated with the feature in the classification task by the spiking neural network.

18. The system of claim 17, wherein the neural processor is further configured to modify the synaptic weight value of the synapse associated with the winning spiking neuron based on a membrane potential value associated with one or more spiking neurons in the last layer of the spiking neural network that spiked in response to a specified input.

19. A method, comprising:

implementing a spiking neural network configured to identify a set of classes associated with a feature in a classification task, the spiking neural network including two or more spiking neurons in a last layer, the two or more spiking neurons having a selectivity for representing a specified class from the set of classes associated with the feature;

training the spiking neural network by:

receiving a plurality of spikes from a training data set and user input regarding the two or more spiking neurons;

selecting a spiking neuron from the two or more spiking neurons in the last layer as a winning spiking neuron, based on a membrane potential value of each spiking neuron from the two or more spiking neurons in the last layer excluding at least one spiking neuron from the two or more spiking neurons in the last layer; and modifying a synaptic weight value variation of a synapse associated with the winning spiking neuron to generate a modified synaptic weight value effective to improve an accuracy of identifying an object as belonging to the specified class associated with the feature, without degrading an accuracy of identifying an object as belonging to at least one other class from the set of classes associated with the feature, in the classification task by the spiking neural network.

* * * * *